(12) United States Patent
Xu et al.

(10) Patent No.: US 12,638,890 B2
(45) Date of Patent: May 26, 2026

(54) ROTATING MECHANISM AND ELECTRONIC DEVICE

(71) Applicant: HUAWEI TECHNOLOGIES CO., LTD., Shenzhen (CN)

(72) Inventors: Zhengyi Xu, Shanghai (CN); Wenjie Jiang, Shanghai (CN); Yunyong Li, Shanghai (CN); Chunjun Ma, Shanghai (CN); Gangchao Wang, Shanghai (CN); Haoyang Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 18/294,943

(22) PCT Filed: Jun. 30, 2022

(86) PCT No.: PCT/CN2022/103033
§ 371 (c)(1),
(2) Date: Feb. 2, 2024

(87) PCT Pub. No.: WO2023/011070
PCT Pub. Date: Feb. 9, 2023

(65) Prior Publication Data
US 2024/0338058 A1 Oct. 10, 2024

(30) Foreign Application Priority Data
Aug. 3, 2021 (CN) .......................... 202110885364.2

(51) Int. Cl.
*G06F 1/16* (2006.01)
*H04M 1/02* (2006.01)

(52) U.S. Cl.
CPC .......... *G06F 1/1681* (2013.01); *G06F 1/1624* (2013.01); *G06F 1/1652* (2013.01); *H04M 1/0216* (2013.01); *H04M 1/0268* (2013.01)

(58) Field of Classification Search
CPC combination set(s) only.
See application file for complete search history.

(56) References Cited

U.S. PATENT DOCUMENTS

| | | | | |
|---|---|---|---|---|
| 11,336,759 | B2 * | 5/2022 | Liao | ...................... H04M 1/022 |
| 11,846,991 | B2 * | 12/2023 | Feng | ..................... G06F 1/1637 |

(Continued)

*Primary Examiner* — Lisa Lea-Edmonds
(74) *Attorney, Agent, or Firm* — Leydig, Voit & Mayer, Ltd.

(57) ABSTRACT

This application provides a rotating mechanism and an electronic device. The rotating mechanism includes a first housing connecting rod, a second housing connecting rod, a primary shaft, a first rotating door plate, a second rotating door plate, and a door plate swing arm. The first rotating door plate and the second rotating door plate are separately fixedly connected to the door plate swing arm. The door plate swing arm is rotatably connected to the primary shaft. The door plate swing arm is movably connected to the first housing, and the door plate swing arm is movably connected to the second housing. The first rotating door plate and the second rotating door plate are configured to support a bending portion of the flexible display screen in a flattened state. In a folded state, the first rotating door plate and the second rotating door plate form a screen accommodating space for accommodating the bending portion of the flexible display screen. This application can improve motion precision of the first rotating door plate and the second rotating door plate, and ensure stability and reliability of the electronic device.

20 Claims, 47 Drawing Sheets

(56) References Cited

U.S. PATENT DOCUMENTS

| | | | | |
|---|---|---|---|---|
| 11,846,997 B2 * | 12/2023 | Liao | ..................... | H04M 1/0216 |
| 11,933,351 B2 * | 3/2024 | Jiang | ....................... | F16C 11/04 |
| 12,047,521 B2 * | 7/2024 | Liao | ...................... | G06F 1/1652 |
| 12,277,005 B2 * | 4/2025 | Li | ......................... | G06F 1/1652 |
| 12,316,791 B2 * | 5/2025 | Liao | ...................... | G06F 1/1681 |
| 12,349,298 B2 * | 7/2025 | Zhang | .................. | H04M 1/022 |
| 12,429,925 B2 * | 9/2025 | Zhang | ................. | H04M 1/0247 |
| 2021/0271294 A1 * | 9/2021 | Liao | ...................... | G06F 1/181 |
| 2021/0368032 A1 * | 11/2021 | Liao | ...................... | G06F 1/1681 |
| 2022/0303371 A1 * | 9/2022 | Liao | ................... | H04M 1/0268 |
| 2024/0011522 A1 * | 1/2024 | Jiang | ................... | G06F 1/1681 |
| 2024/0073303 A1 * | 2/2024 | Zhang | .................. | G06F 1/1616 |
| 2024/0098915 A1 * | 3/2024 | Zhang | .................. | F16C 11/045 |
| 2024/0302864 A1 * | 9/2024 | Wu | ....................... | G06F 1/1681 |
| 2024/0338058 A1 * | 10/2024 | Xu | ......................... | G06F 1/1652 |
| 2024/0340365 A1 * | 10/2024 | Liao | ...................... | G06F 1/1681 |
| 2024/0385659 A1 * | 11/2024 | Wu | ........................... | G06F 1/16 |

* cited by examiner

100

800

24

240

241

241

240

24

240 243

20

20

21

22

20M

ROTATING MECHANISM AND ELECTRONIC DEVICE

This application claims priority to Chinese Patent Application No. 202110885364.2, filed with the China National Intellectual Property Administration on Aug. 3, 2021 and entitled "ELECTRONIC DEVICE AND FOLDING APPARATUS", which is incorporated herein by reference in its entirety.

TECHNICAL FIELD

Embodiments of this application relate to the field of electronic devices, and more specifically, to a rotating mechanism used in an electronic device, and an electronic device including the rotating mechanism.

BACKGROUND

With the development of flexible display technologies, a foldable electronic device based on a flexible display has become a technology hotspot in the current industry. For example, a foldable screen mobile phone, as a foldable electronic device, is being favored by more users. A conventional foldable screen mobile phone includes a folding apparatus and a flexible display fastened on the folding apparatus. The folding apparatus generally includes a rotating mechanism and a housing fastened on two sides of the rotating mechanism. Two side parts of the flexible display are respectively fastened to corresponding housings, and a middle part of the flexible display is located at a position corresponding to the rotating mechanism. The rotating mechanism can deform, to enable a first housing and a second housing to rotate around the rotating mechanism, so that the flexible display can be switched between a flattened state and a closed state. A conventional rotating mechanism has a complex structure, and usually uses a multi-stage transmission to implement rotation of two housings, and reliability of such a rotating mechanism is poor.

SUMMARY

Embodiments of this application provide a rotating mechanism and an electronic device, to resolve the foregoing problem and other potential problems existing in a conventional rotating mechanism.

According to a first aspect, this application provides a rotating mechanism, configured to be connected between a first housing and a second housing of a folding apparatus of an electronic device. The folding apparatus is configured to carry a flexible display screen. The rotating mechanism includes a first rotating door plate, a second rotating door plate, two door plate swing arms, a first housing connecting rod, a second housing connecting rod, and a primary shaft. The first rotating door plate is fixedly connected to one of the door plate swing arms and is located between the door plate swing arm and the flexible display screen. The second rotating door plate is fixedly connected to the other door plate swing arm and located between the door plate swing arm and the flexible display screen. The two door plate swing arms are both rotatably connected to the primary shaft. The door plate swing arm fixedly connected to the first rotating door plate is movably connected to the first housing connecting rod, and the door plate swing arm fixedly connected to the second rotating door plate is movably connected to the second housing connecting rod.

Specifically, in a flattened state, the first rotating door plate and the second rotating door plate are configured to support a bending portion of the flexible display screen. In a folded state, the first rotating door plate and the second rotating door plate form a screen accommodating space for accommodating the bending portion of the flexible display screen.

The "movably connected" defined in this application may be rotatably connected, slidably connected, or in another connection manner having a degree of freedom. The degree of freedom may be understood as: A relative movement can be generated between the first rotating door plate and the first housing in a process of flattening or folding, and a relative movement can be generated between the second rotating door plate and the second housing in a process of flattening or folding.

In this embodiment of this application, the first rotating door plate and the second rotating door plate are rotatably connected to the primary shaft by the door plate swing arm respectively. Because both the first rotating door plate and the second rotating door plate are fixedly connected to the door plate swing arm, it may be considered that both the first rotating door plate and the second rotating door plate move synchronously with the door plate swing arm in a process of unfolding or folding. Therefore, the first rotating door plate and the second rotating door plate of the folding apparatus provided in this application can directly rotate relative to the primary shaft. A connection relationship between the two rotating door plates and the primary shaft belongs to an architecture of single-stage transmission. Such single-stage transmission improves motion precision of the first rotating door plate and the second rotating door plate. In addition, because the motion precision of the first rotating door plate and the second rotating door plate is high, a stable screen accommodating space can be provided between the first rotating door plate and the second rotating door plate in the folded state of the electronic device. In addition, the first rotating door plate and the second rotating door plate can provide stable support for the bending portion of the flexible display screen in a flattened state of the electronic device, thereby improving reliability of the bending portion of the flexible display screen when being pressed. In addition, because of a single-stage transmission relationship between the first rotating door plate and the primary shaft, and the second rotating door plate and the primary shaft, when the electronic device falls accidentally, the first rotating door plate and the second rotating door plate have small fluttering, to provide stability protection for the flexible display screen, and improve reliability of the electronic device.

In a possible implementation, when the rotating mechanism is in a flattened state, at least a part of an edge of the first rotating door plate is docked with at least a part of an edge of the second rotating door plate. In this solution, an implementation of a relationship between a first rotating door plate and a second rotating door plate of a folding apparatus of a two-door plate architecture in the flattened state is limited. The at least a part of an edge of the first rotating door plate is docked with the at least a part of an edge of the second rotating door plate, so that the first rotating door plate and the second rotating door plate can provide a stable support force for the flexible display screen in the flattened state.

The "docked" defined in this solution may be understood as: An edge of the first rotating door plate is in contact with an edge of the second rotating door plate: or a small gap is formed between the edge of the first rotating door plate and the edge of the second rotating door plate. The small gap may be a gap formed by a factor such as an assembly tolerance or a design tolerance, and is not intended to avoid another structural feature. A small size of the gap does not affect support for the flexible display screen. Alternatively, a bonding structure or an overlapping structure is formed between the edge of the first rotating door plate and the edge of the second rotating door plate.

In a possible implementation, the rotating mechanism further includes a synchronous damping member. The synchronous damping member includes a first transmission connecting rod, a second transmission connecting rod, and a transmission module that are rotatably connected to the primary shaft. Each of the first transmission connecting rod and the second transmission connecting rod includes a sliding end and a rotating end. The rotating ends of the first transmission connecting rod and the second transmission connecting rod cooperate with the transmission module. The sliding end of the first transmission connecting rod is slidably connected to the first housing connecting rod, and the sliding end of the second transmission connecting rod is slidably connected to the second housing connecting rod. In this solution, the rotating mechanism is limited to further including the synchronous damping member, so that the first rotating door plate and the second rotating door plate of the rotating mechanism have an advantage of synchronous movement based on better guarantee of motion precision. It can be ensured that rotation angles of the first housing connecting rod and the second housing connecting rod relative to the primary shaft consistently change in a process of relative unfolding or folding of the first housing connecting rod and the second housing connecting rod, to implement synchronous unfolding or folding. In this manner, a folding action and an unfolding action of the electronic device are preferably symmetrical, helping improve user experience.

In a possible implementation, when the rotating mechanism is in the flattened state, at least a part of a joint position between the first rotating door plate and the second rotating door plate falls within a vertical projection range of the transmission module on the first rotating door plate and the second rotating door plate. In this solution, a position relationship between a joint position between the first rotating door plate and the second rotating door plate and the transmission module is limited, and a hollow or a hollow structure does not need to be arranged at the joint position between the first rotating door plate and the second rotating door plate to avoid the synchronous damping member. In this way, a rotating mechanism with a simpler structure design is obtained, integrity of the first rotating door plate and the second rotating door plate is better, and stability of the rotating mechanism for supporting the flexible display screen can be improved.

In a possible implementation, when the rotating mechanism is in the folded state, a rotation center of the rotating end of the first transmission connecting rod is located on a side of the first rotating door plate facing away from the second rotating door plate, or on a side of an extension surface of the first rotating door plate facing away from an extension surface of the second rotating door plate. A rotation center of the rotating end of the second transmission connecting rod is located on a side of the second rotating door plate facing away from the first rotating door plate, or on the side of the extension surface of the second rotating door plate facing away from the extension surface of the first rotating door plate. In this application, a position relationship between the rotation center of the rotating end of the first transmission connecting rod and the first rotating door plate, and a position relationship between the rotation center of the rotating end of the second transmission connecting rod and the second rotating door plate are limited, so that disposing of the first transmission connecting rod and the second transmission connecting rod does not affect structural integrity of the first rotating door plate and the second rotating door plate. That is, a structure of a notch or a hole configured to avoid a corresponding transmission connecting rod does not need to be arranged on the first rotating door plate and the second rotating door plate. The first rotating door plate and the second rotating door plate can form a complete plate-shaped architecture in the flattened state. The complete plate-shaped architecture can block the synchronous damping member, so that the flexible display screen obtains a good support force, and structural stability of the electronic device is improved.

In a possible implementation, the rotation center of the rotating end of the first transmission connecting rod is a first center, and the rotation center of the rotating end of the second transmission connecting rod is a second center. When the rotating mechanism is in the folded state, a vertical distance between the first center and the second center is greater than a maximum distance between the first rotating door plate and the second rotating door plate in a first direction. The first direction is an extension direction of a vertical connection line between the first center and the second center. In this solution, a distance between the rotation center of the rotating end of the first transmission connecting rod and the rotation center of the rotating end of the second transmission connecting rod is limited. Because the distance between the first center and the second center is greater than the maximum distance between the first rotating door plate and the second rotating door plate in the first direction, specific positions of the rotation center of the rotating end of the first transmission connecting rod and the rotation center of the rotating end of the second transmission connecting rod may be limited. In this solution, the structure of a gap or a hole configured to avoid a corresponding transmission connecting rod does not need to be arranged on the first rotating door plate and the second rotating door plate. The first rotating door plate and the second rotating door plate can form a complete plate-shaped architecture in the flattened state. The complete plate-shaped architecture can block the synchronous damping member, so that the flexible display screen obtains a good support force, and structural stability of the electronic device is improved.

In a possible implementation, the first rotating door plate includes a first support surface, the second rotating door plate includes a second support surface, when the rotating mechanism is in the folded state, a first angle is formed between a plane on which the first support surface is located and a plane on which the second support surface is located. Both the rotation center of the rotating end of the first transmission connecting rod and the rotation center of the rotating end of the second transmission connecting rod are located outside a range of the first angle. In this solution, the rotation center of the rotating end of the first transmission connecting rod and the rotation center of the rotating end of the second transmission connecting rod are limited to be located outside the first angle, so that the structure of a notch or hole configured to avoid a corresponding transmission connecting rod does not need to be arranged on the first rotating door plate and the second rotating door plate. The first rotating door plate and the second rotating door plate can form a complete plate-shaped architecture in the flattened state. The complete plate-shaped architecture can block the synchronous damping member, so that the flexible display screen obtains a good support force, and structural stability of the electronic device is improved.

In a possible implementation, the transmission module is a structure of a gear group. The gear group includes a plurality of gears engaged with each other, and a quantity of gears is an even number, to implement synchronous movement between the first housing and the second housing in a process of unfolding or folding.

In a possible implementation, the transmission module is of a conveyor belt structure. A tooth structure is arranged on an outer surface of a conveyor belt, and the transmission module may be engaged with a rotating end of the first transmission connecting rod and a rotating end of the second transmission connecting rod. By moving the conveyor belt, the rotating end of the first transmission connecting rod and the rotating end of the second transmission connecting rod are driven to rotate, so that the first transmission connecting rod and the second transmission connecting rod move synchronously. In an implementation, a transmission gear may be arranged between the conveyor belt and one of the rotating ends, to implement synchronous movement between the first housing and the second housing in a flattening and folding processes.

In a possible implementation, in the flattened state, a complete seam without a hollow is formed at the joint between the first rotating door plate and the second rotating door plate. This solution provides appearance consistency of the folding apparatus, and makes an external structure of the folding apparatus simple, and manufacturing costs and assembly costs easy to control. This solution can further improve stability of supporting the flexible display screen by the first rotating door plate and the second rotating door plate when the electronic device is in the flattened state.

In a possible implementation, in the folded state, the rotating end of the first transmission connecting rod is located on a side of the first rotating door plate facing the second rotating door plate, and the sliding end of the first transmission connecting rod is located on a side of the first rotating door plate facing away from the second rotating door plate. The rotating end of the second transmission connecting rod is located on a side of the second rotating door plate facing the first rotating door plate, and the sliding end of the second transmission connecting rod is located on a side of the second rotating door plate facing away from the first rotating door plate. This solution provides a specific position relationship between a transmission connecting rod and a corresponding rotating door plate. In the folded state, the rotating end and the sliding end of each transmission connecting rod are respectively located on two sides of the corresponding rotating door plate, and a gap needs to be provided on the corresponding rotating door plate to accommodate a part of a structure of the corresponding transmission connecting rod. This solution is beneficial to compactness of a whole structure of the synchronous damping member.

In a possible implementation, in the folded state, a second angle is formed between the first rotating door plate and the second rotating door plate, and the rotating ends of the first transmission connecting rod and the second transmission connecting rod are both within a range of the second angle. In this aspect, a relationship between the rotating end of the first transmission connecting rod, the rotating end of the second transmission connecting rod, and the second angle is limited, and it is determined that in the folded state, the rotating end and the sliding end of each transmission connecting rod are respectively located on two sides of the corresponding rotating door plate, and a gap needs to be provided on the corresponding rotating door plate to accommodate a part of the corresponding transmission connecting rod. This solution is beneficial to compactness of a whole structure of the synchronous damping member. In addition, the folding apparatus provided in this solution can provide a large screen accommodating space. Specifically, the first rotating door plate is connected to the flexible display screen, the second rotating door plate is connected to the flexible display screen, the first rotating door plate and the second rotating door plate have a pulling force on the flexible display screen, and a direction of the pulling force is a direction away from a central position of the screen accommodating space. In this solution, a large bending space may be formed on the flexible display screen in a bent state. It may also be understood that in this solution, a curvature radius of the bending portion of the flexible display screen in a bent state is great and is greater than a curvature radius in a natural bent state. This solution helps ensure a service life of the flexible display screen, so that the electronic device can adapt to different use environments, for example, a harsh environment with a high temperature and high humidity, and the flexible display screen of the electronic device still has a good service life.

In a possible implementation, the rotating mechanism further includes a lifting plate. The lifting plate is connected to the primary shaft and is movable relative to the primary shaft in a direction away from or close to the primary shaft. In the folded state, the lifting plate, the first rotating door plate, and the second rotating door plate jointly enclose a screen accommodating space, and the lifting plate is closer to the primary shaft in the folded state of the rotating mechanism than in the flattened state of the rotating mechanism. In such an embodiment, in the flattened state of the electronic device, the lifting plate can be spliced with the first rotating door plate and the second rotating door plate. In other words, the lifting plate can at least partially seal a hollow enclosed by the first rotating door plate and the second rotating door plate, and is basically flush with the first rotating door plate and the second rotating door plate. In this manner, the lifting plate and the rotating door plate can provide stable support for the bending portion of the flexible display screen, thereby improving reliability of the bending portion of the flexible display screen when being pressed. In addition, in a folded state of the electronic device, the lifting plate, the first rotating door plate, and the second rotating door plate can enclose a screen accommodating space together, so that the bending portion of the flexible display screen is constrained into a shape of a water drop in the screen accommodating space. Because the lifting plate is closer to the primary shaft in the folded state of the electronic device than in the flattened state of the electronic device, the screen accommodating space is increased, and sufficient screen accommodating space can be provided for the bending portion of the flexible display screen.

In a possible implementation, a sleeve is disposed on a side of the lifting plate facing away from the flexible display screen. A hole is disposed on the primary shaft, and at least a part of the sleeve passes through the hole. The rotating mechanism further includes a lifting spring and a fastener. The lifting spring is sleeved on the sleeve, an end portion of the sleeve away from the lifting plate cooperates with the fastener, the lifting spring is arranged between the fastener and the primary shaft, one end of the lifting spring is in contact with the fastener, and the other end of the lifting spring is in contact with a surface of the primary shaft facing away from the lifting plate. In this solution, a specific connection solution between the lifting plate and the primary shaft is limited. The lifting spring is compressed by the fastener. When the lifting plate is subject to a push force in a direction away from the primary shaft, the lifting spring can be compressed, so that the lifting plate moves in the direction away from the primary shaft. When the lifting plate is not subject to the push force in the direction away from the primary shaft, the lifting spring can return, so that the lifting plate moves in a direction close to the primary shaft. By using such arrangement, the lifting plate can move relative to the primary shaft in the direction away from or close to the primary shaft, so that the lifting plate is closer to the primary shaft in the folded state of the electronic device than in the flattened state of the electronic device.

In a possible implementation, the first rotating door plate is provided with a first notch, and the second rotating door plate is provided with a second notch. When the rotating mechanism is in the flattened state, the first rotating door plate is docked with the second rotating door plate, and the first notch and the second notch enclose a hollow: When the rotating mechanism is in the flattened state, the lifting plate is at least partially arranged in the hollow: In this solution, specific designs of the first rotating door plate and the second rotating door plate of the rotating mechanism with the lifting plate solution are limited, and the lifting plate is accommodated by the hollow: so that the rotating mechanism has a flat structure form in the flattened state, providing more stable support for the flexible display screen.

In a possible implementation, the primary shaft includes a primary inner shaft and a top cover. The primary inner shaft is located between the top cover and the lifting plate. The primary inner shaft is configured to cooperate with the first transmission connecting rod, the second transmission connecting rod, the transmission module, the door plate swing arm, and the lifting plate. In this solution, a specific structure of the primary shaft is limited. The first transmission connecting rod, the second transmission connecting rod, the transmission module, the door plate swing arm, and the lifting plate are assembled by using the primary inner shaft as a functional structure, and the top cover is used as an appearance member to cover the primary inner shaft, so that appearance consistency of the rotating mechanism is better.

In a possible implementation, the rotating mechanism further includes a stop member. In a rotation process of the rotating mechanism, the stop member rotates relative to the primary inner shaft. When the rotating mechanism is in a flattened state, the stop member abuts against a side of the lifting plate facing the primary shaft and maintains the lifting plate in a state of being farther away from the primary shaft, and when the rotating mechanism is in the folded state, the stop member does not abut against the lifting plate, to enable the lifting plate to return under the action of the lifting spring. In such an embodiment, in the flattened state of the electronic device, the stop member can apply a push force in the direction away from the primary shaft to the lifting plate, but in the folded state of the electronic device, the stop member does not apply such a push force to the lifting plate. Therefore, the stop member may be used to reliably control movement of the lifting plate, so that the lifting plate is closer to the primary shaft in the folded state of the electronic device than in the flattened state of the electronic device.

In a possible implementation, the first transmission connecting rod is rotatably connected to the primary shaft by a first pin shaft and can rotate with the first pin shaft. The second transmission connecting rod is rotatably connected to the primary shaft by a second pin shaft and can rotate with the second pin shaft. The stop member that can rotate with the first pin shaft and the second pin shaft is arranged on the first pin shaft and the second pin shaft respectively. The stop member is configured to abut against a side of the lifting plate facing the primary shaft, and maintain the lifting plate in the hollow in the flattened state of the electronic device. The stop member leaves the lifting plate in the folded state, so that the lifting plate returns under an action of the corresponding lifting spring. In a possible implementation, one stop member is arranged at each of two ends of the first pin shaft, and one stop member is arranged at each of two ends of the second pin shaft. In such an embodiment, in a process in which the electronic device is switched from the folded state to the flattened state, the stop members arranged at the two ends of the first pin shaft and the second pin shaft can evenly apply a push force to the lifting plate, thereby ensuring motion stability of the lifting plate relative to the primary shaft. In addition, by using such arrangement, it can be ensured that the lifting plate is basically flush with the first rotating door plate and the second rotating door plate in the flattened state of the electronic device.

In a possible implementation, the stop member and the first pin shaft are an integrally formed architecture, or the stop member is sleeved on a periphery of the first pin shaft, and is fixedly connected to the first pin shaft. In this solution, a specific solution for disposing two kinds of stop members and the first pin shaft is limited.

In a possible implementation, the stop member includes a mounting portion and a pressing portion protruding relative to the mounting portion. The mounting portion is sleeved on a periphery of the first pin shaft and is fixedly connected to the first pin shaft, and the pressing portion is configured to abut against the lifting plate when the rotating mechanism is in the flattened state. In this solution, a specific structural solution of the stop member is limited. The stop member is fixedly connected to the first pin shaft by the mounting portion, and abuts against the lifting plate by the pressing portion.

In a possible implementation, a cross-sectional shape of a mating surface between the mounting portion and the first pin shaft is a flat shape, a polygonal shape, or an irregular shape.

In a possible implementation, one stop member is arranged at each of two ends of the first pin shaft, and one stop member is arranged at each of two ends of the second pin shaft. In this solution, the stop member is arranged at each of the two ends of the first pin shaft, which helps ensure structural stability and balance of the rotating mechanism.

In a possible implementation, in the folded state of the rotating mechanism, at least a part of the lifting plate is located between the two stop members. In this solution, two stop members jointly abut against the lifting plate, to maintain stable positioning of the lifting plate, so that the rotating mechanism has better structural strength in the flattened state. In the folded state, the lifting plate is located between the two stop members, thereby saving space.

In a possible implementation, the transmission module includes an architecture of a gear group, or the transmission module includes an architecture of a conveyor belt, or the transmission module includes a connecting rod structure. This solution limits specific solutions of a plurality of transmission modules.

In a possible implementation, in the flattened state, a plurality of straight-line seams are formed at a joint between the first rotating door plate and the second rotating door plate, and two adjacent straight-line seams of the plurality of straight-line seams are spaced apart. In this solution, a specific structural form of a joint position between two rotating door plates in a two-door plate architecture is limited, and a structure characteristic of the hollow is between two adjacent straight-line seams.

In a possible implementation, when the rotating mechanism is in the flattened state, a complete seam without a hollow is formed at the joint between the first rotating door plate and the second rotating door plate.

In a possible implementation, the rotating mechanism further includes a middle door plate. In the flattened state of the electronic device, the middle door plate is connected between the first rotating door plate and the second rotating door plate, and the first rotating door plate, the middle door plate, and the second rotating door plate jointly support the bending portion. In this solution, a folding apparatus of a three-door plate architecture is limited, and the flexible display screen is jointly supported by the middle door plate and the two rotating door plates. Although the three door plates are used in this solution, a connection relationship between the two rotating door plates and the primary shaft is still a single-stage transmission manner, that is, the primary shaft is rotated by the door plate swing arm. This has an advantage of structure simplicity, and can ensure motion precision of the rotating door plate.

In a possible implementation, the first rotating door plate and the door plate swing arm are of an integrated structure, or the first rotating door plate and the door plate swing arm are fixedly connected by the fastener. In this solution, a specific fastening solution of the rotating door plate and the corresponding door plate swing arm is limited, and has an advantage of easy implementation.

In a possible implementation, the door plate swing arm includes a first rotating portion, and the primary shaft includes a second rotating portion. One of the first rotating portion and the second rotating portion includes an arc-shaped concave portion, and the other of the first rotating portion and the second rotating portion includes an arc-shaped protrusion portion. The arc-shaped concave portion is rotatably connected to the arc-shaped protrusion portion, to implement a rotatable connection between the door plate swing arm and the primary shaft. In such an embodiment, by fitting between the arc-shaped protrusion portion and the arc-shaped concave portion, the rotating door plate can be directly connected to the primary shaft reliably and stably, thereby ensuring that the rotating door plate has high motion precision relative to the primary shaft.

In a possible implementation, the door plate swing arm includes a first rotating portion, and the primary shaft includes a second rotating portion. One of the first rotating portion and the second rotating portion includes a first rotating-shaft through hole, and the other of the first rotating portion and the second rotating portion includes a first rotating shaft. The first rotating shaft passes through the first rotating-shaft through hole, to implement a rotatable connection between the door plate swing arm and the primary shaft. In this solution, a rotatable connection between the door plate swing arm and the primary shaft is limited to be implemented by fitting between the rotating shaft and the rotating-shaft through hole, and the rotating door plate can be directly connected to the primary shaft reliably and stably, thereby ensuring that the rotating door plate has high motion precision relative to the primary shaft.

In a possible implementation, a second rotating-shaft through hole is provided on each of the first housing and the second housing, and the first housing and the second housing are rotatably connected to the door plate swing arms on the first rotating door plate and the second rotating door plate respectively through a second rotating shaft that passes through a second rotating-shaft through hole. In an implementation, a radial size of the second rotating-shaft through hole on the first housing connecting rod and the second housing connecting rod is respectively greater than a radial size of the corresponding second rotating shaft. In this solution, a manner of movable connection between the door plate swing arm and the first housing and the second housing is limited.

In a possible implementation, the second rotating shaft can move in the second rotating-shaft through hole in a radial direction of the second rotating shaft. The door plate swing arm includes a spring cavity, and a thrust spring is arranged in the spring cavity. One end of the thrust spring abuts against the door plate swing arm, and the other end of the thrust spring abuts against the first housing or the second housing, so that the first housing or the second housing can move in a direction away from the door plate swing arm. In such an embodiment, in the flattened state of the electronic device, the thrust spring can push a corresponding housing connecting rod in the direction away from the door plate swing arm, so that the first housing connecting rod and the second housing connecting rod are far away from each other to a large extent, and then the first housing and the second housing are far away from each other to flatten the bending portion of the flexible display screen as much as possible. In this manner, flatness of the bending portion of the flexible display screen can be improved, thereby improving a light-and-shadow effect of the flexible display screen. In addition, in the folded state of the electronic device, the thrust spring can also push a corresponding housing connecting rod in the direction away from the door plate swing arm, thereby increasing the screen accommodating space.

In a possible implementation, slidable connection between the door plate swing arm and the first housing is implemented by fitting between a sliding block and a sliding slot: or rotatable connection between the door plate swing arm and the first housing is implemented by fitting an arc-shaped arm and an arc-shaped groove. Similarly, the fitting manner provided in this solution may alternatively be used between the door plate swing arm and the second housing.

In a possible implementation, the rotating mechanism includes at least two rotating modules. Each rotating module includes the primary shaft and the door plate swing arm rotatably connected to the primary shaft. The at least two rotating modules are arranged in a length direction of the primary shaft, and a threading space is arranged between adjacent rotating modules. Alternatively, there are at least two rotating mechanisms, arranged along a length direction of the primary shaft, and a threading space is arranged between adjacent rotating mechanisms. The electronic device further includes a flexible circuit board. The flexible circuit board includes a first part, a second part, and a connection part connected between the first part and the second part. The first part is located on one side of the first housing, the second part is located on one side of the second housing, and the connection part is located in the threading space. In this solution, the rotating mechanism is arranged as an architecture of at least two rotating modules. This modular design solution facilitates assembly and design. In addition, a threading space is designed between adjacent rotating modules, and this is also conducive to arrangement of a flexible circuit board of the electronic device.

According to a second aspect, this application provides an electronic device, including a flexible display screen, a first housing, a second housing, and the rotating mechanism provided in any possible implementation of the first aspect. The flexible display screen includes a first non-bending portion, a bending portion, and a second non-bending portion that are sequentially arranged. The first housing connecting rod is fixedly connected to the first housing, and the second housing connecting rod is fixedly connected to the second housing. The rotating mechanism is configured to support a part of the flexible display screen in the flattened state of the electronic device, and accommodate a part of the flexible display screen under a folding apparatus of the electronic device. The first non-bending portion is fixedly connected to the first housing, and the second non-bending portion is fixedly connected to the second housing. The rotation mechanism is configured to support the bending portion in the flattened state and accommodate the bending portion under the folding apparatus.

According to the electronic device provided in this application, because both the first rotating door plate and the second rotating door plate are fixedly connected to the door plate swing arm, it may be considered that in a process of unfolding or folding, both the first rotating door plate and the second rotating door plate move synchronously with the door plate swing arm. Therefore, the first rotating door plate and the second rotating door plate of the folding apparatus provided in this application can directly rotate relative to the primary shaft. A connection relationship between the two rotating door plates and the primary shaft belongs to an architecture of single-stage transmission. Such single-stage transmission improves motion precision of the first rotating door plate and the second rotating door plate. In addition, because the motion precision of the first rotating door plate and the second rotating door plate is high, a stable screen accommodating space can be provided between the first rotating door plate and the second rotating door plate in the folded state of the electronic device. In addition, the first rotating door plate and the second rotating door plate can provide stable support for the bending portion of the flexible display screen in a flattened state of the electronic device, thereby improving reliability of the bending portion of the flexible display screen when being pressed. In addition, because of a single-stage transmission relationship between the first rotating door plate and the primary shaft, and the second rotating door plate and the primary shaft, when the electronic device falls accidentally, the first rotating door plate and the second rotating door plate have small fluttering, to provide stability protection for the flexible display screen, and improve reliability of the electronic device.

In a possible implementation, in the folded state, a first angle is formed between the first rotating door plate and the second rotating door plate. Both the first rotating door plate and the second rotating door plate have no force on the flexible display screen, so that the flexible display screen is in a naturally bent state. In this application, the angle between the first rotating door plate and the second rotating door plate is limited to the first angle in a folded state, so that it can be ensured that both the first rotating door plate and the second rotating door plate exert no force on the flexible display screen, so that the flexible display screen is in a naturally bent state. That is, the flexible display screen is not subject to any pulling force or push force in the bent state. This solution helps improve a service life of the flexible display screen. In a possible implementation, the first rotating door plate is not connected to the flexible display screen, the second rotating door plate is not connected to the flexible display screen, a part of the flexible display screen is in contact with the first rotating door plate, and a part of the flexible display screen is in contact with the second rotating door plate.

In another implementation, the flexible display screen and the two rotating door plates may have a connection relationship, for example, may be bonded by an adhesive. However, in the folded state, a connection position between the flexible display screen and the two rotating door plates is not subject to force, and it can also be ensured that the flexible display screen is naturally bent in a shape of a water drop in a bent state.

In a possible implementation, in the folded state, a second angle is formed between the first rotating door plate and the second rotating door plate. The first rotating door plate is connected to the flexible display screen, and the second rotating door plate is connected to the flexible display screen. The first rotating door plate and the second rotating door plate have a pulling force on the flexible display screen, and a direction of the pulling force is a direction away from a central position of the screen accommodating space. The folding apparatus provided in this solution can provide a large screen accommodating space. Specifically, the first rotating door plate is connected to the flexible display screen, and the second rotating door plate is connected to the flexible display screen. The first rotating door plate and the second rotating door plate have a pulling force on the flexible display screen, and a direction of the pulling force is the direction away from the central position of the screen accommodating space. In this solution, a large bending space may be formed on the flexible display screen in a bent state. It may also be understood that in this solution, a curvature radius of the bending portion of the flexible display screen in a bent state is great and is greater than a curvature radius in a natural bent state. This solution helps ensure a service life of the flexible display screen, so that the electronic device can adapt to different use environments, for example, a harsh environment with a high temperature and high humidity, and the flexible display screen of the electronic device still has a good service life.

In a possible implementation, the first angle is less than the second angle.

The summary provided in this application is used to describe selection of concepts in a simplified form, and is described in detail in the following specific implementations. The summary is not intended to identify key features or main features of the content of this application, nor to limit the scope of the content of this application.

BRIEF DESCRIPTION OF DRAWINGS

The above and other objects, features, and advantages of embodiments of this application will become easy to understand by reading the following detailed description with reference to the accompanying drawings. In the accompanying drawings, several embodiments of this application are shown by example rather than limitation.

FIG. 1 is a schematic diagram of a structure of the electronic device in a flattened state according to an embodiment of this application;

FIG. 2 is a schematic diagram of a structure of the folding apparatus of the electronic device shown in FIG. 1;

FIG. 3 is a schematic diagram of an exploded structure of the electronic device shown in FIG. 1 in a flattened state;

FIG. 4 is a schematic diagram of a structure of the electronic device shown in FIG. 1 in an intermediate state;

FIG. 5 is a schematic diagram of a structure of the folding apparatus of the electronic device shown in FIG. 4;

FIG. 6 is a schematic diagram of an exploded structure of the electronic device shown in FIG. 4 in an intermediate state;

FIG. 7 is a schematic diagram of a structure of the electronic device shown in FIG. 1 in a closed state;

FIG. 8 is a schematic diagram of an exploded structure of the electronic device shown in FIG. 7 in a closed state;

FIG. 9 is a schematic diagram of a structure of a rotating mechanism when the electronic device is in a flattened state according to an embodiment of this application;

FIG. 10 is a schematic diagram of a structure of the rotating mechanism shown in FIG. 9 when the electronic device is in a flattened state and is viewed from another perspective opposite to the perspective in FIG. 9;

FIG. 11 is a schematic diagram of an exploded structure of the rotating mechanism shown in FIG. 9 when the electronic device is in a flattened state;

FIG. 12 is a schematic diagram of an exploded structure of a primary shaft in the rotating mechanism shown in FIG. 11;

FIG. 13 is a schematic diagram of a structure of a primary inner shaft in the primary shaft shown in FIG. 12;

FIG. 14 is a bottom view of the primary inner shaft shown in FIG. 13;

FIG. 15 is a schematic diagram of a local cross-sectional structure of the primary inner shaft shown in FIG. 14 along a section line A1-A1 shown in FIG. 14;

FIG. 16 is a schematic diagram of a locally enlarged primary inner shaft shown in FIG. 13;

FIG. 17 and FIG. 18 are schematic diagrams of a structure of a door plate swing arm that is in the rotating mechanism shown in FIG. 11 and that is viewed from different perspectives;

FIG. 19 is a diagram of a cooperation relationship between the door plate swing arm shown in FIG. 17 and FIG. 18 and the primary inner shaft shown in FIG. 16;

FIG. 20 is a schematic diagram of a partial structure of the rotating mechanism shown in FIG. 9 when the electronic device is in a flattened state;

FIG. 21 is a schematic diagram of a partial exploded structure of the rotating mechanism shown in FIG. 9 when the electronic device is in a flattened state;

FIG. 22 and FIG. 23 are schematic diagrams of a structure of a first housing connecting rod that is in the rotating mechanism shown in FIG. 21 and that is viewed from different perspectives;

FIG. 24 is a schematic diagram of a local cross-sectional structure of the first housing connecting rod shown in FIG. 22 along a section line A4-A4 shown in FIG. 22;

FIG. 25 is a schematic diagram of a structure of a door plate swing arm in the rotating mechanism shown in FIG. 21;

FIG. 26 is a schematic diagram of a structure of a synchronous damping member in the rotating mechanism shown in FIG. 21 when the electronic device is in a flattened state;

FIG. 27 is a schematic diagram of an exploded structure of the synchronous damping member shown in FIG. 26;

FIG. 28 is a schematic diagram of a structure of a first conjoined cam in the synchronous damping member shown in FIG. 27;

FIG. 29 is a schematic diagram of a partial structure of the rotating mechanism shown in FIG. 20 when the electronic device is in a folded state;

FIG. 30 is a schematic diagram of a structure of a first rotating door plate, a second rotating door plate, and a lifting plate in the rotating mechanism shown in FIG. 11 when the electronic device is in a flattened state;

FIG. 31 is a schematic diagram of an exploded structure of a lifting plate and related mounting components in the rotating mechanism shown in FIG. 11;

FIG. 32 is a bottom view of a primary shaft, a lifting plate, and a synchronous damping member when the electronic device is in a flattened state;

FIG. 33 is a schematic diagram of a local cross-sectional structure of the primary shaft, the lifting plate, and the synchronous damping member shown in FIG. 32 along a section line A2-A2 shown in FIG. 32;

FIG. 34 is a schematic diagram of a partial structure of the rotating mechanism shown in FIG. 9 when the electronic device is in a flattened state;

FIG. 35 is a bottom view of a primary inner shaft and a lifting plate of a rotating mechanism when the electronic device is in a flattened state;

FIG. 36 is a schematic diagram of a local cross-sectional structure of the primary inner shaft and the lifting plate shown in FIG. 35 along a section line A3-A3 shown in FIG. 35;

FIG. 37 is a schematic diagram of a structure of the rotating mechanism shown in FIG. 9 when the electronic device is in a folded state;

FIG. 38 is a schematic diagram of a partial structure of the rotating mechanism shown in FIG. 37 when the electronic device is in a folded state;

FIG. 39 is a bottom view of a primary inner shaft and a lifting plate of a rotating mechanism when the electronic device is in a folded state;

FIG. 40 is a schematic diagram of a local cross-sectional structure of the primary inner shaft and the lifting plate shown in FIG. 39 along a section line A5-A5 shown in FIG. 39;

FIG. 41 is a schematic diagram of a structure of a rotating mechanism and a flexible display screen when the electronic device is in a folded state;

FIG. 42 is a schematic diagram of a structure of the rotating mechanism shown in FIG. 9 when the electronic device is in an intermediate state;

FIG. 43 is a schematic diagram of a partial structure of the rotating mechanism shown in FIG. 42 when the electronic device is in an intermediate state;

FIG. 44 is a three-dimensional diagram of a rotating mechanism of a folding apparatus of an electronic device in a direction according to an implementation of this application;

FIG. 45 is a three-dimensional diagram of a rotating mechanism of a folding apparatus of an electronic device in another direction according to an implementation of this application;

FIG. 46 is an exploded view of a rotating mechanism of a folding apparatus of an electronic device in a direction according to an implementation of this application;

FIG. 47 is an exploded view of a rotating mechanism of a folding apparatus of an electronic device in another direction according to an implementation of this application;

FIG. 48 is an exploded view of a rotating module in a folding apparatus in a direction according to an implementation;

FIG. 49 is an exploded view of a rotating module in a folding apparatus in another direction according to an implementation;

FIG. 50 is a cross-sectional view of a rotating mechanism of a folding apparatus of an electronic device in a flattened state according to an implementation of this application;

FIG. 51 is a cross-sectional view of a rotating mechanism of a folding apparatus of an electronic device in a flattened state according to an implementation of this application;

FIG. 52 is a three-dimensional diagram of a rotating mechanism of a folding apparatus of an electronic device in a folded state according to an implementation of this application;

FIG. 53 is a cross-sectional view of a rotating mechanism of a folding apparatus of an electronic device in a folded state according to an implementation of this application;

FIG. 54 is a cross-sectional view of a rotating mechanism of a folding apparatus of an electronic device in a folded state according to an implementation of this application;

FIG. 55 is a three-dimensional diagram of a rotating mechanism of a folding apparatus of an electronic device in a direction according to an implementation of this application;

FIG. 56 is a three-dimensional diagram of a rotating mechanism of a folding apparatus of an electronic device in another direction according to an implementation of this application;

FIG. 57 is an exploded view of a rotating mechanism of a folding apparatus of an electronic device in a direction according to an implementation of this application:

FIG. 58 is an exploded view of a rotating mechanism of a folding apparatus of an electronic device in another direction according to an implementation of this application;

FIG. 59 is an exploded view of a rotating module in a folding apparatus in a direction according to an implementation;

FIG. 60 is an exploded view of a rotating module in a folding apparatus in another direction according to an implementation;

FIG. 61 is a cross-sectional view of a rotating mechanism of a folding apparatus of an electronic device according to an implementation of this application;

FIG. 62 is a cross-sectional view of a rotating mechanism of a folding apparatus of an electronic device according to an implementation of this application;

FIG. 63 is a three-dimensional diagram of a rotating mechanism of a folding apparatus of an electronic device in a folded state according to an implementation of this application;

FIG. 64 is a cross-sectional view of a rotating mechanism of a folding apparatus of an electronic device in a folded state according to an implementation of this application;

FIG. 65 is a cross-sectional view of a rotating mechanism of a folding apparatus of an electronic device in a folded state according to an implementation of this application;

FIG. 72 is a three-dimensional diagram of a rotating mechanism of a folding apparatus of an electronic device in a direction according to an implementation of this application;

FIG. 73 is a three-dimensional diagram of a rotating mechanism of a folding apparatus of an electronic device in another direction according to an implementation of this application;

FIG. 74 is an exploded view of a rotating mechanism of a folding apparatus of an electronic device in a direction according to an implementation of this application; and FIG. 75 is an exploded view of a rotating mechanism of a folding apparatus of an electronic device in another direction according to an implementation of this application.

In the accompanying drawings, same or corresponding reference numerals represent same or corresponding parts.

DESCRIPTION OF EMBODIMENTS

Explanation of Some Terms

Figure 1:
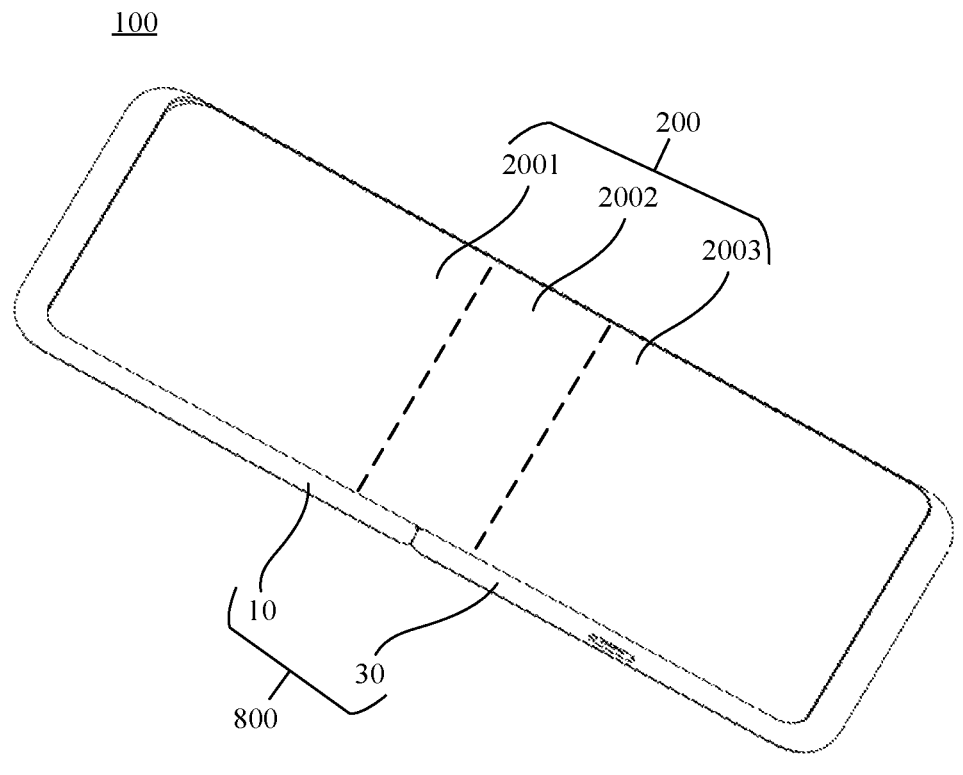
FIG. 1 to FIG. 43 are schematic diagrams of an electronic device and a folding apparatus according to an implementation of this application.

Parallel: Parallel defined in this application is not limited to absolutely parallel. The definition of parallel may be understood as basically parallel. It is allowed to be not absolutely parallel due to factors such as an assembly tolerance, a design tolerance, and structural flatness. These cases cause a sliding mating portion and a first door plate not to be absolutely parallel. However, such a case is also defined as absolutely parallel in this application.

Perpendicular: Perpendicular defined in this application is not limited to an absolute perpendicular intersection relationship (an angle is 90 degrees). It is allowed to be not absolutely perpendicular intersection relationship due to factors such as an assembly tolerance, a design tolerance, and structural flatness, and an error within a small angle range is allowed. For example, an assembly error within a range of 80 degrees to 100 degrees may be understood as a perpendicular relationship.

Flattened state: A flattened state may be understood as that an angle between a first planar region and a second planar region of an electronic device is close to 180 degrees, and an absolute 180-degree angle relationship is not limited between the first planar region and the second planar region. It is allowed that an angle between the first planar region and the second planar region is not equal to 180 degrees due to factors such as an assembly tolerance, a design tolerance, and structural flatness. For example, an angle greater than 180 degrees, such as 183 degrees, or an angle less than 180 degrees, such as 178 degrees.

Folded state: A folded state may be understood as that the first planar region and the second planar region of the electronic device are in a nearly parallel stacking relationship, which is not limited to an absolute parallel relationship. Refer to the foregoing definition of parallel.

The following describes technical solutions of this application with reference to accompanying drawings. It is clear that the described embodiments are merely some but not all of embodiments of this application.

In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

Terms "first", "second", and the like mentioned below are merely intended for a purpose of description, and shall not be understood as an indication or implication of relative importance or implicit indication of a quantity of indicated technical features. Therefore, a feature limited by "first", "second", and the like may explicitly or implicitly include one or more features.

In addition, in this application, directional terms such as "center", "front", "rear". "inside", and "outside" are defined relative to directions or positions of components schematically placed in the accompanying drawings. It should be understood that these directional terms are relative concepts and are used for relative description and clarification, and are not used to indicate or imply that an indicated apparatus or component needs to have a specified direction or be constructed and operated in a specified direction. The terms may change accordingly with directions in which components in the accompanying drawings are placed, and therefore cannot be construed as a limitation of this application.

It should further be noted that in embodiments of this application, a same reference numeral indicates a same component or a same part. For same parts in embodiments of this application, only one part or component marked with a reference numeral may be used as an example in the figure. It should be understood that the reference numeral is also applicable to another same part or component.

Embodiments of this application provide a folding apparatus and an electronic device. The electronic device includes a folding apparatus and a flexible display screen fastened to the folding apparatus. The folding apparatus may be unfolded to a flattened state (also referred to as an unfolded state), or may be folded to a closed state (also referred to as a folded state), or may be in an intermediate state between the flattened state and the closed state. There are a plurality of continuous intermediate states between the flattened state and the closed state. The flexible display screen is unfolded and folded with the folding apparatus.

FIG. 1 to FIG. 43 are schematic diagrams of an electronic device, a folding apparatus, and a rotating mechanism according to an implementation of this application. The electronic device provided in this implementation is an architecture with a flexible display folded inward, and is a two-door plate architecture. Specifically, a notch is provided on each door plate, and the notches form a hollow: In an implementation, a lifting plate may be arranged at a position of the hollow: so that the lifting plate and the two door plates jointly support the flexible display. The electronic device provided in this implementation is described in detail as follows.

Figure 2:
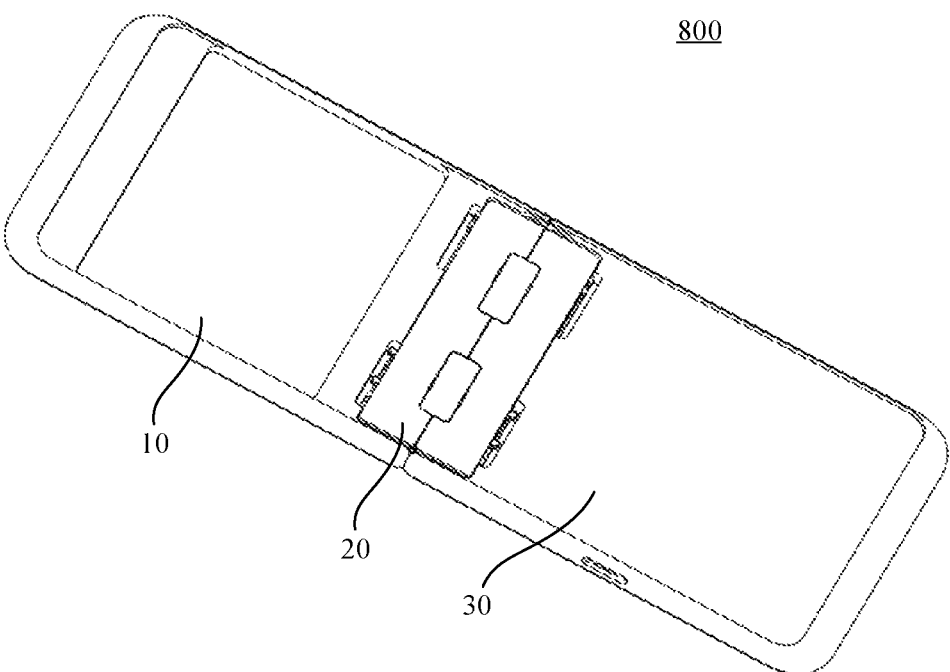
Figure 3:
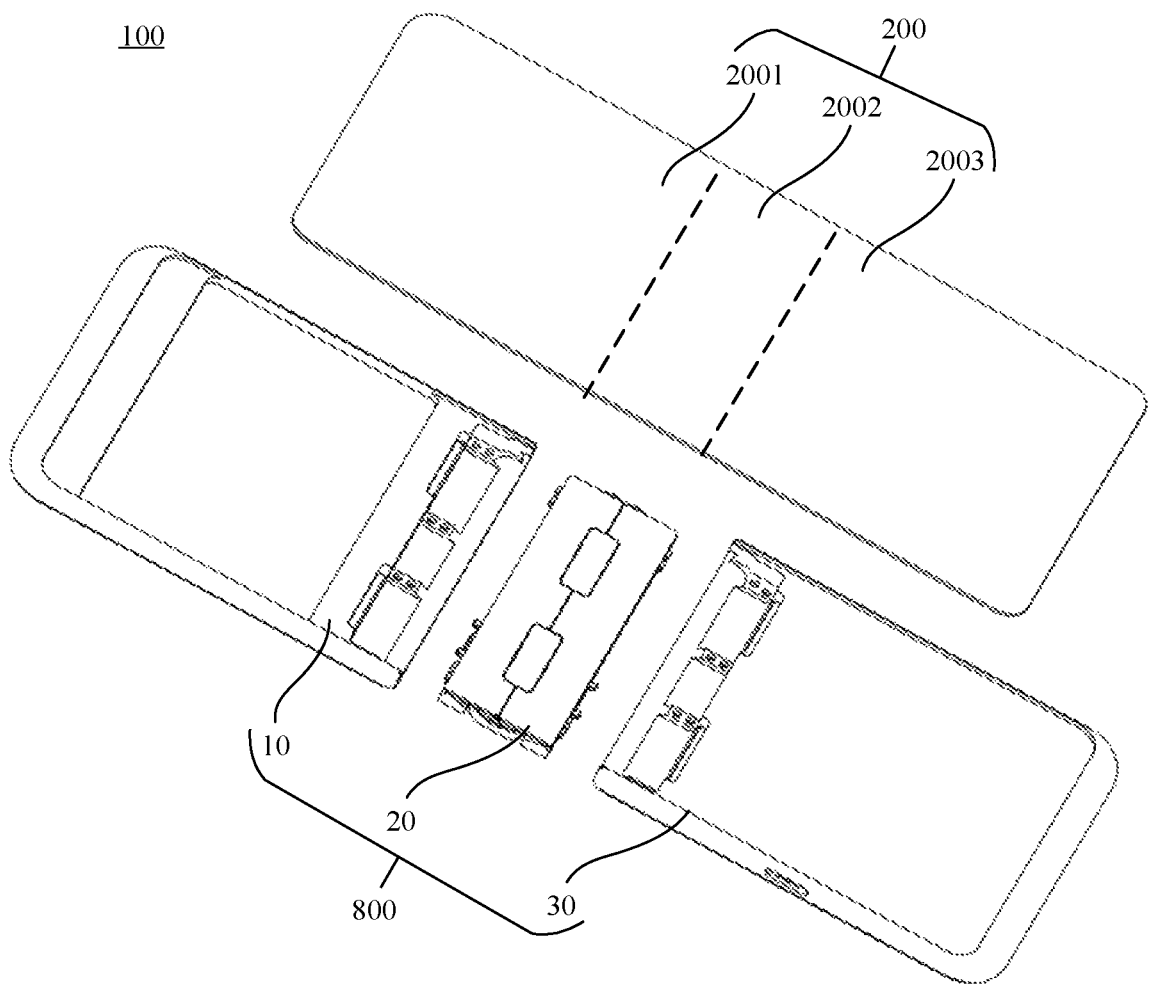
Figure 4:
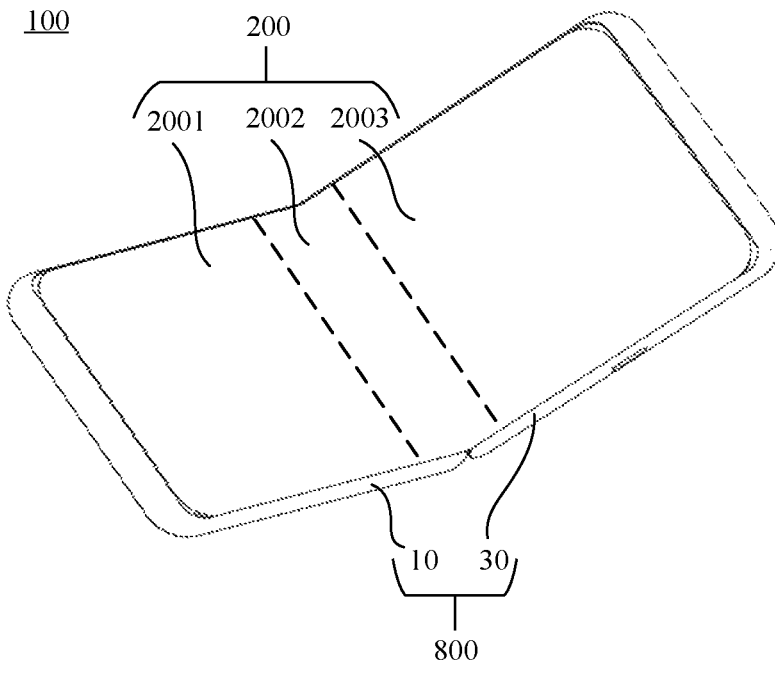
Figure 5:
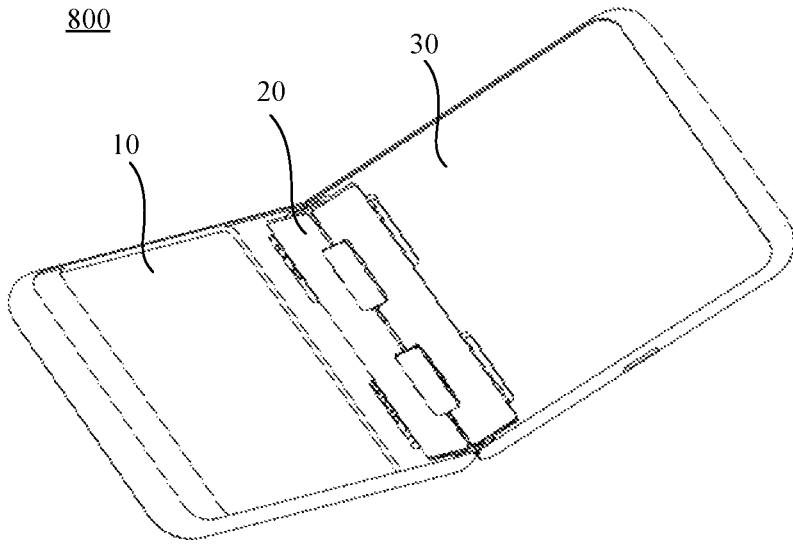
Figure 6:
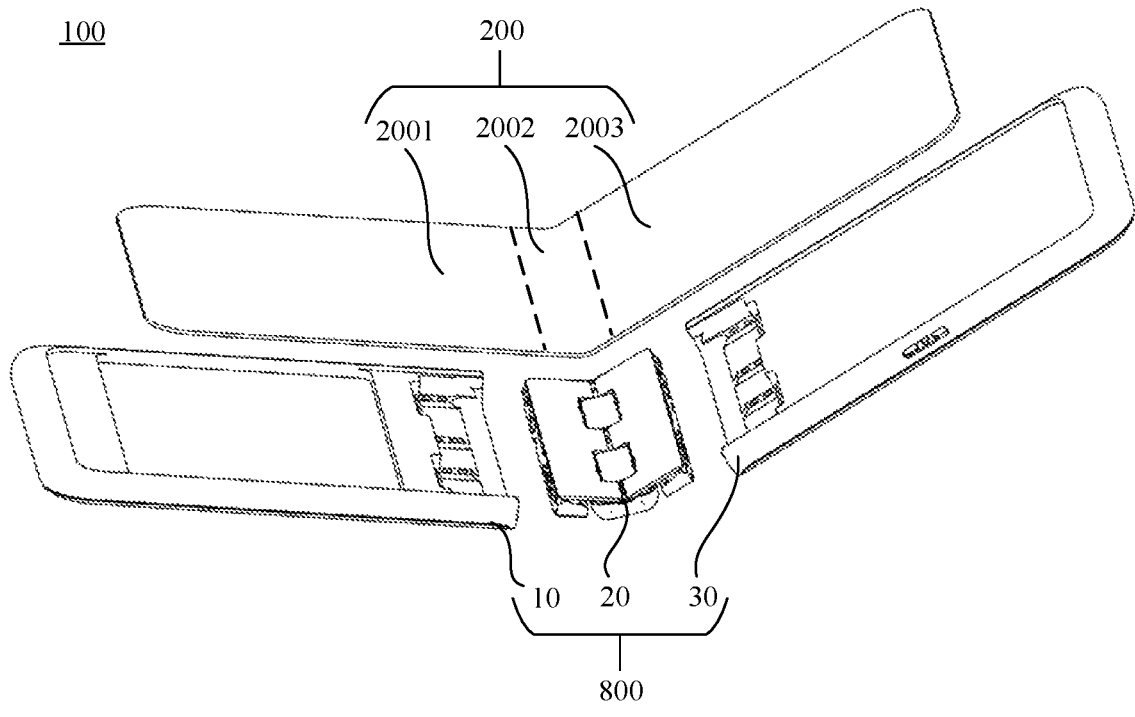
Figure 7:
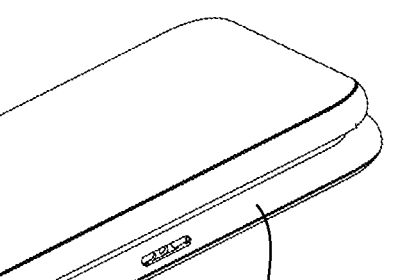
Figure 8:
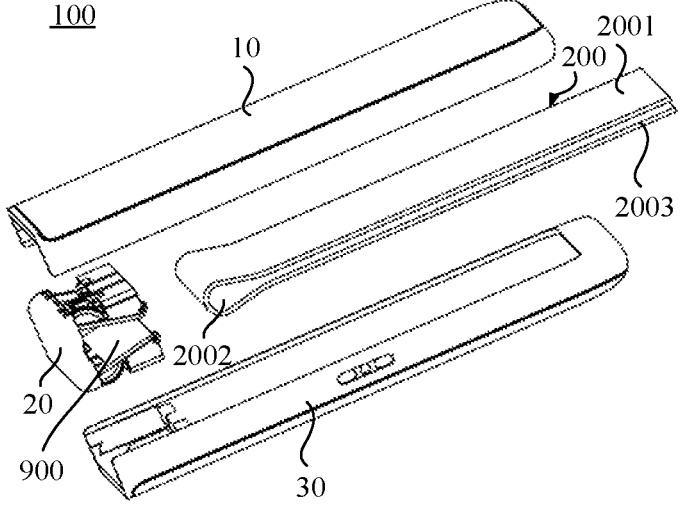

Refer to FIG. 1 to FIG. 8. FIG. 1 is a schematic diagram of a structure of an electronic device 100 in a flattened state according to an embodiment of this application. FIG. 2 is a schematic diagram of a structure of a folding apparatus 800 of the electronic device 100 shown in FIG. 1 in a flattened state. FIG. 3 is a schematic diagram of an exploded structure of the electronic device 100 shown in FIG. 1 in a flattened state. FIG. 4 is a schematic diagram of a structure of the electronic device 100 shown in FIG. 1 in an intermediate state. FIG. 5 is a schematic diagram of a structure of a folding apparatus 800 of the electronic device 100 shown in FIG. 4 in an intermediate state. FIG. 6 is a schematic diagram of an exploded structure of the electronic device 100 shown in FIG. 4 in an intermediate state. FIG. 7 is a schematic diagram of a structure of the electronic device 100 shown in FIG. 1 in a closed state. FIG. 8 is a schematic diagram of an exploded structure of the electronic device 100 shown in FIG. 7 in a closed state. The electronic device 100 may be a product such as a mobile phone, a tablet computer, or a notebook computer. This embodiment is described by using an example in which the electronic device 100 is a mobile phone.

The electronic device 100 includes the folding apparatus 800 and a flexible display screen 200. The folding apparatus 800 includes a first housing 10, a rotating mechanism 20, and a second housing 30 that are sequentially connected. The first housing 10 may include a middle frame and a rear cover, and the second housing 30 may include a middle frame and a rear cover. The rotating mechanism 20 can deform, to enable the first housing 10) and the second housing 30 to rotate around the rotating mechanism 20, so that the electronic device 100 is in a flattened state, an intermediate state, or a closed state. As shown in FIG. 1 to FIG. 3, the first housing 10 and the second housing 30 can be unfolded relative to each other to a flattened state, so that the electronic device 100 is in the flattened state. For example, when the first housing 10 and the second housing 30 are in the flattened state, an angle between the first housing 10 and the second housing 30 may be approximately 180° (a small deviation, for example. 166°. 178°, or 184°, is also allowed). As shown in FIG. 4 to FIG. 6, the first housing 10 and the second housing 30 can be rotated (unfolded or folded) relative to each other to an intermediate state, so that the electronic device 100 is in the intermediate state. As shown in FIG. 7 and FIG. 8, the first housing 10) and the second housing 30 can be folded relative to each other to a closed state, so that the electronic device 100 is in the closed state. The intermediate state shown in FIG. 4 to FIG. 6 may be any state between the flattened state and the closed state. Therefore, the electronic device 100 can be switched between the flattened state and the closed state by deformation of the rotating mechanism 20.

The flexible display screen 200 is fastened to the folding apparatus 800, to be unfolded or folded with the folding apparatus 800. For example, the flexible display screen 200 may be bonded to the folding apparatus 800 by an adhesive layer. The flexible display screen 200 includes a first non-bending portion 2001, a bending portion 2002, and a second non-bending portion 2003 that are sequentially arranged. The first non-bending portion 2001 of the flexible display screen 200 is fastened to the first housing 10, and the second non-bending portion 2003 is fastened to the second housing 30. When the first housing 10 and the second housing 30 are folded or unfolded relative to each other, the bending portion

2002 is deformed. As shown in FIG. 1 to FIG. 3, when the first housing 10 and the second housing 30 are in the flattened state, the rotating mechanism 20 is basically flush with the first housing 10 and the second housing 30. In this case, the bending portion 2002 is supported by the rotating mechanism 20, and the flexible display screen 200 is in a flattened form and can display in full screen, so that the electronic device 100 has a large display area, thereby improving viewing experience of a user. As shown in FIG. 4 to FIG. 6, when the first housing 10 and the second housing 30 are in an intermediate state, the bending portion 2002 is bent, and the flexible display screen 200 is in an intermediate form between a flattened form and a closed form. As shown in FIG. 7 and FIG. 8, when the first housing 10 and the second housing 30 are in the closed state, the flexible display screen 200 is in a closed form. In this case, the bending portion 2002 approximately in a shape of a water drop is accommodated in a screen accommodating space 900 enclosed by the rotating mechanism 20. A specific forming manner of the screen accommodating space 900 is described in detail below:

In some embodiments, the flexible display screen 200 is configured to display an image. For example, the flexible display screen 200 may be an organic light-emitting diode (Organic Light-Emitting Diode. OLED) display, an active-matrix organic light-emitting diode or an active-matrix organic light-emitting diode (Active-Matrix Organic Light-Emitting Diode. AMOLED) display: a mini light-emitting diode (Mini Organic Light-Emitting Diode) display, a micro light-emitting diode (Micro Organic Light-Emitting Diode) display, a micro organic light-emitting diode (Micro Organic Light-Emitting Diode) display, or a quantum dot light-emitting diode (Quantum Dot Light-Emitting Diodes, QLED) display.

In some embodiments, the electronic device 100 may further include a plurality of modules (not shown in the figure). The plurality of modules may be accommodated inside the folding apparatus 800, for example, accommodated inside the first housing 10 and the second housing 30. The plurality of modules of the electronic device 100 may include, but are not limited to, a main board, a processor, a memory, a battery, a camera module, a receiver module, a speaker module, a microphone module, an antenna module, a sensor module, and the like. A quantity, a type, a position, and the like of the modules of the electronic device 100 are not specifically limited in this embodiment of this application.

It may be understood that when the user holds the electronic device 100, a position of the receiver module of the electronic device 100 may be defined as an upper edge of the electronic device 100, a position of the microphone module of the electronic device 100 may be defined as a lower edge of the electronic device 100, and two sides of the electronic device 100 that are held by the left hand and the right hand of the user may be defined as left and right edges of the electronic device 100. In some embodiments, the electronic device 100 can be folded in half from bottom to top. In some other embodiments, the electronic device 100 can be folded in half from left to right.

An example of a structure of the rotating mechanism 20 provided in an embodiment of this application is described below in detail with reference to the accompanying drawings.

Figure 9:
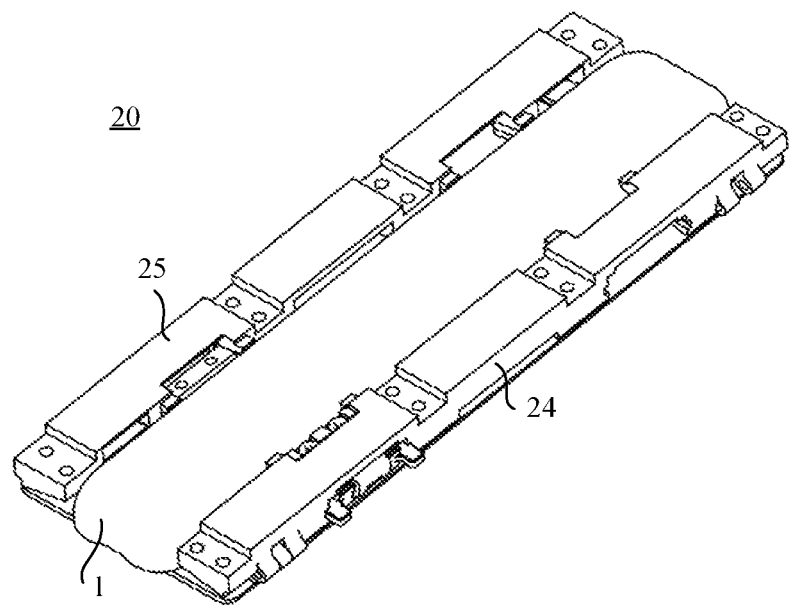
Figure 10:
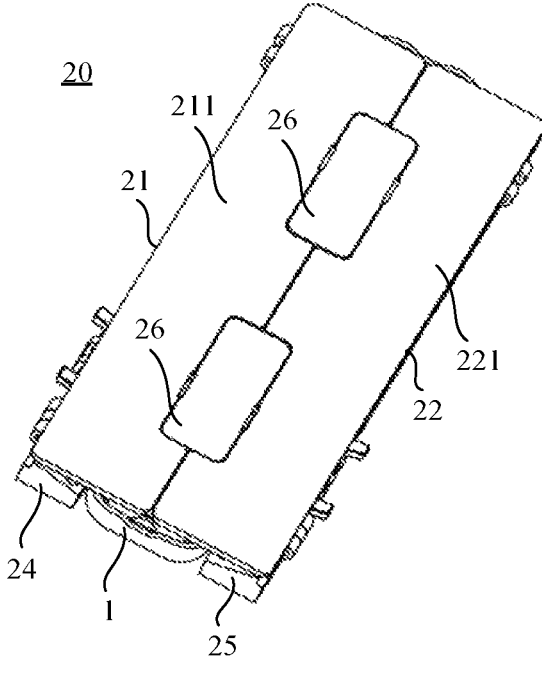
Figure 11:
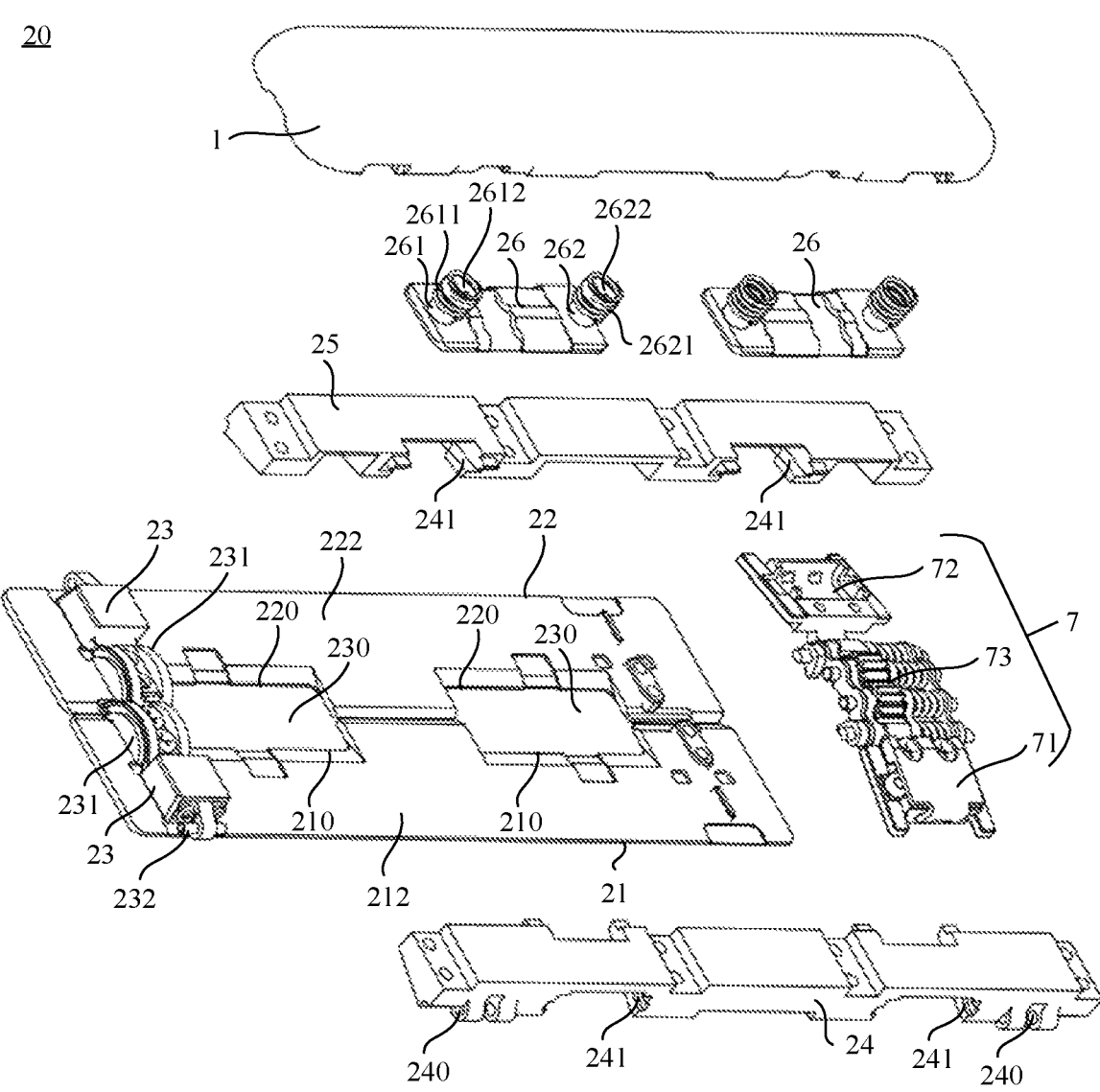

Refer to FIG. 9 to FIG. 11 first. FIG. 9 is a schematic diagram of a structure of a rotating mechanism 20 when an electronic device 100 is in a flattened state according to an embodiment of this application. FIG. 10 is a schematic diagram of a structure of the rotating mechanism 20 shown in FIG. 9 when an electronic device 100 is in a flattened state viewed from another perspective opposite to that of FIG. 9. FIG. 11 is a schematic diagram of an exploded structure of the rotating mechanism 20 shown in FIG. 9 when the electronic device 100 is in a flattened state.

In some embodiments, as shown in FIG. 9, the rotating mechanism 20 includes a primary shaft 1, a first housing connecting rod 24, and a second housing connecting rod 25. A rotation axis of an entire rotating mechanism 20 is parallel to an axial direction of the primary shaft 1 (which may also be understood as a length direction of the primary shaft 1), and the primary shaft 1 extends in the axial direction. When the electronic device 100 is in the flattened state, the first housing connecting rod 24 and the second housing connecting rod 25 are respectively located on two opposite sides of the primary shaft 1. The first housing connecting rod 24 and the second housing connecting rod 25 are symmetrically distributed relative to the primary shaft 1, that is, the first housing connecting rod 24 and the second housing connecting rod 25 are symmetrically arranged on two sides of the primary shaft 1, and structures of the two may be the same. According to the perspective shown in FIG. 9, the first housing connecting rod 24 may be considered as located on a right side of the primary shaft 1, the second housing connecting rod 25 may be considered as being located on a left side of the primary shaft 1, a side (visible in FIG. 9) of the primary shaft 1 facing away from the flexible display screen 200 may be considered as a top side of the primary shaft 1, and a side (not visible in FIG. 9) of the primary shaft 1 facing the flexible display screen 200 may be considered as a bottom side of the primary shaft 1. The definitions of the right side, the left side, the top side, and the bottom side herein are merely for ease of describing the structure of the rotating mechanism 20, and are not intended to impose any strict limitation on the rotating mechanism 20.

The first housing connecting rod 24 is configured to be fixedly connected to the first housing 10, and the second housing connecting rod 25 is configured to be fixedly connected to the second housing 30. The first housing connecting rod 24 and the second housing connecting rod 25 may be respectively connected to the first housing 10 and the second housing 30 by a fastener. The fastener includes, but is not limited to, a screw; a bolt, a rivet, a pin, and the like. The folding apparatus 800 shown in FIG. 2 may be obtained by connecting the first housing 10 and the second housing 30 to the first housing connecting rod 24 and the second housing connecting rod 25 respectively. Because the first housing connecting rod 24 and the first housing 10 are fastened to each other, the first housing 10 and the first housing connecting rod 24 move synchronously. The rotating mechanism 20 can control a moving track of the first housing 10 by controlling a moving track of the first housing connecting rod 24. In some other embodiments, another connection structure (for example, a slidable connection or a rotatable connection, where a relative position and posture between the first housing connecting rod 24 and the first housing 10 in an unfolding or a closing process may be adjusted through the slidable connection and the rotatable connection) may alternatively be formed between the first housing connecting rod 24 and the first housing 10. This is not strictly limited in this application. Similarly, because the second housing connecting rod 25 and the second housing 30 are fastened to each other, the second housing 30 and the second housing connecting rod 25 move synchronously. The rotating mechanism 20 can control a moving track of the second housing 30 by controlling a moving track of the second housing connecting rod 25. In some other embodiments, another connection structure (for example, a slidable connection or a rotatable connection, where a relative position and posture between the second housing connecting rod 25 and the second housing 30 in an unfolding or a closing process may be adjusted through the slidable connection and the rotatable connection) may alternatively be formed between the second housing connecting rod 25 and the second housing 30. This is not strictly limited in this application.

In some embodiments, as shown in FIG. 10, the rotating mechanism 20 further includes a first rotating door plate 21 and a second rotating door plate 22. The first rotating door plate 21 and the second rotating door plate 22 are arranged on a bottom side of the primary shaft 1 (that is, a side of the primary shaft facing the flexible display screen 200). The first rotating door plate 21 includes a first support surface 211 facing away from the primary shaft 1, and the second rotating door plate 22 includes a second support surface 221 facing away from the primary shaft 1. When the electronic device 100 is in the flattened state, the first support surface 211 and the second support surface 221 are basically flush with each other, and can jointly support the bending portion 2002 of the flexible display screen 200. As shown in FIG. 11, the first rotating door plate 21 further includes a first mounting surface 212 facing away from the first support surface 211, and the second rotating door plate 22 further includes a second mounting surface 222 facing away from the second support surface 221. A door plate swing arm 23 is arranged on each of the first mounting surface 212 and the second mounting surface 222.

Refer to FIG. 10 and FIG. 11. In an implementation, in the flattened state, a plurality of straight-line seams are formed at a joint between the first rotating door plate 21 and the second rotating door plate 22, and two adjacent straight-line seams of the plurality of straight-line seams are spaced apart.

The door plate swing arm 23 includes a first rotating portion 231. The first rotating portion 231 is configured to be rotatably connected to the primary shaft 1, so that the first rotating door plate 21 and the second rotating door plate 22 can rotate relative to the primary shaft 1. The door plate swing arm 23 may be fixedly connected to the first rotating door plate 21 and the second rotating door plate 22 by a fastener. The fastener includes, but is not limited to, a screw; a bolt, a rivet, a pin, and the like. The door plate swing arm 23 may alternatively be bonded to the first rotating door plate 21 and the second rotating door plate 22 by an adhesive layer. The door plate swing arm 23 may alternatively be integrally formed with the first rotating door plate 21 and the second rotating door plate 22. A specific arrangement manner of the door plate swing arm 23, the first rotating door plate 21, and the second rotating door plate 22 is not strictly limited in this embodiment of this application.

In FIG. 11, only one door plate swing arm 23 is shown on each of the first rotating door plate 21 and the second rotating door plate 22, and is arranged near an end of the rotating door plate. It should be understood that such an arrangement is merely used as an example, and is not intended to limit the scope of this application. In some embodiments, a plurality of door plate swing arms 23 may be arranged on each of the first rotating door plate 21 and the second rotating door plate 22. For example, a door plate swing arm 23 may be arranged at each of two ends close to each rotating door plate. Each of the first rotating door plate 21 and the second rotating door plate 22 is connected to the primary shaft 1 by using the plurality of door plate swing arms 23, so that stability and reliability of a rotatable connection between the rotating door plate and the primary shaft 1 can be improved. In some embodiments, instead of being arranged close to ends of the first rotating door plate 21 and the second rotating door plate 22, the door plate swing arm 23 may be arranged at other positions on the first rotating door plate 21 and the second rotating door plate 22, for example, arranged at a position close to a middle portion of the first rotating door plate 21 and the second rotating door plate 22. In this embodiment of this application, a quantity and arranged positions of door plate swing arms 23 on each of the first rotating door plate 21 and the second rotating door plate 22 are not strictly limited.

Figure 12:
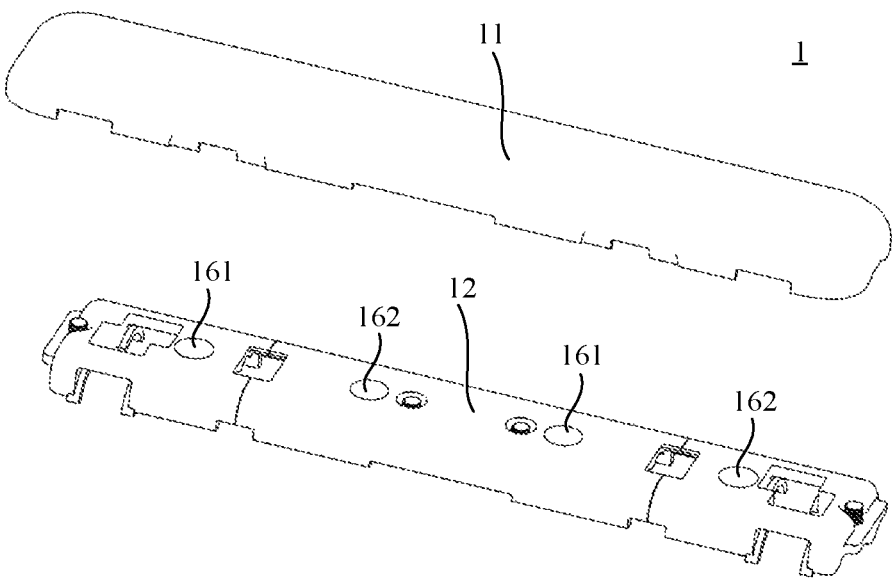
Figure 13:
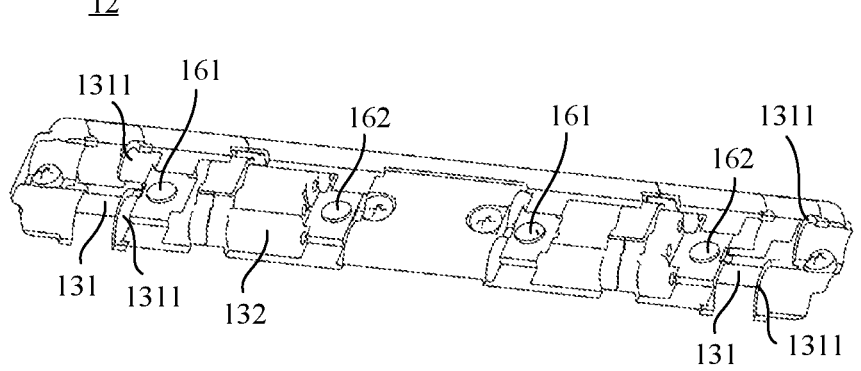
Figure 14:
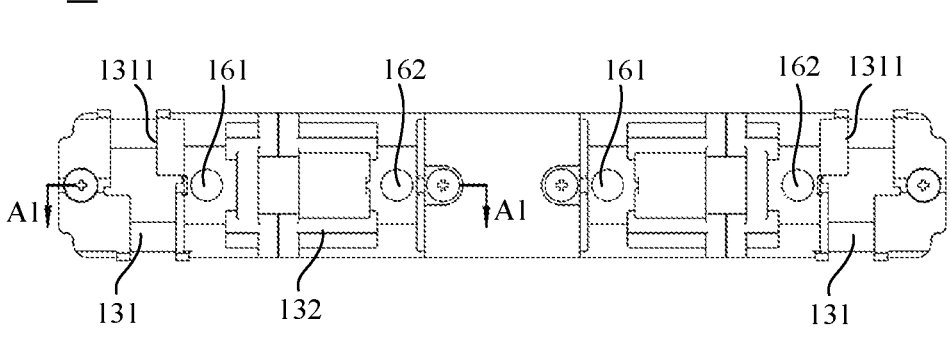
Figure 15:
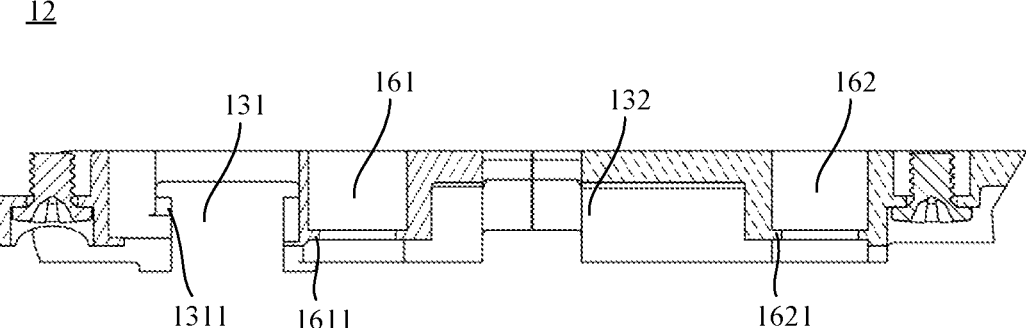
Figure 16:
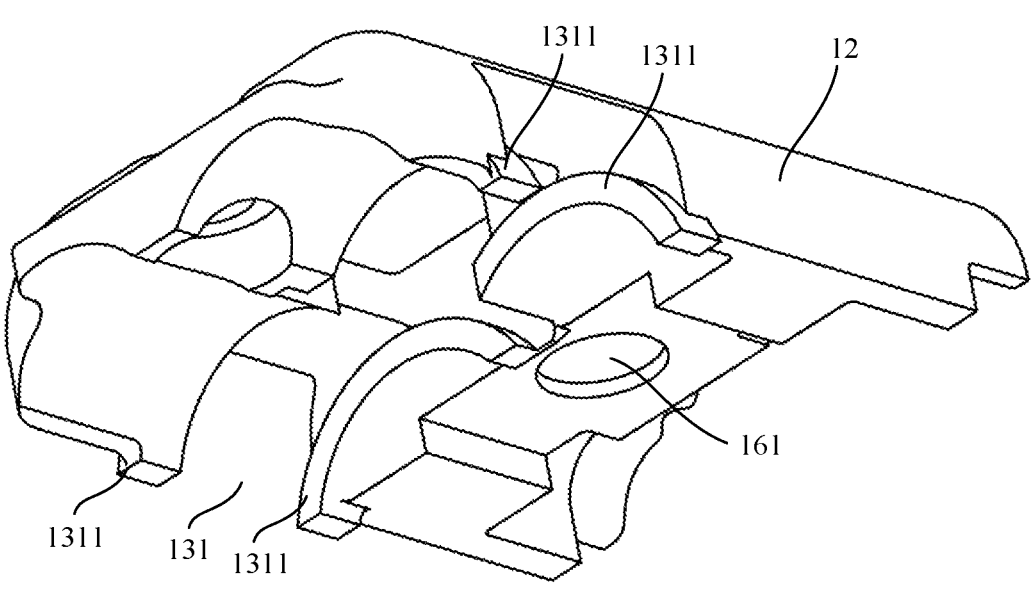

In some embodiments, as shown in FIG. 11, the rotating mechanism 20 further includes at least one synchronous damping member 7. A specific structure of the synchronous damping member 7 and a relative arrangement of the synchronous damping member 7 and other components in the rotating mechanism 20 are described in detail below. In some embodiments, as shown in FIG. 10 and FIG. 11, the rotating mechanism 20 further includes at least one lifting plate 26. A specific structure of the lifting plate 26 and a relative arrangement of the lifting plate 26 and other components in the rotating mechanism 20 are described in detail below:

Next, an example of a structure of the primary shaft is described with reference to FIG. 12 to FIG. 16. FIG. 12 is a schematic diagram of an exploded structure of a primary shaft 1 in the rotating mechanism 20 shown in FIG. 11. FIG. 13 is a schematic diagram of a structure of a primary inner shaft 12 in the primary shaft 1 shown in FIG. 12. FIG. 14 is a bottom view of the primary inner shaft 12 shown in FIG. 13. FIG. 15 is a schematic diagram of a local cross-sectional structure of the primary inner shaft 12 shown in FIG. 14 along a section line A1-A1 shown in FIG. 14. FIG. 16 is a schematic diagram of a locally enlarged primary inner shaft 12 shown in FIG. 13.

In some embodiments, as shown in FIG. 12, the primary shaft 1 includes a top cover 11 and a primary inner shaft 12. The top cover 11 can cover the primary inner shaft 12 to protect the primary inner shaft 12 and provide a clean appearance for the primary shaft 1. The top cover 11 can be connected to the primary inner shaft 12 by a fastener. The fastener includes, but is not limited to, a screw: a bolt, a rivet, a pin, and the like. The primary inner shaft 12 is a functional part of the primary shaft 1, and is configured to connect a plurality of connection components of the rotating mechanism 20, for example, the door plate swing arm 23 described above and some other components to be described below: It should be understood that, including the top cover 11 and the primary inner shaft 12 is merely an example of an implementation of the primary shaft 1. In another embodiment, the primary shaft 1 may alternatively be formed in another form, provided that the primary shaft 1 can provide a required connection function.

As shown in FIG. 13 to FIG. 16, a second rotating portion 131 is arranged on the primary inner shaft 12. The second rotating portion 131 is configured to be rotatably connected to the first rotating portion 231 of the door plate swing arm 23 shown in FIG. 11, to connect the first rotating door plate 21 and the second rotating door plate 22 to the primary shaft 1. By using such arrangement, the first rotating door plate 21 and the second rotating door plate 22 can directly rotate relative to the primary shaft 1 by the door plate swing arm 23. Such single-stage transmission improves motion precision of the rotating door plate. In addition, because the rotating door plate has high motion precision, a deviation of an angle between the first rotating door plate 21 and the second rotating door plate 22 is small in a folded state of the electronic device 100, so that a stable screen accommodating space 900 can be provided. In addition, because the rotating door plate is directly rotatably connected to the primary shaft 1 by the door plate swing arm 23, the first rotating door plate 21 and the second rotating door plate 22 can provide stable support for the bending portion 2002 of the flexible display screen 200 in the flattened state of the electronic device 100, thereby improving reliability of the bending portion 2002 of the flexible display screen 200 when being pressed. In addition, because the rotating door plate is directly rotatably connected to the primary shaft 1 by the door plate swing arm 23, when the electronic device 100 falls accidentally, the rotating door plate has small fluttering, so that stability protection can be provided for the flexible display screen 200, and reliability of the electronic device 100 is improved.

Figure 17:
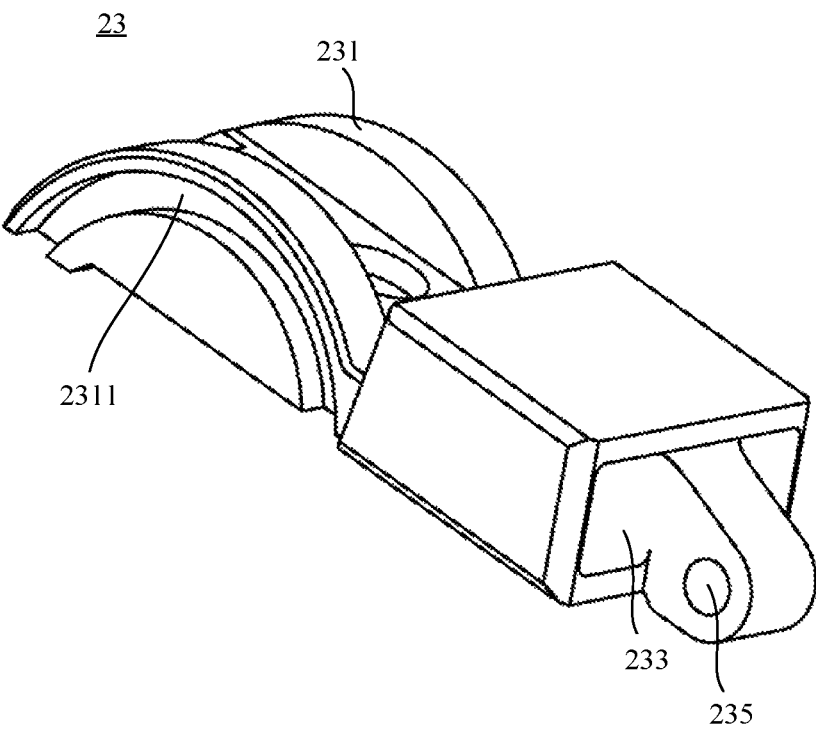
Figure 18:
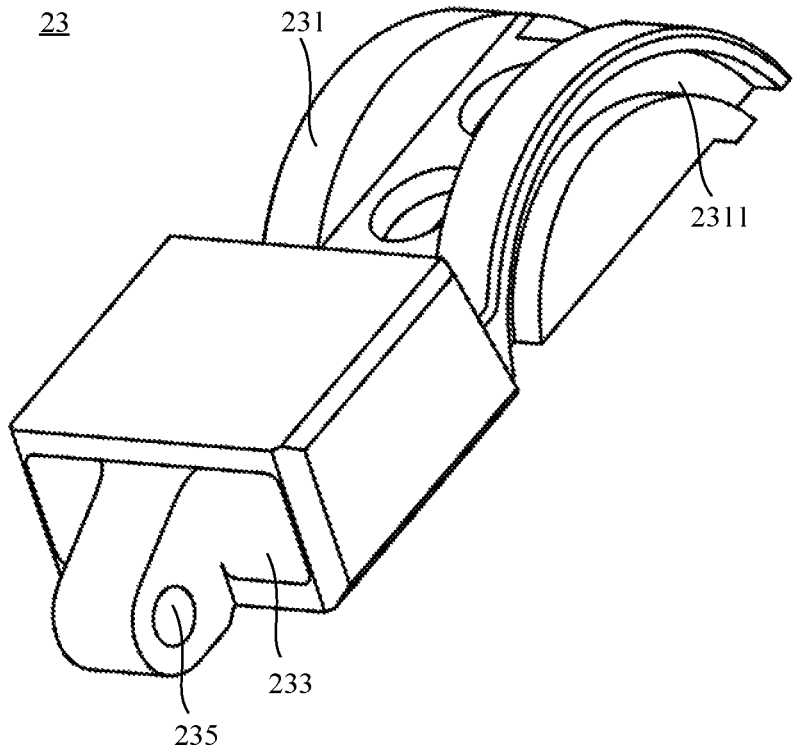
Figure 19:
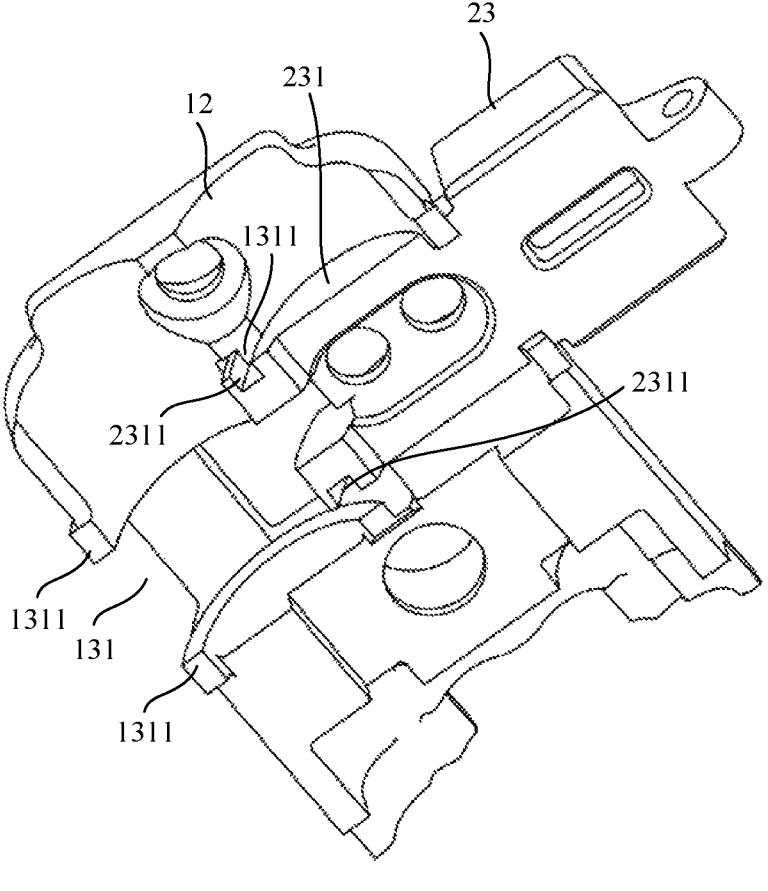

Next, a cooperation relationship between the door plate swing arm 23 and the primary shaft 1 is described based on FIG. 12 to FIG. 16 with reference to FIG. 17 to FIG. 19. FIG. 17 and FIG. 18 are schematic diagrams of a structure of a door plate swing arm 23 that is in the rotating mechanism 20 shown in FIG. 11 and that is viewed from different perspectives. FIG. 19 is a diagram of a cooperation relationship between the door plate swing arm 23 shown in FIG. 17 and FIG. 18 and the primary inner shaft 12 shown in FIG. 16.

In some embodiments, as shown in FIG. 17 and FIG. 18, the first rotating portion 231 of the door plate swing arm 23 includes paired arc-shaped concave portions 2311 arranged on two sides of the door plate swing arm 23. Correspondingly, as shown in FIG. 16, the second rotating portion 131 of the primary inner shaft 12 includes paired arc-shaped protrusion portions 1311 adapted to the paired arc-shaped concave portions 2311. As shown in FIG. 19, each arc-shaped concave portion 2311 is sleeved on a corresponding arc-shaped protrusion portion 1311 and can rotate relative to the arc-shaped protrusion portion 1311. By fitting between the arc-shaped concave portion 2311 and the arc-shaped protrusion portion 1311, the first rotating door plate 21 and the second rotating door plate 22 can be directly connected to the primary shaft 1 reliably and stably, thereby ensuring that the rotating door plate has high motion precision relative to the primary shaft 1.

In some embodiments, contrary to the implementations shown in FIG. 16 to FIG. 19, the first rotating portion 231 of the door plate swing arm 23 may include the paired arc-shaped protrusion portions arranged on two sides of the door plate swing arm 23. Correspondingly: the second rotating portion 131 of the primary shaft 1 may include the paired arc-shaped concave portions adapted to the paired arc-shaped protrusion portions. Similarly, each arc-shaped concave portion is sleeved on a corresponding arc-shaped protrusion portion and can rotate relative to the arc-shaped protrusion portion. By using such arrangement, the first rotating door plate 21 and the second rotating door plate 22 can also be directly connected to the primary shaft 1 by the door plate swing arm 23 reliably and stably.

In some embodiments, the first rotating portion 231 of the door plate swing arm 23 may include an arc-shaped protrusion portion arranged on one side of the door plate swing arm 23 and an arc-shaped concave portion arranged on the other side of the door plate swing arm 23. Correspondingly, the second rotating portion 131 of the primary shaft 1 may include an arc-shaped concave portion adapted to the arc-shaped protrusion portion on the door plate swing arm 23 and an arc-shaped protrusion portion adapted to the arc-shaped concave portion on the door plate swing arm 23.

Similarly, each arc-shaped concave portion is sleeved on a corresponding arc-shaped protrusion portion and can rotate relative to the arc-shaped protrusion portion. By using such arrangement, the first rotating door plate 21 and the second rotating door plate 22 can also be directly connected to the primary shaft 1 by the door plate swing arm 23 reliably and stably.

In some embodiments, the door plate swing arm 23 may be rotatably connected to the primary shaft 1 by a physical rotating shaft. For example, the first rotating portion 231 of the door plate swing arm 23 may include a first rotating-shaft through hole, and the second rotating portion 131 of the primary shaft 1 may include a first rotating shaft that passes through the first rotating-shaft through hole. By fitting between the first rotating shaft and the first rotating-shaft through hole, the first rotating door plate 21 and the second rotating door plate 22 can also be directly connected to the primary shaft 1 reliably and stably.

It should be understood that, in another embodiment, the door plate swing arm 23 may alternatively be directly rotatably connected to the primary shaft 1 in another manner. This is not strictly limited in this embodiment of this application.

Figure 20:
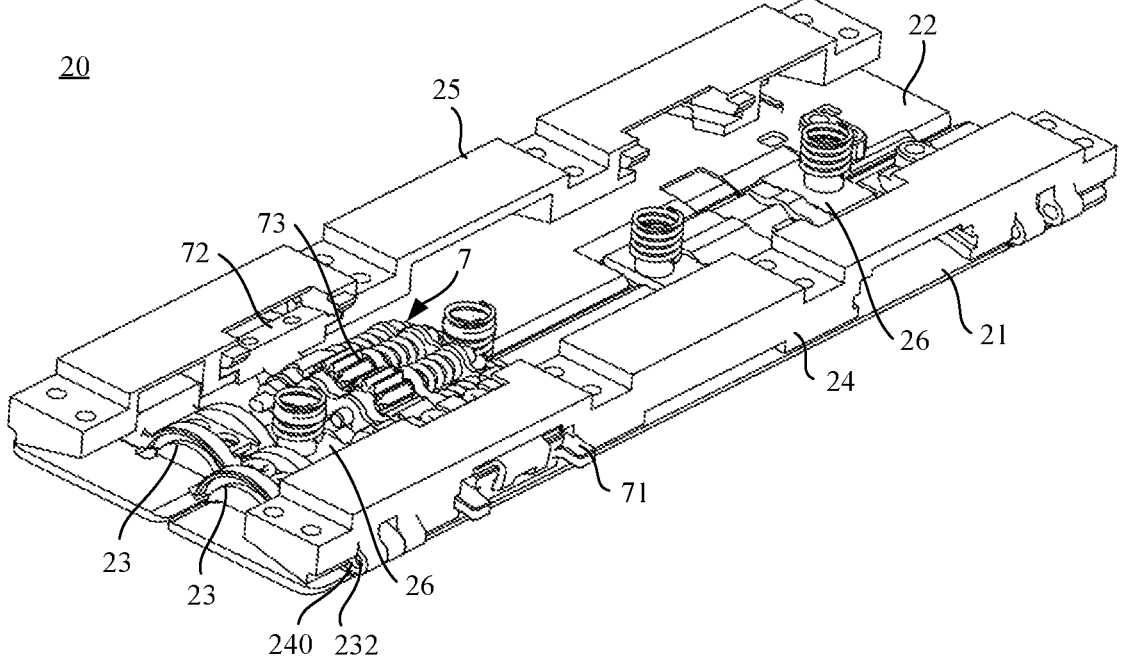
Figure 21:
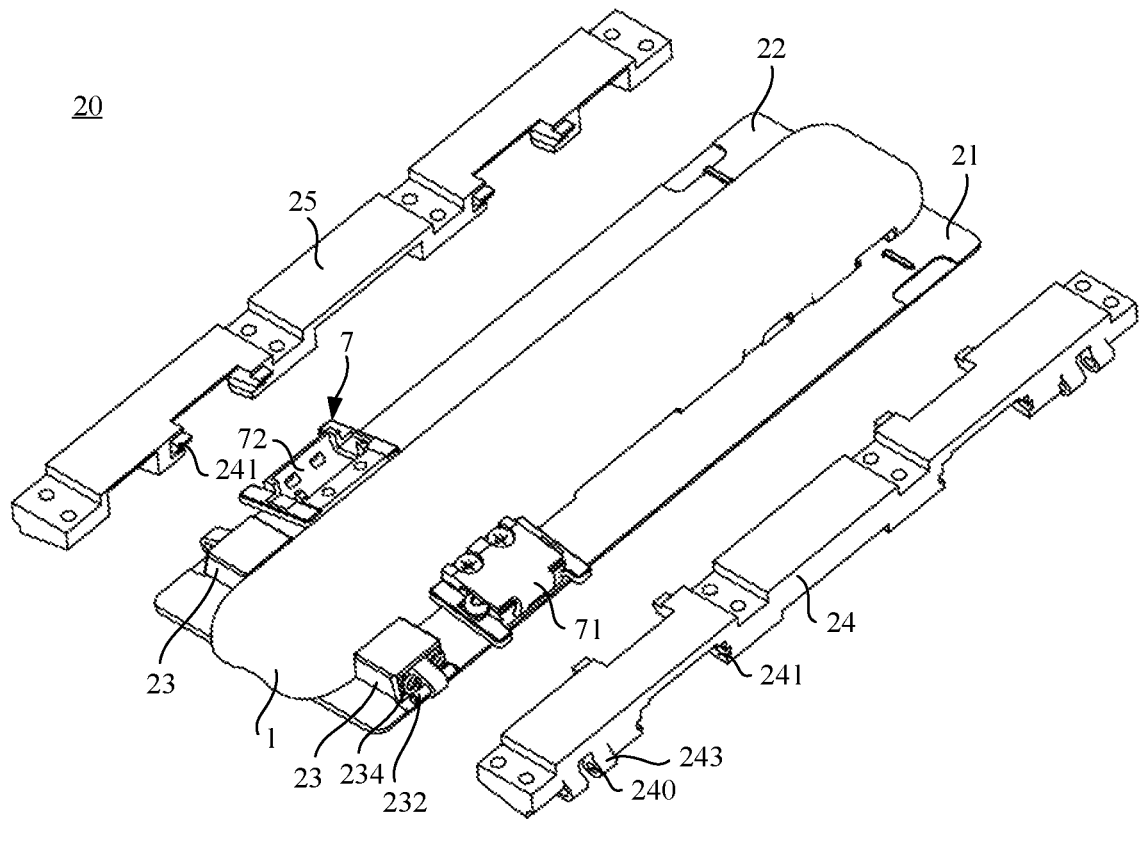
Figure 22:
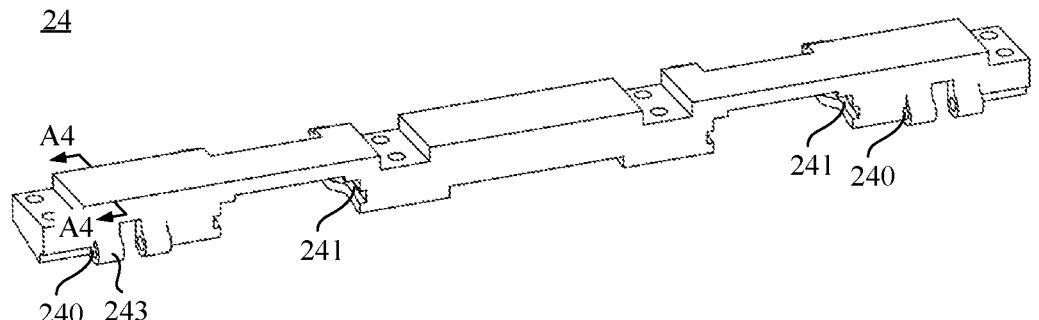
Figure 23:
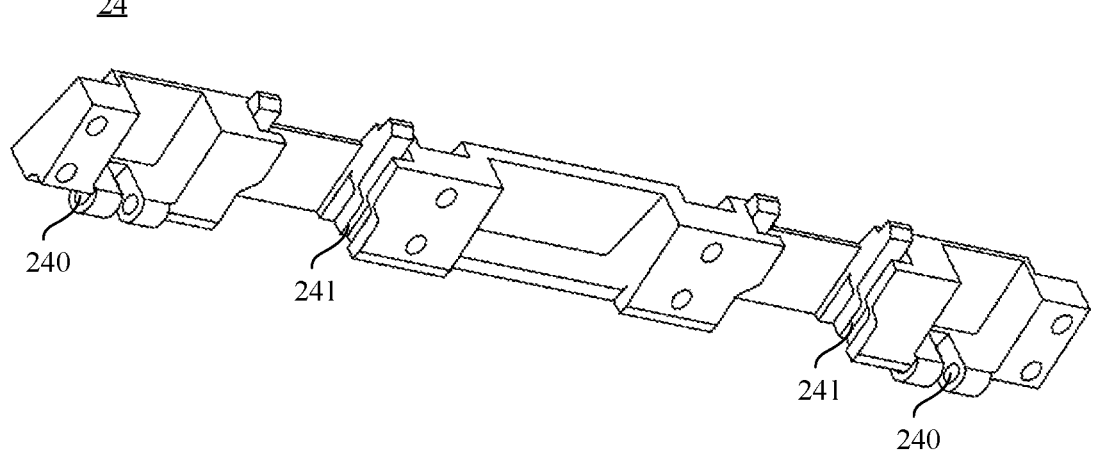
Figure 24:
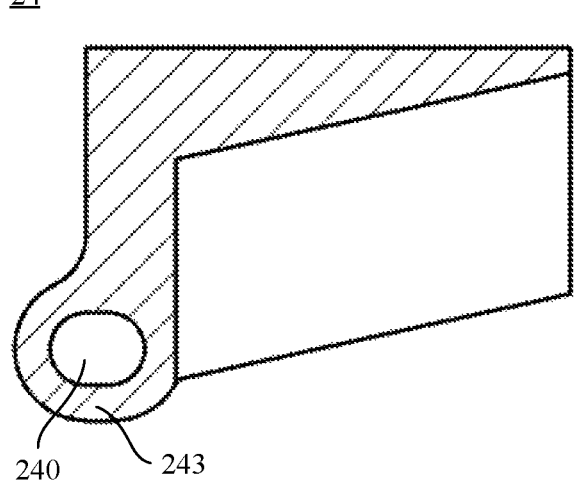
Figure 25:
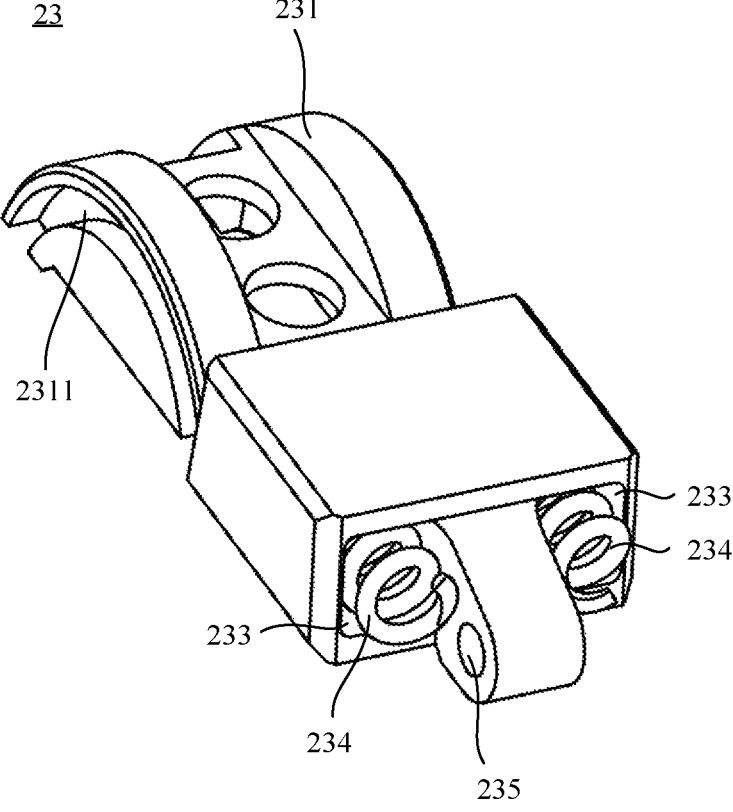
Figure 26:
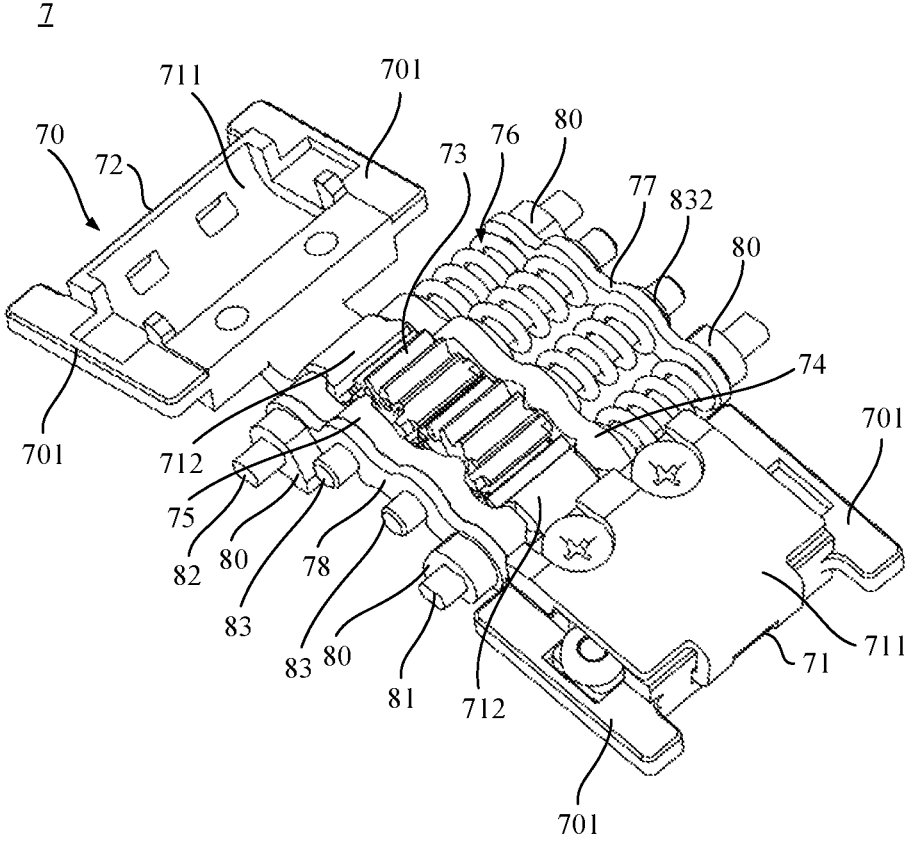
Figure 27:
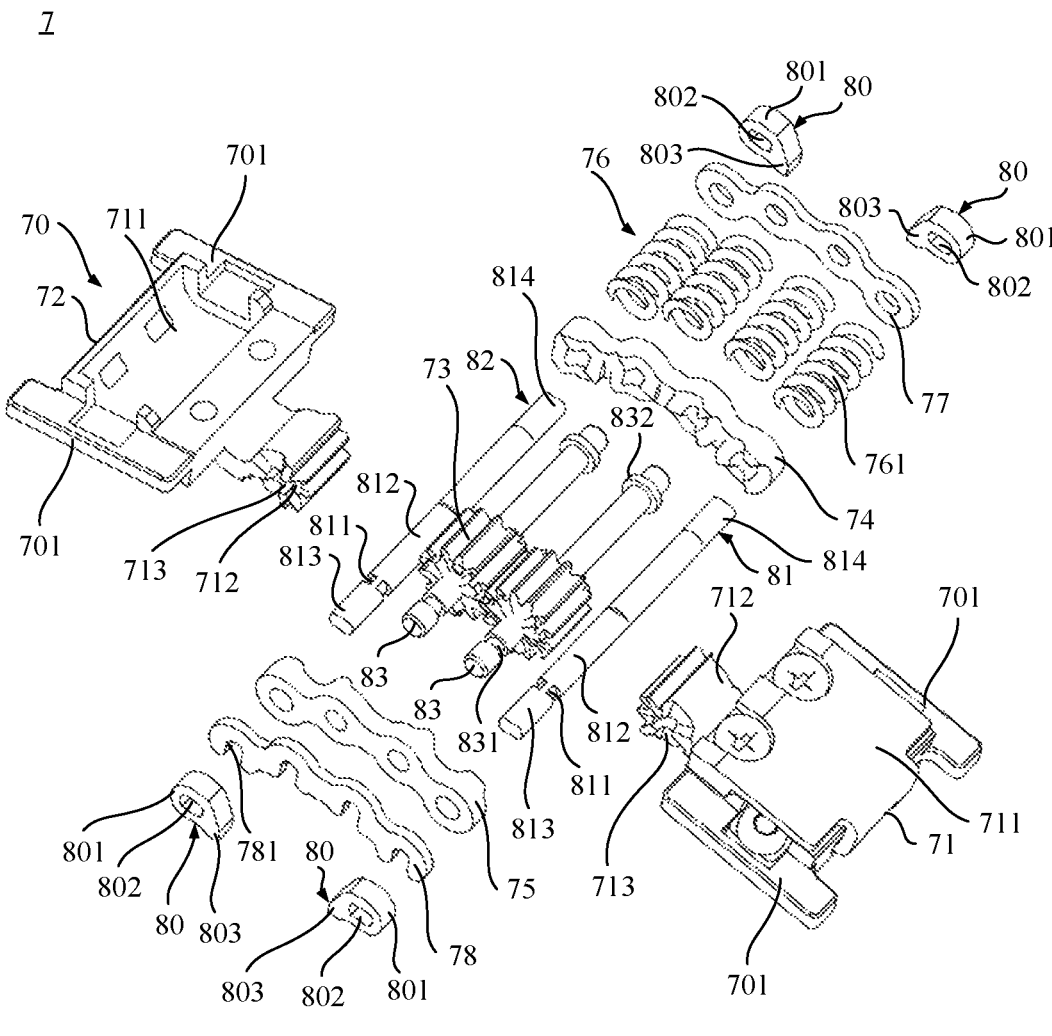

Next, structures of the first housing connecting rod and the second housing connecting rod and relative arrangement of the two housing connecting rods and other components in the rotating mechanism are described on the base of FIG. 9 to FIG. 11 with reference to FIG. 20 to FIG. 27. FIG. 20 is a schematic diagram of a partial structure of the rotating mechanism 20 shown in FIG. 9 when an electronic device 100 is in a flattened state. FIG. 21 is a schematic diagram of a partial exploded structure of the rotating mechanism 20 shown in FIG. 9 when an electronic device 100 is in a flattened state. FIG. 22 and FIG. 23 are schematic diagrams of a structure of a first housing connecting rod 24 that is in the rotating mechanism 20 shown in FIG. 21 and that is viewed from different perspectives. FIG. 24 is a schematic diagram of a local cross-sectional structure of the first housing connecting rod 24 shown in FIG. 22 along a section line A4-A4 shown in FIG. 22. FIG. 25 is a schematic diagram of a structure of a door plate swing arm 23 in the rotating mechanism 20 shown in FIG. 21. FIG. 26 is a schematic diagram of a structure of a synchronous damping member 7 in the rotating mechanism 20 shown in FIG. 21 when an electronic device 100 is in a flattened state. FIG. 27 is a schematic diagram of an exploded structure of the synchronous damping member 7 shown in FIG. 26. In FIG. 20, in order to show the relative arrangement between the first housing connecting rod 24 and the second housing connecting rod 25, and other components in the rotating mechanism 20 more clearly, a display of the primary shaft 1 is omitted. In FIG. 21, only the first housing connecting rod 24 and the second housing connecting rod 25 are separated from other components of the rotating mechanism 20, to show more clearly how the two housing connecting rods are arranged relative to the other components of the rotating mechanism 20.

In some embodiments, the first housing connecting rod 24 is rotatably connected to the door plate swing arm 23 fixedly connected to the first rotating door plate 21 in a manner of fitting a rotating shaft and a shaft hole. The second housing connecting rod 25 is also rotatably connected to the door plate swing arm 23 fixedly connected to the second rotating door plate 22 in a manner of fitting a rotating shaft and a shaft hole. As shown in FIG. 20 to FIG. 24, a fourth rotating portion 243 is arranged on each of the first housing connecting rod 24 and the second housing connecting rod 25, and the fourth rotating portion 243 has a second rotating-shaft through hole 240. The second rotating-shaft through hole 240 on the first housing connecting rod 24 is configured to rotatably connect the first housing connecting rod 24 to the door plate swing arm 23 on the first rotating door plate 21. The second rotating-shaft through hole 240) on the second housing connecting rod 25 is configured to rotatably connect the second housing connecting rod 25 to the door plate swing arm 23 on the second rotating door plate 22. A second rotating shaft 232 is arranged on each of the door plate swing arms 23 on the first rotating door plate 21 and the second rotating door plate 22. As shown in FIG. 25, a third rotating-shaft through hole 235 is provided on the door plate swing arm 23, and the second rotating shaft 232 passes through the third rotating-shaft through hole 235. The second rotating shaft 232 of the door plate swing arm 23 on the first rotating door plate 21 also passes through the second rotating-shaft through hole 240 on the first housing connecting rod 24. The second rotating shaft 232 of the door plate swing arm 23 on the second rotating door plate 22 also passes through the second rotating-shaft through hole 240 on the second housing connecting rod 25. By using such arrangement, the first housing connecting rod 24 and the second housing connecting rod 25 can rotate around a corresponding second rotating shaft 232, so that the first housing connecting rod 24 is rotatably connected to the door plate swing arm 23 on the first rotating door plate 21, and the second housing connecting rod 25 is rotatably connected to the door plate swing arm 23 on the second rotating door plate 22.

In some embodiments, a cross-sectional shape of the second rotating shaft 232 may be a circle, and a radial size of the second rotating shaft 232 may be basically equal to a radial size of the third rotating-shaft through hole 235 and a radial size of the second rotating-shaft through hole 240. With such an arrangement, the first housing connecting rod 24 and the second housing connecting rod 25 can be rotatably connected to the door plate swing arm 23 reliably and stably. In other embodiments, the cross-sectional shape of the second rotating shaft 232 may be another shape, and the radial size of the second rotating shaft 232 may have other size relationships with the radial size of the third rotating-shaft through hole 235 and the radial size of the second rotating-shaft through hole 240. For example, the radial size of the second rotating shaft 232 may be basically equal to the radial size of the third rotating-shaft through hole 235 and is less than the radial size of the second rotating-shaft through hole 240.

In some embodiments, as shown in FIG. 11. FIG. 20. FIG. 21. FIG. 26, and FIG. 27, the rotating mechanism 20 may further include a synchronous damping member 7. The synchronous damping member 7 may be rotatably connected to the third rotating portion 132 of the primary inner shaft 12 shown in FIG. 13 to FIG. 15. The synchronous damping member 7 includes a first transmission connecting rod 71, a second transmission connecting rod 72, and a gear group 73. The first transmission connecting rod 71 includes a sliding end 711 and a rotating end 712. The rotating end 712 of the first transmission connecting rod 71 is rotatably connected to the third rotating portion 132 of the primary inner shaft 12, and the sliding end 711 of the first transmission connecting rod 71 is slidably connected to the first housing connecting rod 24. In a process in which the first housing 10 and the second housing 30 are folded or unfolded, the sliding end 711 of the first transmission connecting rod 71 slides relative to the first housing connecting rod 24. Similarly, the second transmission connecting rod 72 also includes a sliding end

711 and a rotating end 712. The rotating end 712 of the second transmission connecting rod 72 is rotatably connected to the third rotating portion 132 of the primary inner shaft 12, and the sliding end 711 of the second transmission connecting rod 72 is slidably connected to the second housing connecting rod 25. In a process in which the first housing 10 and the second housing 30 are folded or unfolded, the sliding end 711 of the second transmission connecting rod 72 slides relative to the second housing connecting rod 25. The rotating end 712 of the first transmission connecting rod 71 and the rotating end 712 of the second transmission connecting rod 72 may be engaged with the gear group 73. It should be understood that, although only one synchronous damping member 7 is shown in FIG. 11. FIG. 20, and FIG. 21, in this embodiment of this application, the rotating mechanism 20 may include a plurality of synchronous damping members 7.

In some embodiments, as shown in FIG. 21 to FIG. 23, the first housing connecting rod 24 has a guide groove 241, and a side wall of the guide groove 241 may have a recessed guide space. As shown in FIG. 26 and FIG. 27, the sliding end 711 of the first transmission connecting rod 71 includes a guide flange 701 located on a circumferential side. The guide flange 701 is mounted in the guide space of the guide groove 241, so that the sliding end 711 of the first transmission connecting rod 71 is slidably connected to the guide groove 241 of the first housing connecting rod 24, thereby implementing slidable connection between the first transmission connecting rod 71 and the first housing connecting rod 24. In this embodiment, the guide space of the guide groove 241 fits the guide flange 701 of the first transmission connecting rod 71, to guide a sliding direction of the sliding end 711 of the first transmission connecting rod 71 relative to the guide groove 241, so that a relative sliding action between the first transmission connecting rod 71 and the first housing connecting rod 24 is easier to implement, and control precision is higher.

Similarly, as shown in FIG. 21, the second housing connecting rod 25 has a guide groove 241, and a side wall of the guide groove 241 may have a recessed guide space. As shown in FIG. 26 and FIG. 27, the sliding end 711 of the second transmission connecting rod 72 includes a guide flange 701 located on a circumferential side. The guide flange 701 is mounted in the guide space of the guide groove 241, so that the sliding end 711 of the second transmission connecting rod 72 is slidably connected to the guide groove 241 of the second housing connecting rod 25, thereby implementing slidable connection between the second transmission connecting rod 72 and the second housing connecting rod 25. In this embodiment, the guide space of the guide groove 241 fits the guide flange 701 of the second transmission connecting rod 72, to guide a sliding direction of the sliding end 711 of the second transmission connecting rod 72 relative to the guide groove 241, so that a relative sliding action between the second transmission connecting rod 72 and the second housing connecting rod 25 is easier to implement, and control precision is higher.

Because the rotating end 712 of the first transmission connecting rod 71 and the rotating end 712 of the second transmission connecting rod 72 may be engaged with each other by the gear group 73, a synchronous component 70 formed by the first transmission connecting rod 71, the second transmission connecting rod 72, and the gear group 73 has a simple structure, a movement process is easy to control, and accuracy is high.

For example, a structure of the second transmission connecting rod 72 may be approximately the same as a structure of the first transmission connecting rod 71, to simplify material types of the rotating mechanism 20 and reduce design difficulty and costs of the rotating mechanism 20.

During unfolding and folding of the folding apparatus 800, the rotating end 712 of the first transmission connecting rod 71 is engaged with the rotating end 712 of the second transmission connecting rod 72 by the gear group 73, both the rotating end 712 of the first transmission connecting rod 71 and the rotating end 712 of the second transmission connecting rod 72 are rotatably connected to the primary shaft 1. The sliding end 711 of the first transmission connecting rod 71 is slidably connected to the first housing connecting rod 24, and the sliding end 711 of the second transmission connecting rod 72 is slidably connected to the second housing connecting rod 25. Therefore, in a process in which the first housing 10 and the second housing 30 are unfolded or folded relative to each other, the first transmission connecting rod 71 and the second transmission connecting rod 72 can control rotation angles of the first housing connecting rod 24 and the second housing connecting rod 25 relative to the primary shaft 1 to be consistent, so that rotation actions of the first housing 10 and the second housing 30 are synchronous and consistent, and a folding action and an unfolding action of the folding apparatus 800 are symmetrical. This helps improve user experience. In addition. because the first housing 10 and the second housing 30 are respectively connected to the primary shaft 1 through two-stage transmission of the housing connecting rod and the transmission connecting rod, compared with a conventional rotating mechanism in which the housing is connected to the primary shaft through multi-stage transmission, less transmission can improve reliability of the rotating mechanism 20.

In some embodiments, as shown in FIG. 26 and FIG. 27, the synchronous damping member 7 of the rotating mechanism 20 further includes a first conjoined cam 74, a second conjoined cam 75, an elastic member 76, a snap ring 77, a circlip 78, a first pin shaft 81, a second pin shaft 82, and a plurality of third pin shafts 83. The first pin shaft 81 passes through the rotating end 712 of the first transmission connecting rod 71, to rotatably connect the first transmission connecting rod 71 to the third rotating portion 132 of the primary inner shaft 12 shown in FIG. 13 to FIG. 15. The second pin shaft 82 passes through the rotating end 712 of the second transmission connecting rod 72, to rotatably connect the second transmission connecting rod 72 to the third rotating portion 132 of the primary inner shaft 12 shown in FIG. 13 to FIG. 15. The plurality of third pin shafts 83 are configured to rotatably connect the gear group 73 to the third rotating portion 132 of the primary inner shaft 12 shown in FIG. 13 to FIG. 15. The first pin shaft 81, the second pin shaft 82, and the third pin shaft 83 are basically arranged in parallel with each other.

The snap ring 77, the elastic member 76, the first conjoined cam 74, the synchronous component 70, the second conjoined cam 75, and the circlip 78 are sequentially sleeved on the first pin shaft 81, the second pin shaft 82, and the plurality of third pin shafts 83. A stop block 832 is arranged on each third pin shaft 83. An end of the snap ring 77 abuts against the stop block 832 of the third pin shaft 83. The first pin shaft 81 and the second pin shaft 82 each include a first limiting groove 811, each third pin shaft 83 includes a second limiting groove 831, and the circlip 78 includes a plurality of grooves 781. The plurality of grooves 781 of the circlip 78 are clamped to the first limiting grooves 811 and the second limiting grooves 831 in a one-to-one correspondence. For example, the elastic member 76 may include a plurality of springs 761, and the elastic member 76 may be in a compressed state to provide pre-pressure.

Figure 28:
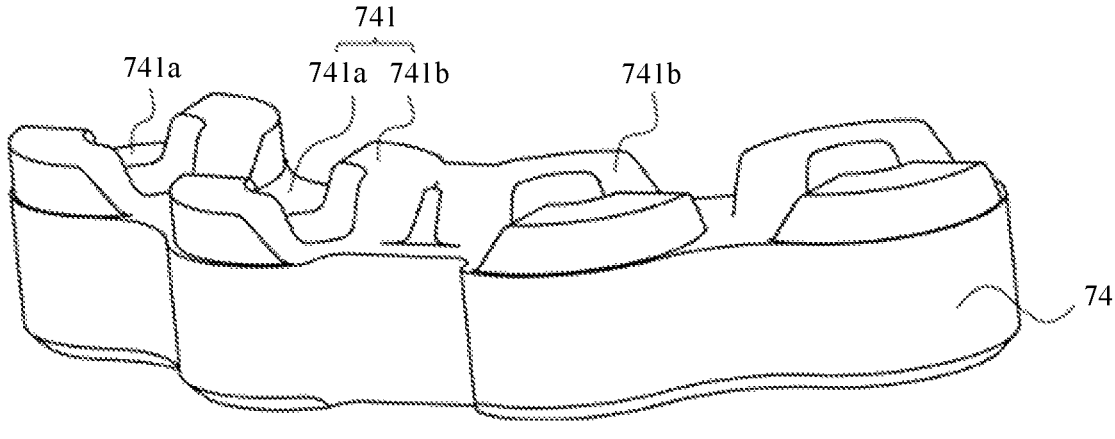

FIG. 28 is a schematic diagram of a structure of a first conjoined cam 74 in the synchronous damping member 7 shown in FIG. 27. As shown in FIG. 26 to FIG. 28, the first conjoined cam 74 has a first end surface 741 facing the synchronous component 70, and the first end surface 741 includes a plurality of first concave surfaces 741a and first protrusion surfaces 741b that are arranged at intervals. A structure of the second conjoined cam 75 may be similar to the structure of the first conjoined cam 74, and a specific structure is not described in this embodiment again. All the first transmission connecting rod 71, the second transmission connecting rod 72, and two surfaces of the gear group 73 mating the first conjoined cam 74 and the second conjoined cam 75 includes second concave surfaces and second protrusion surfaces spaced apart. Fitting between the several arranged protrusion surfaces and concave surfaces provides torque that prevents the first housing 10 and the second housing 30 from rotating relative to each other, thereby improving hand feeling in a folding process of the electronic device 100.

In some implementations, as shown in FIG. 20 to FIG. 24, radial sizes of the second rotating-shaft through holes 240 on the first housing connecting rod 24 and the second housing connecting rod 25 are respectively greater than radial sizes of the second rotating shafts 232 passing through the second rotating-shaft through hole. For example, a cross section of the second rotating shaft 232 may be approximately circular, and the second rotating-shaft through hole 240) may be approximately an elliptical through hole. When the second rotating shaft 232 passes through the second rotating-shaft through hole 240, the second rotating shaft 232 may move in a radial direction relative to the second rotating-shaft through hole 240. It should be understood that a cross-sectional shape of the second rotating shaft 232 may be another shape, and the second rotating-shaft through hole 240 may alternatively be a through hole of another shape, provided that the second rotating shaft 232 can move in a radial direction relative to the second rotating-shaft through hole 240. This is not strictly limited in this application.

In some embodiments, as shown in FIG. 21 and FIG. 25, the door plate swing arm 23 includes a spring cavity 233, and at least one thrust spring 234 is arranged in the spring cavity 233. One end (an inner end not shown in the figure) of each thrust spring 234 abuts against an inner wall of the spring cavity 233 of the door plate swing arm 23, and the other end (an outer end shown in the figure) of each thrust spring 234 abuts against a corresponding housing connecting rod. By using such arrangement, each thrust spring 234 may be in a compressed state between the door plate swing arm 23 and the corresponding housing connecting rod, to push the corresponding housing connecting rod in a direction away from the corresponding door plate swing arm 23.

Figure 29:
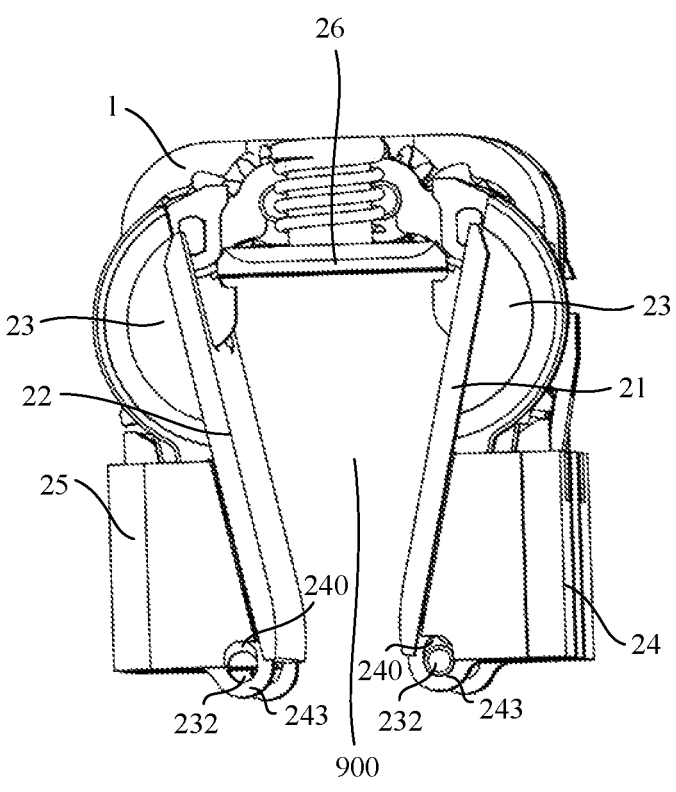

As shown in FIG. 20, when the electronic device 100 is in the flattened state, the thrust spring 234 can push the corresponding housing connecting rod in the direction away from the door plate swing arm 23. For example, the thrust spring 234 arranged in the door plate swing arm 23 of the first rotating door plate 21 can push the first housing connecting rod 24 outward in the direction away from the door plate swing arm 23, and the thrust spring 234 arranged in the door plate swing arm 23 of the second rotating door plate 22 can push the second housing connecting rod 25 outward in the direction away from the door plate swing arm 23. In this manner, the first housing connecting rod 24 and the second housing connecting rod 25 can be far away from each other to a great extent, and then the first housing 10 and the second housing 30 are far away from each other to a great extent, so that the bending portion 2002 of the flexible display screen 200 is flattened as much as possible. In this manner, flatness of the bending portion of the flexible display screen 200 can be improved, thereby improving a light-and-shadow effect of the flexible display screen 200. FIG. 29 is a schematic diagram of a partial structure of the rotating mechanism 200 shown in FIG. 20 when an electronic device 100 is in a folded state. As shown in FIG. 29, in the folded state of the electronic device 100, the thrust spring 234 can also push the corresponding housing connecting rod downward in the direction away from the door plate swing arm 23. In this manner, the fourth rotating portion 243 of the first housing connecting rod 24 can be a supplementary extension of the first rotating door plate 21 at an edge of the first rotating door plate 21, and the fourth rotating portion 243 of the second housing connecting rod 25 can be a supplementary extension of the second rotating door plate 22 at an edge of the second rotating door plate 22, so that the screen accommodating space 900 can be increased, and the bending portion 2002 of the flexible display screen 200 can be better protected.

In some embodiments, as shown in FIG. 11, a first notch 210 is provided on a side of the first rotating portion 231 of the door plate swing arm 23 that is of the first rotating door plate 21 and that is arranged close to the first rotating door plate 21. A second notch 220 corresponding to the first notch 210 is provided on a side of the first rotating portion 231 of the door plate swing arm 23 that is of the second rotating door plate 22 and that is arranged close to the second rotating door plate 22. The first notch 210 and the corresponding second notch 220) enclose a hollow 230 in the flattened state of the electronic device 100. As shown in FIG. 20, in the flattened state of the electronic device 100, a projection of the synchronous damping member 7 in a direction perpendicular to the first rotating door plate 21 and the second rotating door plate 22 overlaps at least partially with the hollow 230. That is, in the flattened state of the electronic device 100, the synchronous damping member 7, the first notch 210, and the second notch 220 are located at positions corresponding to each other in a direction parallel to the primary shaft 1. The first notch 210 and the second notch 220 are provided on the first rotating door plate 21 and the second rotating door plate 22, so that interference with the synchronous damping member 7 can be avoided when the first rotating door plate 21 and the second rotating door plate 22 rotate relative to the primary shaft 1. Two hollows 230 are shown in the embodiment shown in FIG. 11, to describe a principle of this embodiment of this application. However, it should be understood that more or fewer first notches 210 and second notches 220 may be provided on the first rotating door plate 21 and the second rotating door plate 22, to form more or fewer hollows 230. This is not strictly limited in this embodiment of this application.

Figure 30:
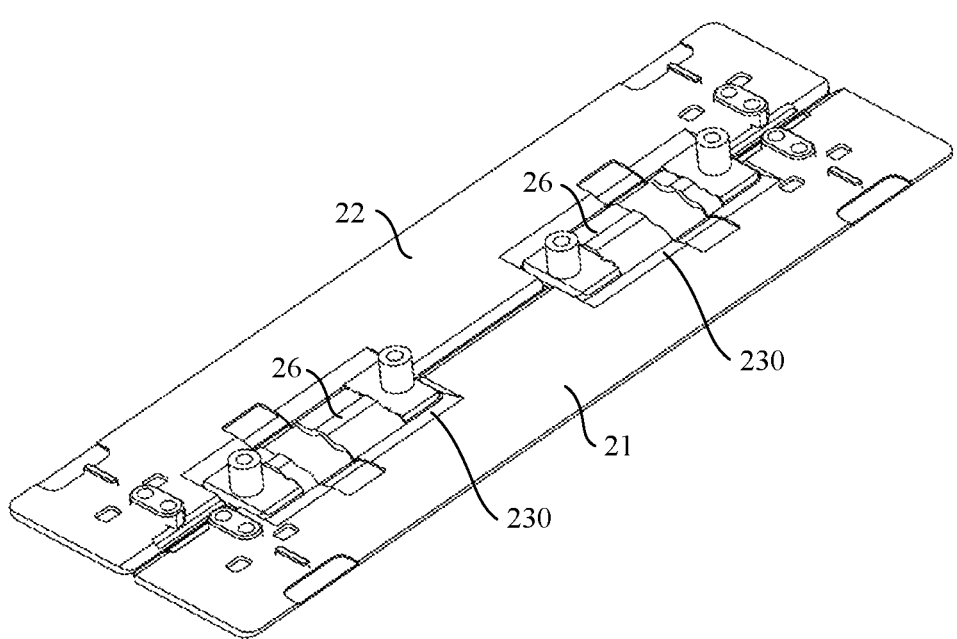

In some embodiments, as shown in FIG. 10, FIG. 11, and FIG. 20, the rotating mechanism 20 further includes a lifting plate 26 arranged corresponding to the synchronous damping member 7. The synchronous damping member 7 is located between the corresponding lifting plate 26 and the primary shaft 1. FIG. 30 is a schematic diagram of a structure of a first rotating door plate 21, a second rotating door plate 22, and a lifting plate 26 in the rotating mechanism 20 shown in FIG. 11 when an electronic device 100 is in a flattened state. As shown in FIG. 30, when the electronic device 100 is in the flattened state, the lifting plate 26 is at least partially located in the corresponding hollow 230, to at least partially close the corresponding hollow 230. By using such arrangement, the lifting plate 26 and the first rotating door plate 21 and the second rotating door plate 22 may jointly support the bending portion 2002 of the flexible display screen 200. As shown in FIG. 29, when the electronic device 100 is in the folded state, the lifting plate 26, the first rotating door plate 21, and the second rotating door plate 22 jointly enclose the screen accommodating space 900.

Figure 31:
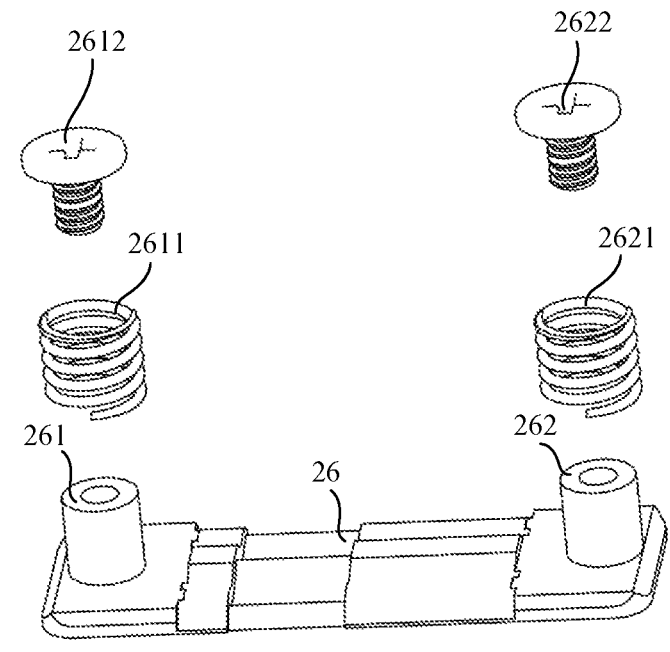
Figure 32:
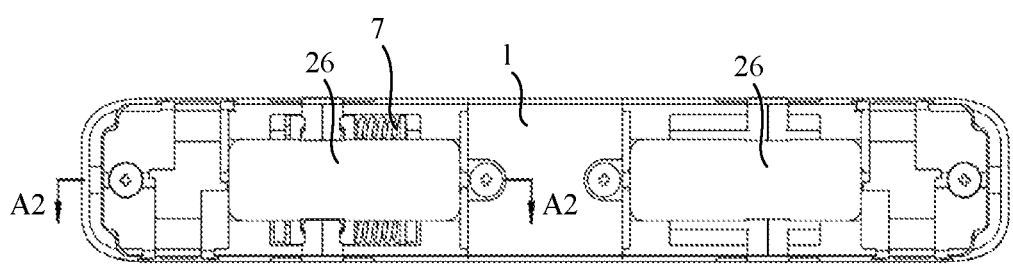
Figure 33:
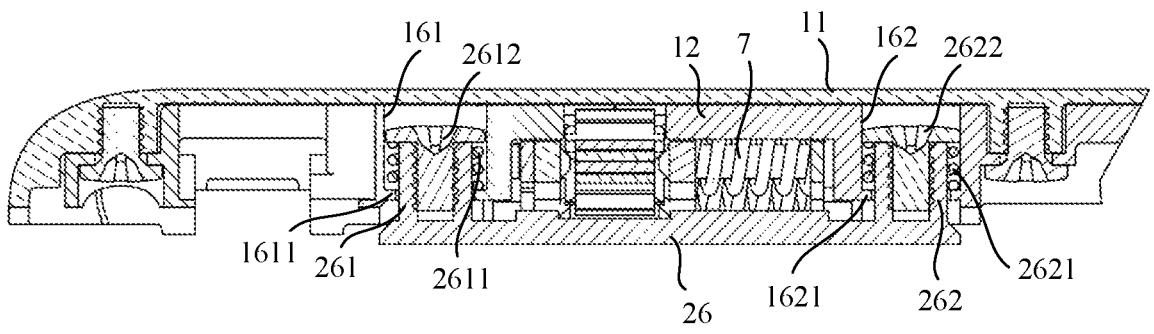

Next, a cooperation relationship between the lifting plate 26 and the primary shaft 1 is described based on FIG. 10 to FIG. 16 and FIG. 20 with reference to FIG. 31 to FIG. 33. FIG. 31 is a schematic diagram of an exploded structure of a lifting plate 26 and related mounting components in the rotating mechanism 20 shown in FIG. 11. FIG. 32 is a bottom view of a primary shaft 1, a lifting plate 26, and a synchronous damping member 7 when an electronic device 100 is in a flattened state. FIG. 33 is a schematic diagram of a local cross-sectional structure of the primary shaft 1, the lifting plate 26, and the synchronous damping member 7 shown in FIG. 32 along a section line A2-A2 shown in FIG. 32. To more clearly show a cooperation relationship between the primary shaft 1, the lifting plate 26, and the synchronous damping member 7, a display of some components of the synchronous damping member 7 is omitted in FIG. 32 and FIG. 33.

In some embodiments, as shown in FIG. 11, FIG. 31, and FIG. 33, a first sleeve 261 and a second sleeve 262 are arranged on a side of each lifting plate 26 facing the primary shaft 1, and the first sleeve 261 and the second sleeve 262 are configured to be connected to the primary shaft 1. As shown in FIG. 12 to FIG. 16 and FIG. 33, a first through hole 161 for the first sleeve 261 to pass through and a second through hole 162 for the second sleeve 262 to pass through are provided on the primary shaft 1. A first circumferential flange 1611 is arranged on an inner wall of the first through hole 161, and a second circumferential flange 1621 is arranged on an inner wall of the second through hole 162. As shown in FIG. 33, the first sleeve 261 is inserted into the first through hole 161 from the bottom side of the primary shaft 1, and the second sleeve 262 is inserted into the second through hole 162 from the bottom side of the primary shaft 1.

As shown in FIG. 11, FIG. 31, and FIG. 33, a first lifting spring 2611 sleeved on the first sleeve 261 (that is, around the first sleeve 261) and supported by the first circumferential flange 1611 is arranged in the first through hole 161. A bottom end of the first lifting spring 2611 is in contact with the first circumferential flange 1611 and is supported by the first circumferential flange 1611. A second lifting spring 2621 sleeved on the second sleeve 262 (around the second sleeve 262) and supported by the second circumferential flange 1621 is arranged in the second through hole 162. A bottom end of the second lifting spring 2621 is in contact with the second circumferential flange 1621 and is supported by the second circumferential flange 1621. A first fastener 2612 is arranged at an end portion of the first sleeve 261, and a top of the first lifting spring 2611 is in contact with the first fastener 2612, so that the first lifting spring 2611 is compressed by the first fastener 2612 and the first circumferential flange 1611. A second fastener 2622 is arranged at an end portion of the second sleeve 262, and a top of the second lifting spring 2621 is in contact with the second fastener 2622, so that the second lifting spring 2621 is compressed by the second fastener 2622 and the second circumferential flange 1621. The first fastener 2612 and the second fastener 2622 include, but are not limited to, a screw; a bolt, a rivet, a pin, and the like. By using such arrangement, the lifting plate 26 can be connected to the primary shaft 1 and the lifting plate 26 can move relative to the primary shaft 1 in a direction away from or toward the primary shaft 1. As shown in FIG. 33, in a case in which the lifting plate 26 is subject to a downward push force (that is, a push force in a direction away from the top cover 11 of the primary shaft 1), the lifting plate 26 can overcome elastic forces of the first lifting spring 2611 and the second lifting spring 2621 and move relative to the primary shaft 1 in the direction away from the primary shaft 1. After the downward pushing force applied to the lifting plate 26 disappears, the first lifting spring 2611 and the second lifting spring 2621 that are in a compressed state push the first fastener 2612 and the second fastener 2622 upward, to drive the lifting plate 26 to move upward to return.

The following describes an example of a manner of making the lifting plate 26 move relative to the primary shaft 1 based on FIG. 26 and FIG. 27 with reference to FIG. 34 to FIG. 43.

In some embodiments, as shown in FIG. 26 and FIG. 27, each of the first pin shaft 81 and the second pin shaft 82 includes a first connection portion 812. Correspondingly, the rotating end 712 of the first transmission connecting rod 71 and the rotating end 712 of the second transmission connecting rod 72 each include a first connection hole 713. The first connection hole 713 and the first connection portion 812 have basically the same cross-sectional shape. The cross-sectional shapes of the first connection hole 713 and the first connection portion 812 include, but are not limited to, a flat shape, a polygonal shape, an irregular shape, and the like. The first connection hole 713 of the rotating end 712 of the first transmission connecting rod 71 is sleeved on the first connection portion 812 of the first pin shaft 81. The first connection hole 713 of the rotating end 712 of the second transmission connecting rod 72 is sleeved on the first connection portion 812 of the second pin shaft 82. In this manner, the first transmission connecting rod 71 can rotate with the first pin shaft 81, and the second transmission connecting rod 72 can rotate with the second pin shaft 82.

In some embodiments, as shown in FIG. 26 and FIG. 27, each of the first pin shaft 81 and the second pin shaft 82 further includes a second connection portion 813 arranged at one end of the pin shaft. A stop member 80 is sleeved on each of the second connection portions 813 of the first pin shaft 81 and the second pin shaft 82. The stop member 80 includes a mounting portion 801 and a pressing portion 803 protruding relative to the mounting portion 801. A second connection hole 802 is provided in the mounting portion 801. The second connection hole 802 and the second connection portion 813 have basically the same cross-sectional shape. The cross-sectional shapes of the second connection hole 802 and the second connection portion 813 include, but are not limited to, a flat shape, a polygonal shape, an irregular shape, and the like. The cross-sectional shape of the second connection portion 813 may be basically the same as or different from the cross-sectional shape of the first connection portion 812. The second connection portions 813 of the first pin shaft 81 and the second pin shaft 82 respectively pass through the second connection holes 802 of the corresponding stop members 80. In this manner, each stop member 80 can rotate with the corresponding pin shaft in the first pin shaft 81 and the second pin shaft 82.

In some embodiments, as shown in FIG. 26 and FIG. 27, each of the first pin shaft 81 and the second pin shaft 82 further includes a third connection portion 814 arranged at the other end of the pin shaft. A stop member 80 is also sleeved on each of the third connection portions 814 of the first pin shaft 81 and the second pin shaft 82. Similarly, the stop member 80 also includes a mounting portion 801 and a pressing portion 803 protruding relative to the mounting portion 801. A second connection hole 802 is provided in the mounting portion 801. The second connection hole 802 and the third connection portion 814 have basically the same cross-sectional shape. The cross-sectional shapes of the second connection hole 802 and the third connection portion 814 include, but are not limited to, a flat shape, a polygonal shape, an irregular shape, and the like. The cross-sectional shape of the third connection portion 814 may be basically the same as or different from the cross-sectional shapes of the first connection portion 812 and the second connection portion 813. The third connection portions 814 of the first pin shaft 81 and the second pin shaft 82 respectively pass through the second connection holes 802 of the corresponding stop members 80. In this manner, each stop member 80 can rotate with the corresponding pin shaft in the first pin shaft 81 and the second pin shaft 82.

Figure 34:
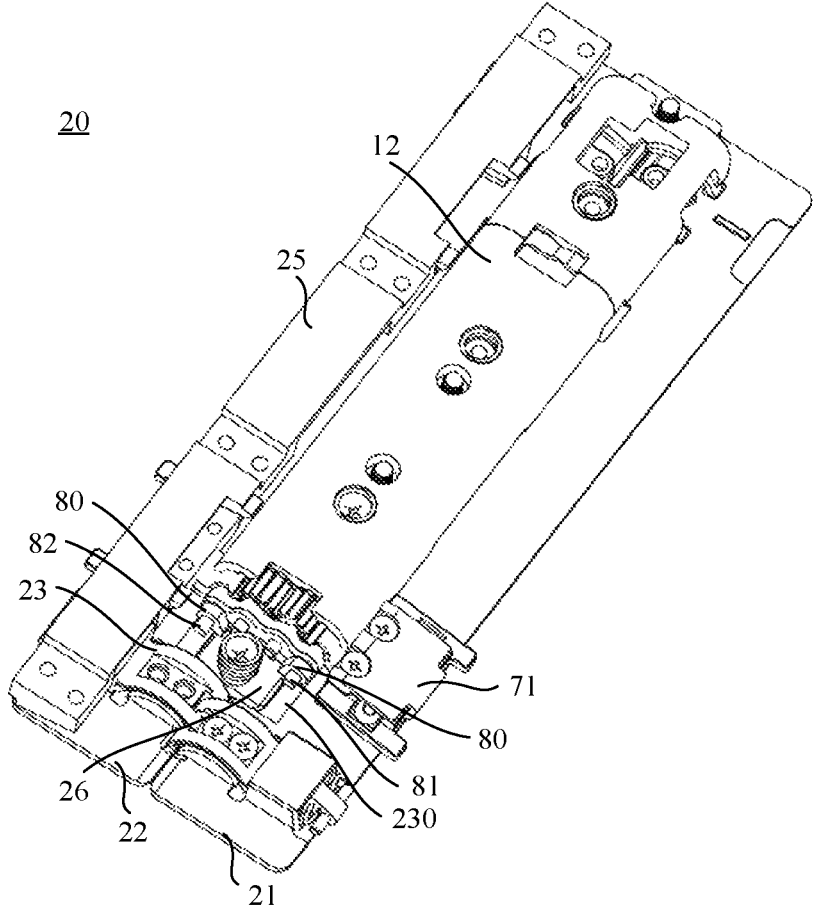

FIG. 34 is a schematic diagram of a partial structure of the rotating mechanism 20 shown in FIG. 9 when an electronic device 100 is in a flattened state. As shown in FIG. 26. FIG. 27. FIG. 30, and FIG. 34, when the electronic device 100 is in the flattened state, the pressing portions 803 of the stop members 80 on the first pin shaft 81 and the second pin shaft 82 respectively press two opposite sides of the lifting plate 26, so that the lifting plate 26 is located in a corresponding hollow 230. In this case, the lifting plate 26 and the first rotating door plate 21 and the second rotating door plate 22 may jointly support the bending portion 2002 of the flexible display screen 200.

Figure 35:
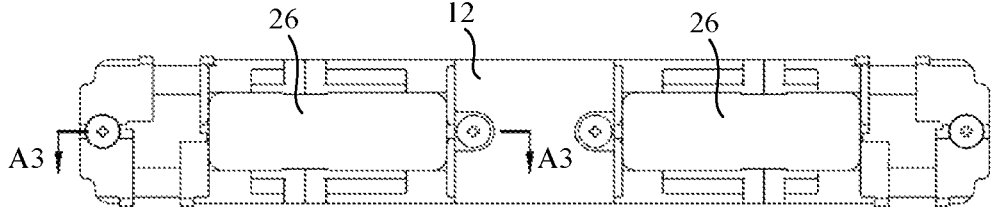
Figure 36:
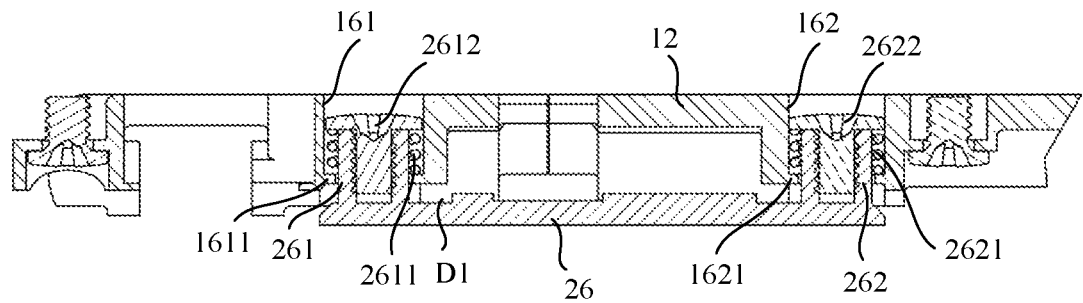

FIG. 35 is a bottom view of a primary inner shaft 12 and a lifting plate 26 of a rotating mechanism 20 when an electronic device 100 is in a flattened state. FIG. 36 is a schematic diagram of a local cross-sectional structure of the primary inner shaft 12 and the lifting plate 26 shown in FIG. 35 along a section line A3-A3 shown in FIG. 35. As shown in FIG. 34 to FIG. 36, because the stop members 80 on the first pin shaft 81 and the second pin shaft 82 respectively press two opposite sides of the lifting plate 26, the stop members 80 can overcome elastic forces of the first lifting spring 2611 and the second lifting spring 2621, and keep the lifting plate 26 at a position away from the primary shaft 1. In this case, as shown in FIG. 36, there is a distance D1 between the lifting plate 26 and a bottom side of the primary inner shaft 12.

Figure 37:
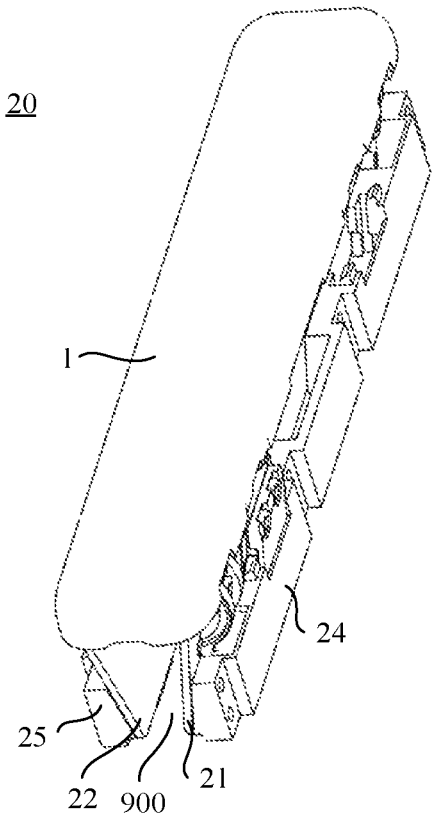
Figure 38:
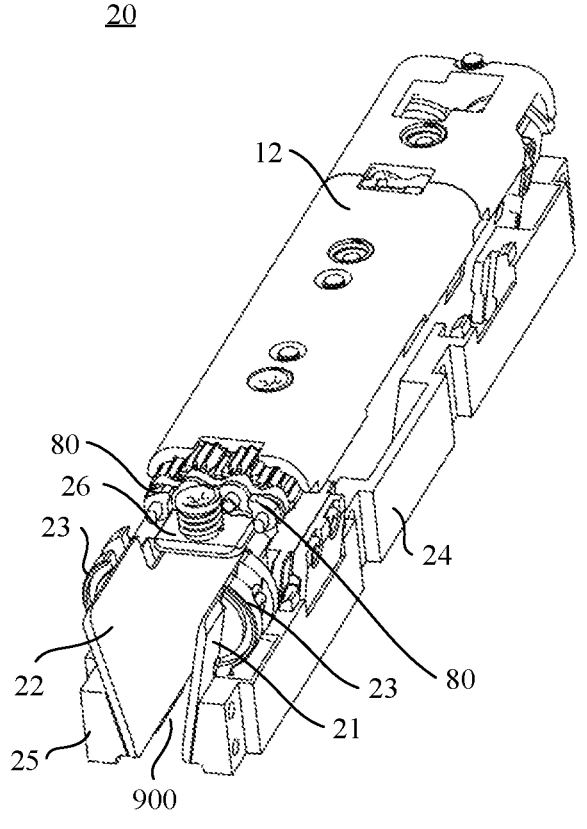

FIG. 37 is a schematic diagram of a structure of the rotating mechanism 20 shown in FIG. 9 when an electronic device 100 is in a folded state. FIG. 38 is a schematic diagram of a partial structure of the rotating mechanism 20 shown in FIG. 37 when an electronic device 100 is in a folded state. As shown in FIG. 26. FIG. 27. FIG. 37, and FIG. 38, when the electronic device 100 is in the folded state, the stop members 80 on the first pin shaft 81 and the second pin shaft 82 no longer press the lifting plate 26, and the first rotating door plate 21 and the second rotating door plate 22 are spaced apart. In this case, the first rotating door plate 21, the second rotating door plate 22, and the lifting plate 26 jointly form the screen accommodating space 900.

Figure 39:
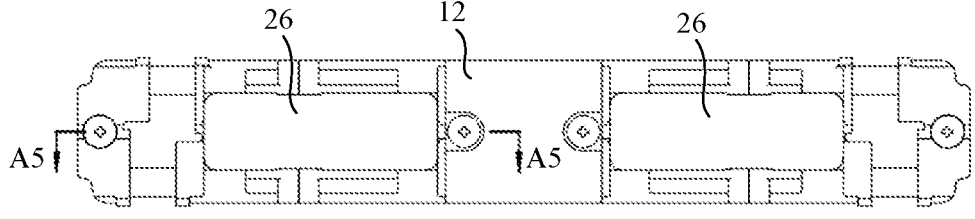
Figure 40:
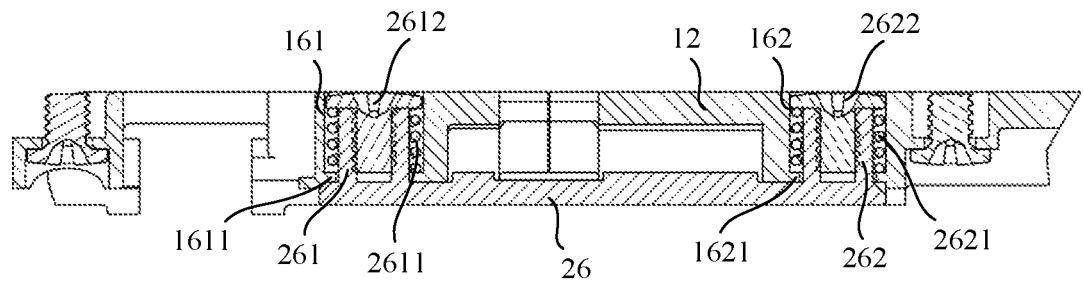

FIG. 39 is a bottom view of a primary inner shaft 12 and a lifting plate 26 of a rotating mechanism 20 when an electronic device 100 is in a folded state. FIG. 40 is a schematic diagram of a local cross-sectional structure of the primary inner shaft 12 and the lifting plate 26 shown in FIG. 39 along a section line A5-A5 shown in FIG. 39. As shown in FIG. 37 to FIG. 40, because the stop members 80 on the first pin shaft 81 and the second pin shaft 82 no longer press the lifting plate 26, the first lifting spring 2611 and the second lifting spring 2621 that are in a compressed state push the first fastener 2612 and the second fastener 2622 upward, to drive the lifting plate 26 to move upward to return. In this case, as shown in FIG. 40, the lifting plate 26 is closer to the bottom side of the primary inner shaft 12 than when the electronic device 100 is in the flattened state. Therefore, the first rotating door plate 21, the second rotating door plate 22, and the lifting plate 26 jointly form a larger screen accommodating space 900.

Figure 41:
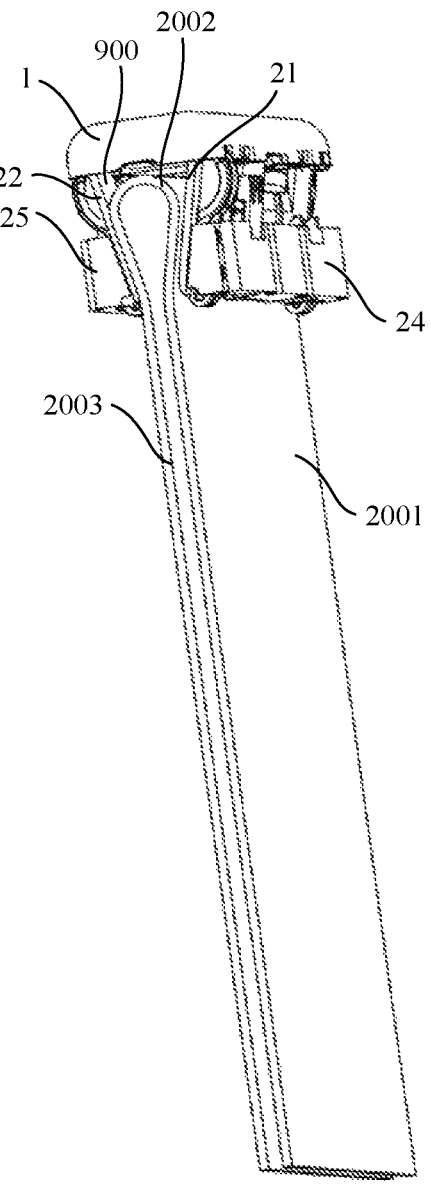

FIG. 41 is a schematic diagram of a structure of a rotating mechanism 20 and a flexible display screen 200 when an electronic device 100 is in a folded state. As shown in FIG. 41, the bending portion 2002 of the flexible display screen 200 is accommodated in the screen accommodating space 900 formed by the first rotating door plate 21, the second rotating door plate 22, and the lifting plate 26. The bending portion 2002 of the flexible display screen 200 is constrained to be in a shape of a water drop in the screen accommodating space 900. Because the lifting plate is closer to the primary shaft 1 in the folded state of the electronic device 100 than in the flattened state of the electronic device 100, the screen accommodating space 900 is increased, and a sufficient screen accommodating space 900 can be provided for the bending portion 2002 of the flexible display screen 200.

Figure 42:
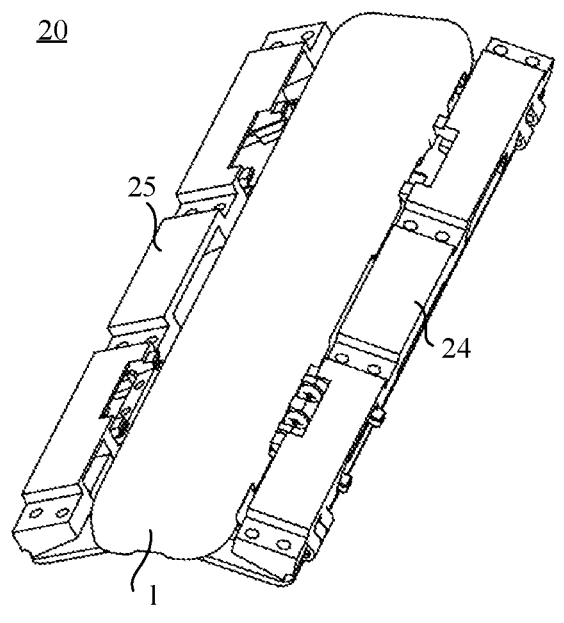
Figure 43:
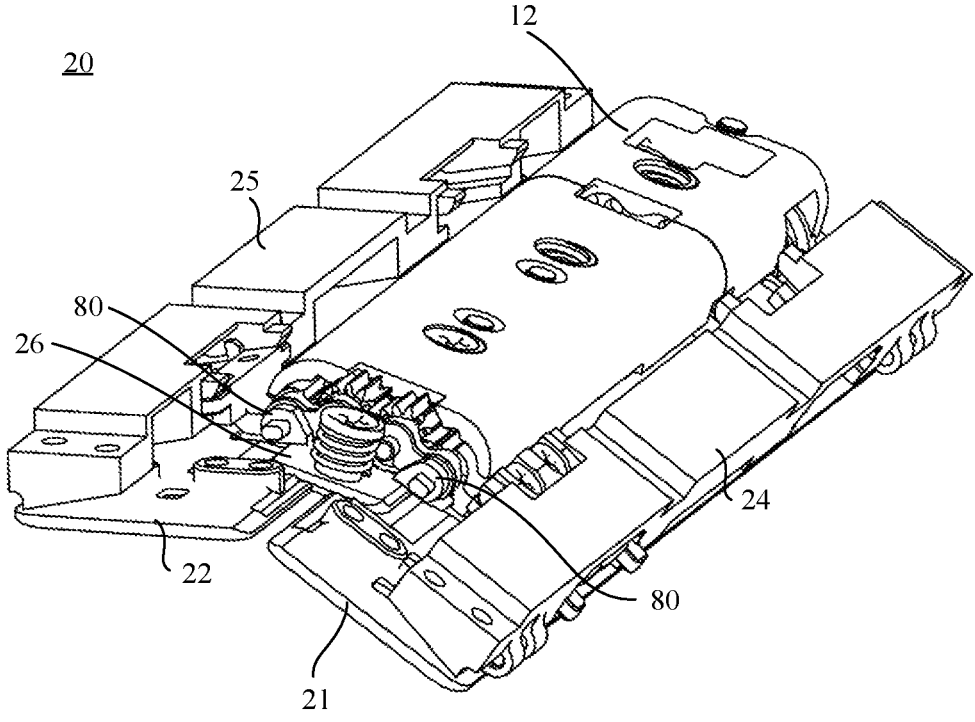

FIG. 42 is a schematic diagram of a structure of the rotating mechanism 20 shown in FIG. 9 when an electronic device 100 is in an intermediate state. FIG. 43 is a schematic diagram of a partial structure of the rotating mechanism 20 shown in FIG. 42 when an electronic device 100 is in an intermediate state. The intermediate state shown in FIG. 42 and FIG. 43 may be an intermediate state in a process in which the electronic device 100 changes from the flattened state to the folded state, or may be an intermediate state in a process in which the electronic device 100 changes from the folded state to the flattened state.

As shown in FIG. 26. FIG. 27. FIG. 42, and FIG. 43, in a process in which the electronic device 100 changes from the flattened state to the folded state, the pressing portions 803 of the stop members 80 on the first pin shaft 81 and the second pin shaft 82 are gradually separated from the lifting plate 26. In this case, the lifting plate 26 moves towards the primary shaft 1 under an action of the first lifting spring 2611 and the second lifting spring 2621. On the contrary: in a process in which the electronic device 100 changes from the folded state to the flattened state, the pressing portions 803 of the stop members 80 on the first pin shaft 81 and the second pin shaft 82 are gradually in contact with the lifting plate 26 and start to press the lifting plate 26. In this case, the stop members 80 can overcome elastic forces of the first lifting spring 2611 and the second lifting spring 2621 and push the lifting plate 26 in a direction away from the primary shaft 1.

In some embodiments, more or fewer stop members 80 may be arranged on the first pin shaft 81 and the second pin shaft 82, and the stop members 82 may be arranged at other positions on the first pin shaft 81 and the second pin shaft 82. This is not strictly limited in this embodiment of this application.

FIG. 44 to FIG. 54 are schematic diagrams of another implementation of the rotating mechanism. A connection relationship between the rotating mechanism and the first housing and a connection relationship between the rotating mechanism and the second housing may be the same as those in the foregoing implementations (the implementations shown in FIG. 1 to FIG. 8), and details are not described herein again. The electronic device and the folding apparatus provided in this implementation are of an architecture with a flexible display folded inward, and may be of a two-door plate architecture. No notch may be provided between the two door plates. That is, a joint between the two door plates does not need to be spliced with another plate structure to support the flexible display, but a complete plate structure is formed at the joint between the two door plates (a small gap may be formed at the joint), to improve support and stability of the folding apparatus for the flexible display.

Figure 44:
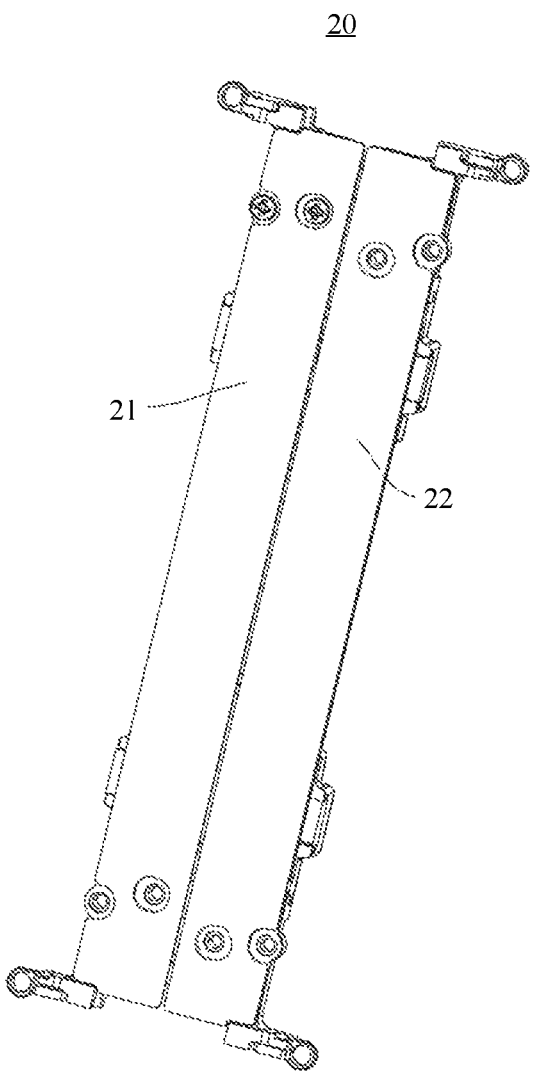
FIG. 44 to FIG. 54 are schematic diagrams of a rotating mechanism of a folding apparatus of an electronic device according to an implementation of this application.
Figure 45:
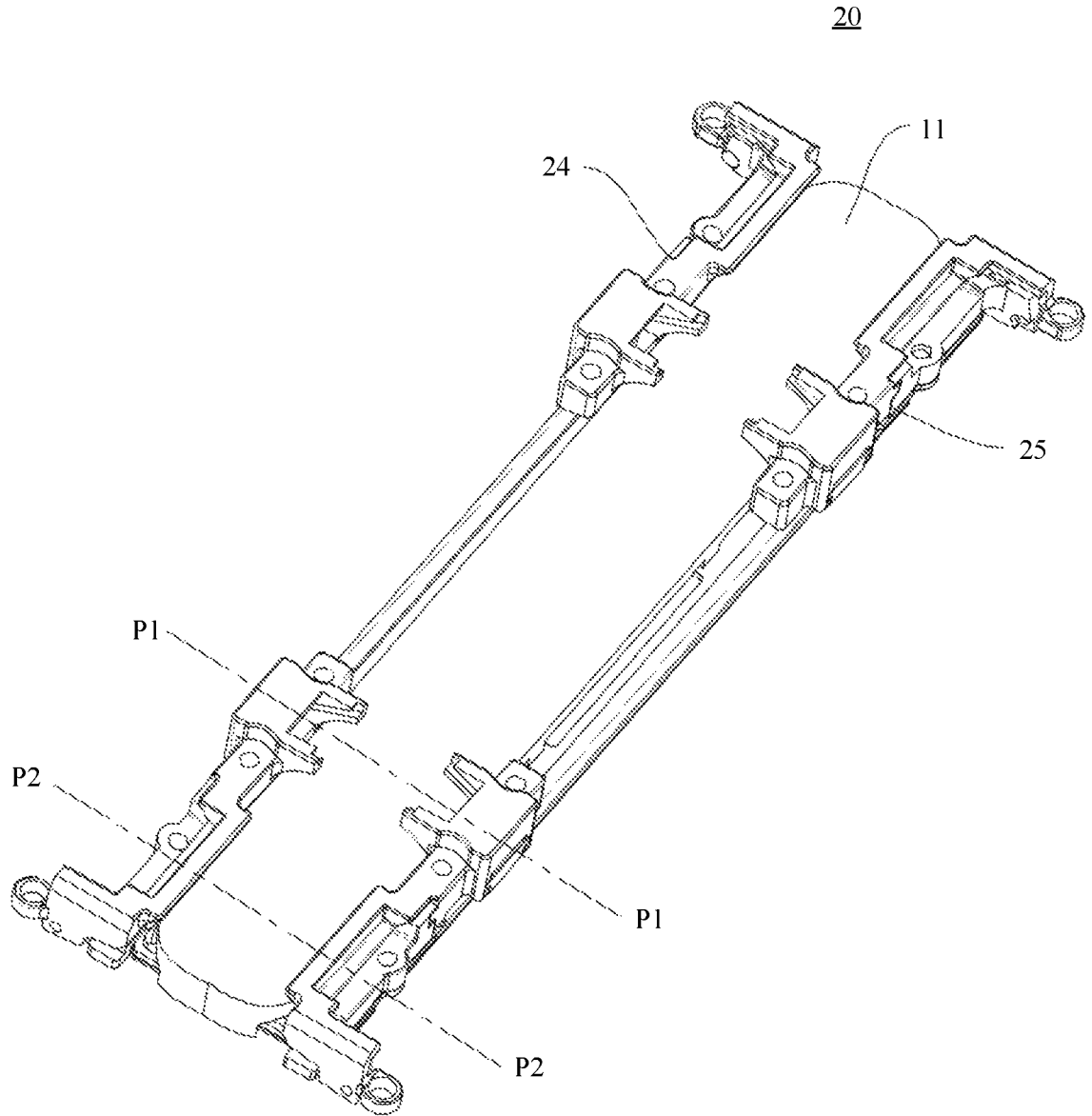
Figure 46:
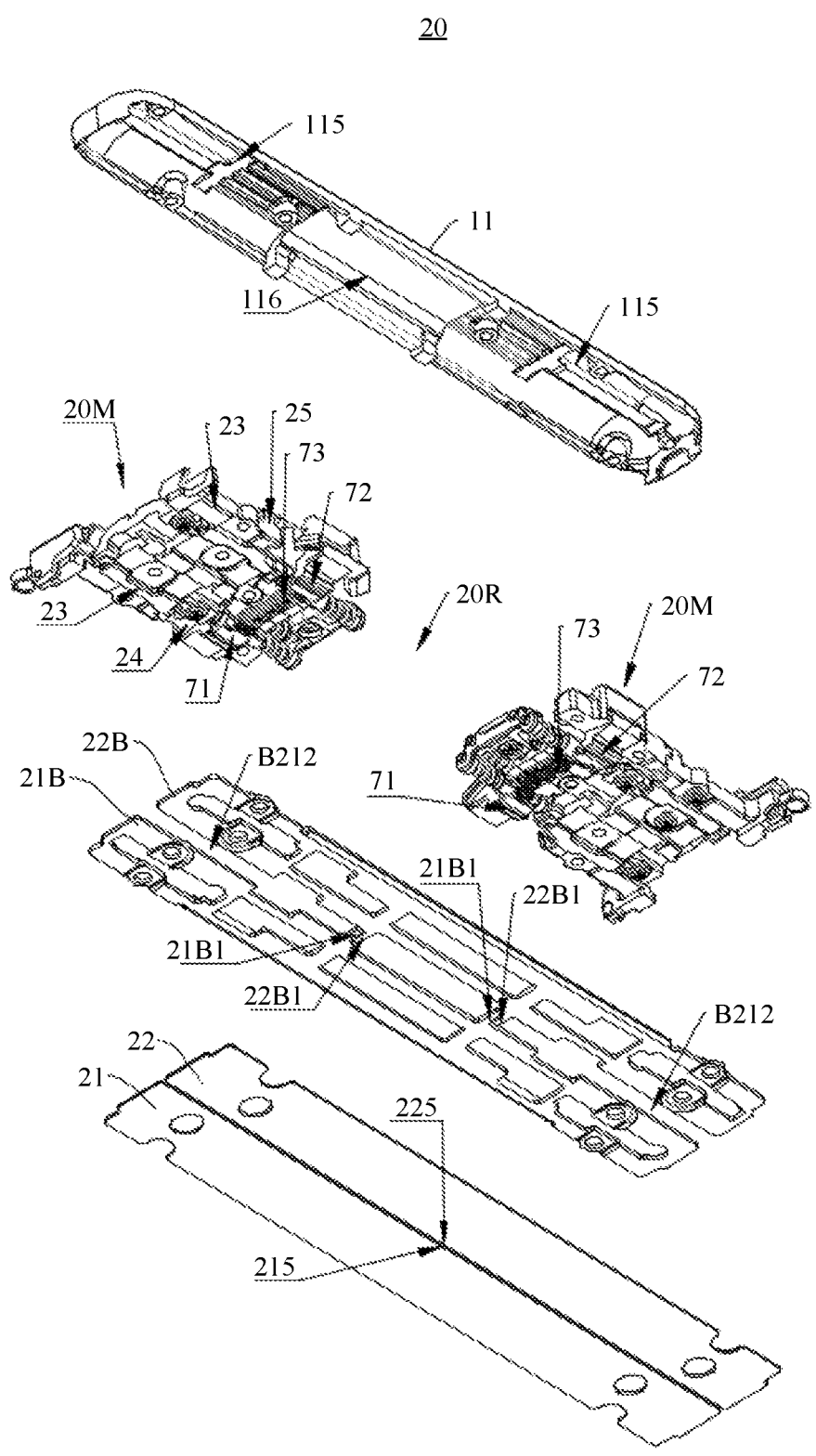
Figure 47:
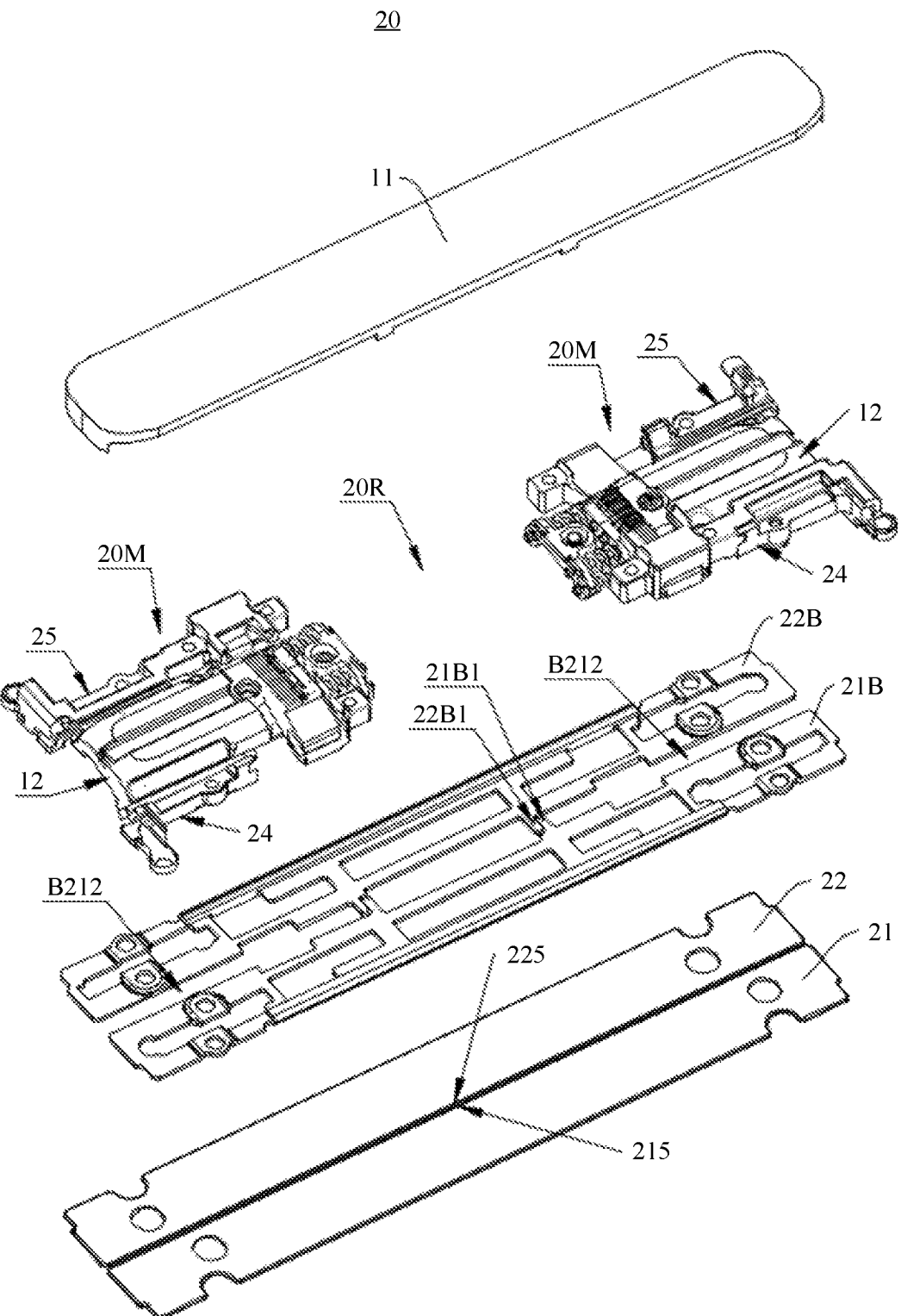

FIG. 44 is a three-dimensional diagram of a rotating mechanism 20 of a folding apparatus of an electronic device in a direction according to an implementation of this application. FIG. 45 is a three-dimensional diagram of a rotating mechanism 20 of a folding apparatus of an electronic device in another direction according to an implementation of this application. FIG. 46 is an exploded view of a rotating mechanism 20 of a folding apparatus of an electronic device in a direction according to an implementation of this application. FIG. 47 is an exploded view of a rotating mechanism 20 of a folding apparatus of an electronic device in another direction according to an implementation of this application.

Refer to FIG. 44. FIG. 45. FIG. 46, and FIG. 47, the rotating mechanism 20 includes a top cover 11, a rotating module 20M, a first rotating door plate 21, and a second rotating door plate 22. The first rotating door plate 21 and the second rotating door plate 22 are mechanical parts that are of the rotating mechanism 20 and that face the flexible display screen. When the electronic device is in the unfolded state, the first rotating door plate 21 and the second rotating door plate 22 jointly support the bending portion of the flexible display screen. When the electronic device is in the folded state, the screen accommodating space for accommodating the bending portion of the flexible display screen is formed between the first rotating door plate 21 and the second rotating door plate 22. The rotating module 20M is a core structure of the rotating mechanism 20, and is configured to provide an opening and closing function of the rotating mechanism 20 (opening and closing may be understood as rotation, and refers to a process of unfolding or folding). A specific structure of the rotating module 20M is described in detail in the following. A length direction of the rotating mechanism 20 is an extension direction of the rotating shaft of the rotating mechanism 20 in the unfolding or folding process. There may be one, two, or more rotating modules 20M, and the two or more rotating modules 20M may be arranged at intervals in a length direction of the rotating mechanism 20. In the implementations shown in FIG. 46 and FIG. 47, there are two rotating modules 20M, and space between the two rotating modules 20M is a threading space 20R, which is configured for a flexible circuit board of the electronic device to pass through. The flexible circuit board includes a first part, a second part, and a connection part connected between the first part and the second part. The first part is located on one side of the first housing of the folding apparatus of the electronic device, the second part is located on one side of the second housing of the folding apparatus of the electronic device, and the connection part is located in the threading space 20R. In this solution, the rotating mechanism is arranged as an architecture of at least two rotating modules. This modular design solution facilitates assembly and design. In addition, a threading space is designed between adjacent rotating modules, and this is also conducive to arrangement of a flexible circuit board of the electronic device.

In an implementation, the rotating mechanism 20 may further include a first bracket 21B and a second bracket 22B. Both quantities of the first bracket 21B and the second bracket 22B of the rotating mechanism 20 may be one. The first bracket 21B is connected to at least two rotating modules 20M. Specifically, the at least two rotating modules 20M are connected to different regions of the first bracket 21B. Similarly, the second bracket 22B is connected to at least two rotating modules 20M. Specifically, the at least two rotating modules 20M are connected to different regions of the second bracket 22B. The first rotating door plate 21 is fixedly connected to the first bracket 21B, and the second rotating door plate 22 is fixedly connected to the second bracket 22B. Specifically, the first bracket 21B is located between the first rotating door plate 21 and a part of the rotating module 20M, and the second bracket 22B is located between the second rotating door plate 22 and a part of the rotating module 20M. In another implementation, the first bracket 21B and the second bracket 22B may alternatively be a part of the rotating door plate of the rotating mechanism 20, that is, one of the rotating door plates may include the first rotating door plate 21 and the first bracket 21B, and the other rotating door plate may include the second rotating door plate 22 and the second bracket 22B.

A hollow region is arranged on both the first bracket 21B and the second bracket 22B. The hollow region may be configured to avoid a part of a structure on the rotating module 20M, and the hollow region may also reduce weights of the first bracket 21B and the second bracket 22B. A spacing space B212 is also arranged between the first bracket 21B and the second bracket 22B, and the spacing space B212 is configured to accommodate a part of a structure of the door plate swing arm 23 in the flattened state.

In a specific implementation, the first bracket 21B may include a first overlapping portion 21B1, and the second bracket 22B may include a second overlapping portion 22B1. In the flattened state, the first overlapping portion 21B1 and the second overlapping portion 22B1 are located at a joint between the first bracket 21B and the second bracket 22B. Projections of the first overlapping portion 21B1 and the second overlapping portion 22B1 at least partially overlap in the length direction of the rotating mechanism 20. By arranging the first overlapping portion 21B1 and the second overlapping portion 22B1, a case in which the bending portion of the flexible display is not well supported due to a long gap at the joint between the first rotating door plate 21 and the second rotating door plate 22 can be avoided. As shown in FIG. 46 and FIG. 47, both quantities of the first overlapping portions 21B1 and the second overlapping portions 22B1 are two, and a support structure may be formed in the long gap at the joint between the first rotating door plate 21 and the second rotating door plate 22. In the unfolded state, the first overlapping portion 21B1 and the second overlapping portion 22B1 jointly support the position of the joint between the first rotating door plate 21 and the second rotating door plate 22. In this solution, the position of the joint between the first rotating door plate 21 and the second rotating door plate 22 is a straight-line seam structure. For the first rotating door plate 21 and the second rotating door plate 22, the structure forms are simpler. For example, only a rectangular plate structure needs to be designed, and no overlapping structure needs to be arranged on the first rotating door plate 21 and the second rotating door plate 22. Instead, structural stability of the position of the joint is ensured by an overlapping structure on the first bracket 21B and the second bracket 22B.

In another implementation, an overlapping structure may be arranged on the first rotating door plate 21 and the second rotating door plate 22, and no overlapping structure is arranged on the first bracket 21B and the second bracket 22B. Alternatively, an overlapping structure is arranged on the first rotating door plate 21, the second rotating door plate 22, the first bracket 21B, and the second bracket 22B.

Refer to FIG. 46 and FIG. 47. In the flattened state, a complete seam without a hollow is formed at the joint between the first rotating door plate 21 and the second rotating door plate 22. The seam without a hollow may be understood that no notch, hollow: hollow region, or avoidance region needs to be arranged at the position of the joint between the first rotating door plate 21 and the second rotating door plate 22, and the first rotating door plate 21 and the second rotating door plate 22 can completely shield all structural features of the rotating module 20M. In an implementation, the seam of the joint between the first rotating door plate 21 and the second rotating door plate 22 may be a linear profile formed by splicing the first rotating door plate 21 and the second rotating door plate 22, and may not be a solid gap structure. That is, the position of the joint between the first rotating door plate 21 and the second rotating door plate 22 may be in a tightly closed state through contact or overlapping between the first rotating door plate 21 and the second rotating door plate 22. In an implementation, the first rotating door plate 21 and the second rotating door plate 22 may alternatively be not in contact with each other at the joint between the first rotating door plate 21 and the second rotating door plate 22. That is, a small gap is formed between an edge of the first rotating door plate 21 and an edge of the second rotating door plate 22. The small gap enables air to flow at the top and bottom of the first rotating door plate 21 and the second rotating door plate 22 in the flattened state. The small gap may be a gap formed by a factor such as an assembly tolerance or a design tolerance, and is not intended to avoid another structural feature. A small size of the gap does not affect support for the flexible display screen.

In a specific implementation, the joint between the first rotating door plate 21 and the second rotating door plate 22 forms a straight-line seam. That is, the first rotating door plate 21 includes a first straight-line edge 215, and the second rotating door plate 22 includes a second straight-line edge 225. The first straight-line edge 215 and the second straight-line edge 225 may be in contact, or may be spaced apart with a small gap.

The first rotating door plate 21 is fixedly connected to the door plate swing arm 23. Specifically, the first rotating door plate 21 and the door plate swing arm 23 are of an integrated structure, or the first rotating door plate 21 and the door plate swing arm 23 are fixedly connected by the fastener. Similarly, the second rotating door plate 22 is fixedly connected to the door plate swing arm 23. Specifically, the second rotating door plate 22 and the door plate swing arm 23 are of an integrated structure, or the second rotating door plate 22 and the door plate swing arm 23 are fixedly connected by the fastener. In this design, the first rotating door plate 21 and the second rotating door plate 22 can rotate synchronously relative to the primary shaft 1 with the door plate swing arm 23, to implement flattening and folding of the folding apparatus. The first rotating door plate 21 and the second rotating door plate 22 may be considered to be directly rotatably connected with the primary shaft 1, and no intermediate transmission structure needs to be arranged. This can ensure that the first rotating door plate 21 and the second rotating door plate 22 move more smoothly in a flattening and folding process and have a simple structure, and helps implement a miniaturization design of the folding apparatus.

The top cover 11 is a mechanical part of the rotating mechanism 20 away from the bending portion of the flexible display screen. The top cover 11 is configured to shield and protect an internal structure of the rotating mechanism 20. The top cover 11 is fixedly connected to all the rotating modules 20M. An inner surface of the top cover 11 includes at least two mounting regions 115. The at least two mounting regions 115 are in a one-to-one correspondence with the at least two rotating modules 20M. The mounting regions 115 are configured to connect the rotating modules 20M. A connection region 116 is between adjacent mounting regions 115. The connection region 116 and the threading space are correspondingly arranged, and the connection part of the flexible circuit board may be fixedly connected to the connection region 116. In this solution, a modular design solution is used to facilitate assembly and design. In addition, the threading space is designed between adjacent rotating modules. This is also conducive to arrangement of a flexible circuit board of the electronic device.

Figure 48:
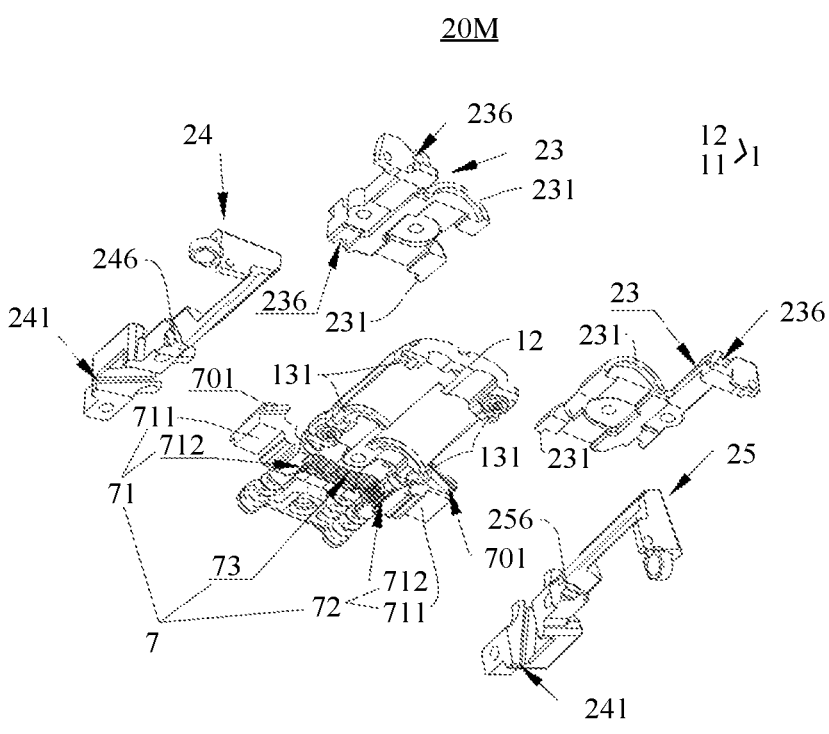
Figure 49:
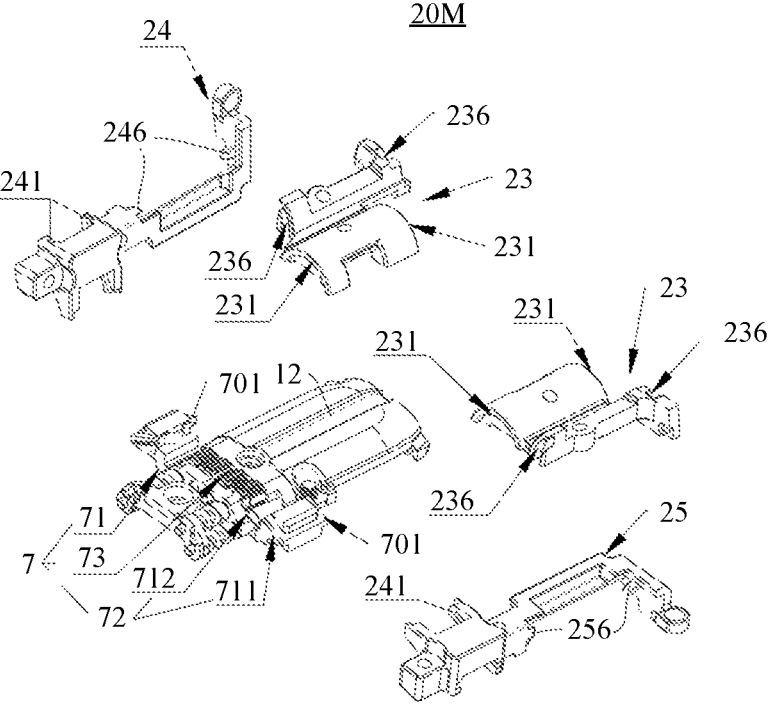

FIG. 48 is an exploded view of a rotating module 20M in a folding apparatus in a direction according to an implementation. FIG. 49 is an exploded view of a rotating module 20M in a folding apparatus in another direction according to an implementation. Refer to FIG. 48 and FIG. 49. A rotating module 20M provided in an implementation includes a primary inner shaft 12, a door plate swing arm 23, a first housing connecting rod 24, a second housing connecting rod 25, and a synchronous damping member 7. There are two door plate swing arms 23. One door plate swing arm 23 is fixedly connected to the first rotating door plate 21, and the other door plate swing arm 23 is fixedly connected to the second rotating door plate 22. Specifically: two threaded holes may be provided on each door plate swing arm 23. The door plate swing arm 23 and the first bracket 21B may be fixedly connected by fitting a screw and a threaded hole, and the door plate swing arm 23 and the second bracket 22B may be fixedly connected by fitting a screw and a threaded hole. The door plate swing arm 23 is rotatably connected to the primary inner shaft 12. In an implementation, the door plate swing arm 23 and the primary inner shaft 12 may be rotatably connected by fitting an arc-shaped arm and an arc-shaped groove. The door plate swing arm 23 includes a first rotating portion 231, and the primary inner shaft 12 includes a second rotating portion 131. The first rotating portion 231 is of an arc-shaped arm structure, and the second rotating portion 131 is of an arc-shaped slot structure. The first rotating portion 231 is rotatably connected to the second rotating portion 131. One of the door plate swing arms 23 is movably connected to the first housing connecting rod 24 (the two may be rotatably connected by fitting an arc-shaped arm and an arc-shaped groove, or may be rotatably connected by fitting a rotating shaft and a shaft hole, or may be slidably connected by fitting a sliding block and a sliding slot). The other door plate swing arm 23 is movably connected to the second housing connecting rod 25 (the two may be rotatably connected by fitting an arc-shaped arm and an arc-shaped groove, or may be rotatably connected by fitting a rotating shaft and a shaft hole, or may be slidably connected by fitting a sliding block and a sliding slot). In the implementations shown in FIG. 48 and FIG. 49, the door plate swing arm 23 includes an arc-shaped groove 236, a first arc-shaped block 246 is arranged on the first housing connecting rod 24, and a second arc-shaped block 256 is arranged on the second housing connecting rod 25. A movable connection between the first rotating door plate 21 and the first housing connecting rod 24 is implemented by fitting the arc-shaped groove 236 and the first arc-shaped block 246. A movable connection between the second rotating door plate 22 and the second housing connecting rod 25 is implemented by fitting the arc-shaped groove 236 and the second arc-shaped block 256. It may be understood that, alternatively, an arc-shaped block may be arranged on the door plate swing arm 23, and an arc-shaped groove may be provided on the first housing connecting rod 24 and the second housing connecting rod 25.

The synchronous damping member 7 includes a first transmission connecting rod 71, a second transmission connecting rod 72, and a transmission module 73 that are rotatably connected to the primary inner shaft 12 of the primary shaft 1. Each of the first transmission connecting rod 71 and the second transmission connecting rod 72 includes a sliding end 711 and a rotating end 712. The rotating ends 712 of the first transmission connecting rod 71 and the second transmission connecting rod 72 cooperate with the transmission module 73. The sliding end 711 of the first transmission connecting rod 71 is slidably connected to the first housing connecting rod 24, and the first housing connecting rod 24 is fastened to the first housing of the folding apparatus of the electronic device. The sliding end 711 of the second transmission connecting rod 72 is slidably connected to the second housing connecting rod 25, and the second housing connecting rod 25 is fastened to the second housing of the folding apparatus of the electronic device. In the implementations shown in FIG. 46, FIG. 47, and FIG. 48, in the flattened state, in a length direction perpendicular to the primary shaft 1 (the top cover 11), the transmission module 73 directly faces a position of a joint between the first rotating door plate 21 and the second rotating door plate 22, that is, no hollow structure (which may be understood as a notch structure) configured to avoid the synchronous damping member 7 is arranged at the position of the joint between the first rotating door plate 21 and the second rotating door plate 22. It may also be understood as that in the flattened state, the transmission module 73 is located between the position of the joint between the first rotating door plate 21 and the second rotating door plate 22 and the primary inner shaft 12, and the position of the joint between the first rotating door plate 21 and the second rotating door plate 22 falls within a vertical projection range of the transmission module 73 on the first rotating door plate 21 and the second rotating door plate 22.

A sliding fitting structure between the sliding end 711 of the first transmission connecting rod 71 and the first housing connecting rod 24 and a sliding fitting structure between the sliding end 711 of the second transmission connecting rod 72 and the second housing connecting rod 25 are the same in the foregoing implementations, and can both implement slidable connection by fitting the guide flange 701 and the guide groove 241. Details are not described herein again.

In some implementations, both the rotating end 712 of the first transmission connecting rod 71 and the rotating end 712 of the second transmission connecting rod 72 may include a tooth structure configured to be engaged with the gear group 73. The first transmission connecting rod 71 and the second transmission connecting rod 72 have a same structure and are symmetrically distributed on two sides of the gear group 73, to implement synchronous movement between the first housing and the second housing of the folding apparatus in a process of unfolding and folding. In some implementations, the rotating end 712 of the first transmission connecting rod 71 and the rotating end 712 of the second transmission connecting rod 72 may not include a tooth structure. The rotating end 712 of the first transmission connecting rod 71 may be fastened to a rotation shaft of the rotating end 712. A gear may be sleeved between the rotating end 712 of the first transmission connecting rod 71 and the rotation shaft of the rotating end 712, and the gear is fixedly connected to the rotation shaft of the rotating end 712. The rotating end 712 of the first transmission connecting rod 71 is engaged with the gear group 73 by the gear. When the rotating end 712 of the first transmission connecting rod 71 rotates, the gear rotates synchronously, and is engaged with and rotates synchronously with the gear group 73. A side of the second transmission connecting rod 72 is designed to be the same as or similar to that of the second transmission connecting rod 71, to implement synchronous movement between the first transmission connecting rod 71 and the second transmission connecting rod 72.

Figure 50:
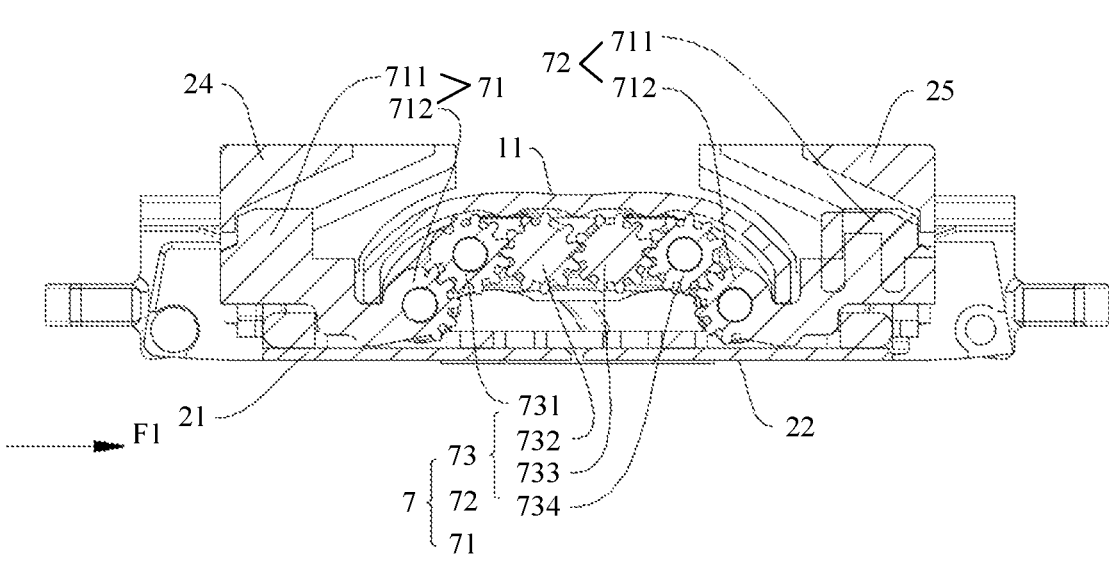
Figure 51:
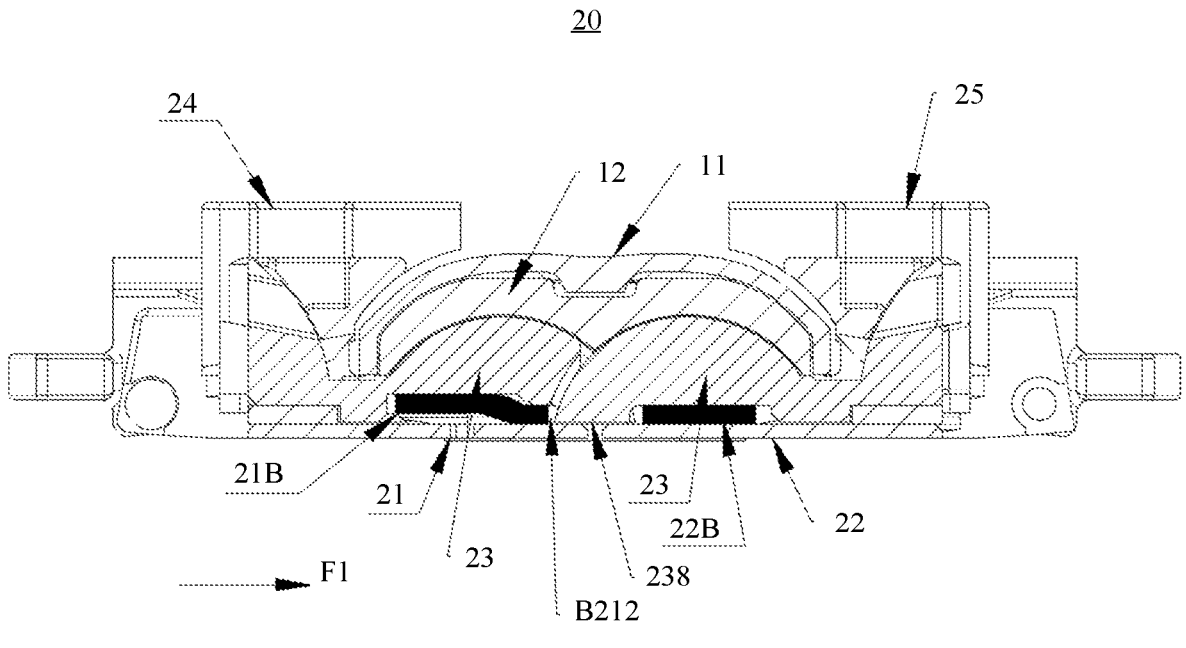

FIG. 50 and FIG. 51 are cross-sectional views of a rotating mechanism of a folding apparatus of an electronic device according to an implementation of this application. FIG. 50 is a cross-sectional view at a position of P1-P1 in the implementation shown in FIG. 45, and FIG. 51 is a cross-sectional view at a position of P2-P2 in the implementation shown in FIG. 45. FIG. 50 is a cross-sectional view at a position of a synchronous damping member 7. FIG. 51 is a cross-sectional view at a position of a door plate swing arm 23. Refer to FIG. 50. In an implementation, the transmission module 73 is of a gear group architecture. The transmission module 73 includes a plurality of gears engaged with each other, and a quantity of gears is an even number, to implement synchronous movement between the first housing and the second housing in a process of unfolding or folding. In a specific implementation, the transmission module 73 may include four gears. The transmission module 73 includes a first edge gear 731, a first intermediate gear 732, a second intermediate gear 733, and a second edge gear 734 that are arranged in a first direction F1 and that are sequentially engaged with each other. The first direction F1 is a direction in which the first rotating door plate (21) and the second rotating door plate (22) are arranged in the flattened state. The first edge gear 731 is engaged with the rotating end 712 of the first transmission connecting rod 71, and the second edge gear 734 is engaged with the rotating end 712 of the second transmission connecting rod 72. In an implementation, in the flattened state, a spacing distance between a rotation center of the rotating end 712 of the first transmission connecting rod 71 and the first rotating door plate 21 is less than a spacing distance between a rotation center of the first edge gear 731 and the first rotating door plate 21. A spacing distance between a rotation center of the rotating end 712 of the second transmission connecting rod 72 and the second rotating door plate 22 is less than a spacing distance between a rotation center of the second edge gear 734 and the second rotating door plate 22. The spacing distance between the rotation center of the first edge gear 731 and the first rotating door plate 21 is the same as the spacing distance between the rotation center of the second edge gear 734 and the second rotating door plate 22.

Refer to FIG. 50. In the flattened state, a projection of the first intermediate gear 732 on a plane on which the first rotating door plate 21 is located is at least partially located on the first rotating door plate 21. A projection of the second intermediate gear 733 on a plane on which the second rotating door plate 22 is located is at least partially located on the second rotating door plate 22. The first intermediate gear 732 and the second intermediate gear 733 may be engaged at a position directly facing the position of the seam at the joint between the first rotating door plate 21 and the second rotating door plate 22. In an implementation, the first edge gear 731, the first intermediate gear 732, the second intermediate gear 733, and the second edge gear 734 may be gear structures of a same size. During assembly of the transmission module 73, there is no need to consider a position arrangement of each gear in the transmission module 73, because all the gears in the transmission module 73 have a same structure, and any position adjustment of the gears does not affect a structural form and an action principle of the assembled synchronous damping member 7.

Figure 50A:
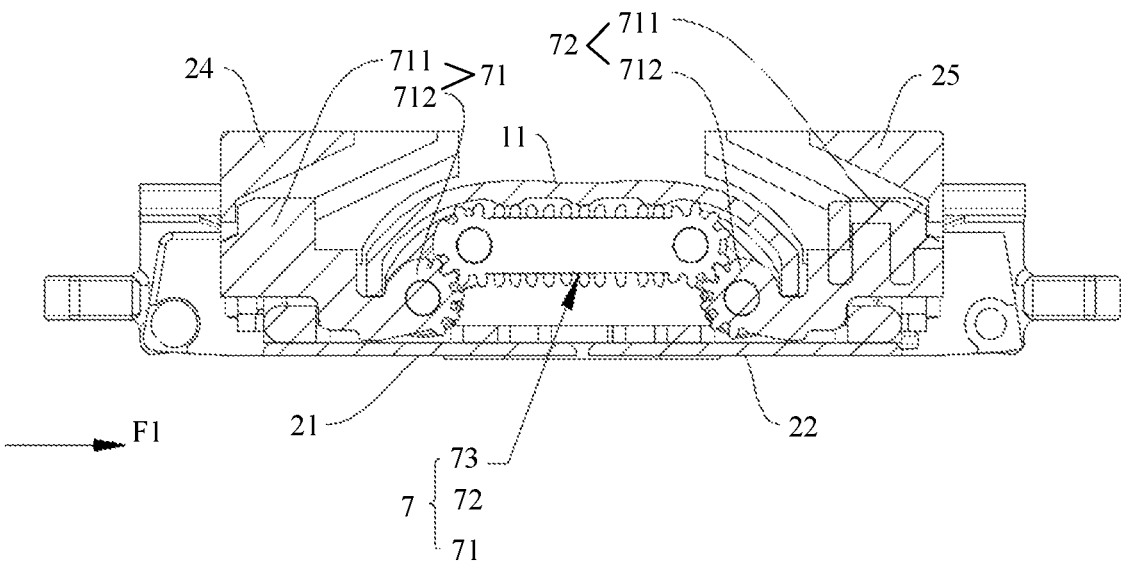
FIG. 50A is a cross-sectional view of a rotating mechanism of a folding apparatus of an electronic device in a flattened state according to an implementation of this application.

In another implementation, refer to FIG. 50A. The synchronous damping member 7 includes a first transmission connecting rod 71, a second transmission connecting rod 72, and a transmission module 73 arranged between the first transmission connecting rod 71 and the second transmission connecting rod 72. The transmission module 73 may be of a structure of a conveyor belt, and a tooth structure is arranged on an outer surface of the conveyor belt. The transmission module 73 may be engaged with the rotating end 712 of the first transmission connecting rod 71, and the transmission module 73 may alternatively be synchronously engaged with the rotating end 712 of the second transmission connecting rod 72. In an implementation, a transmission gear may be arranged between the conveyor belt and one of the rotating ends, to implement synchronous movement between the first housing and the second housing in a flattening and folding processes.

In another implementation, transmission of movement between the transmission module 73 (for example, an architecture of a conveyor belt) and the rotating end 712 of the first transmission connecting rod 71 may alternatively be implemented in a friction fitting manner, and motion transmission between the transmission module (for example, an architecture of a conveyor belt) and the rotating end 712 of the second transmission connecting rod 72 may alternatively be implemented in a friction fitting manner.

In summary: the transmission module 73 defined in this application may be a structure of a gear group, a structure of a conveyor belt, or another structure having a transmission function, for example, a connecting rod structure. This is not limited in this application, and is uniformly referred to as a superordinate transmission module.

Refer to FIG. 51. The door plate swing arm 23 is fixedly connected to the first rotating door plate 21. It can be seen that a partial structure of the door plate swing arm 23 passes through the spacing space B212 between the first bracket 21B and the second bracket 22B to be in contact with the first rotating door plate 21. Therefore, the spacing space B212 between the first bracket 21B and the second bracket 22B may be configured to accommodate a part of the door plate swing arm 23. Similarly, the second bracket 22B is fixedly connected between the door plate swing arm 23 and the second rotating door plate 22. It can be seen that a partial structure of the door plate swing arm 23 passes through the spacing space B212 between the first bracket 21B and the second bracket 22B to be in contact with the second rotating door plate 22. Therefore, the spacing space B212 between the first bracket 21B and the second bracket 22B may be configured to accommodate a part of the door plate swing arm 23. In the flattened state, the door plate swing arm 23 includes a joint-seam support surface 238. The joint-seam support surface 238 is located at the position of the joint between the first rotating door plate 21 and the second rotating door plate 22, a part of the joint-seam support surface 238 is in contact with the first rotating door plate 21, and a part of the joint-seam support surface 238 is in contact with the second rotating door plate 22. This solution can improve structural stability of the first rotating door plate 21 and the second rotating door plate 22 in the flattened state. As shown in FIG. 51, the door plate swing arm 23 is connected between the primary inner shaft 12 and the first rotating door plate 21 and the second rotating door plate 22, and a continuous physical structure connection is implemented between the primary inner shaft 12 and the first rotating door plate 21 and the second rotating door plate 22, so that structural stability of the folding apparatus in the flattened state can be improved.

Figure 52:
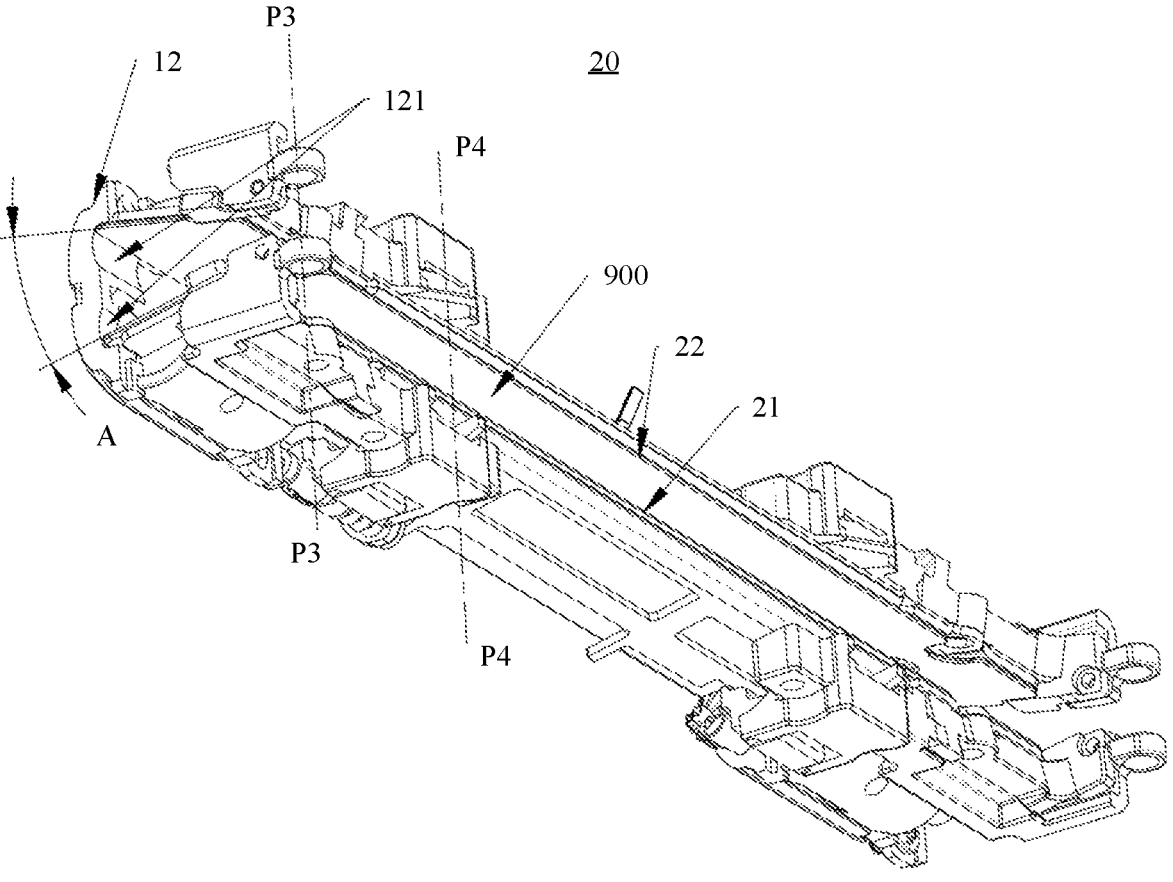
Figure 53:
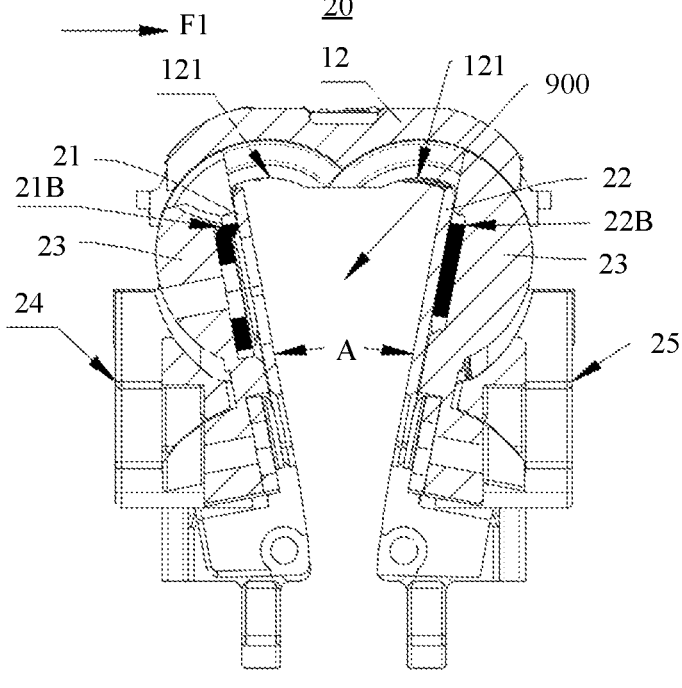
Figure 54:
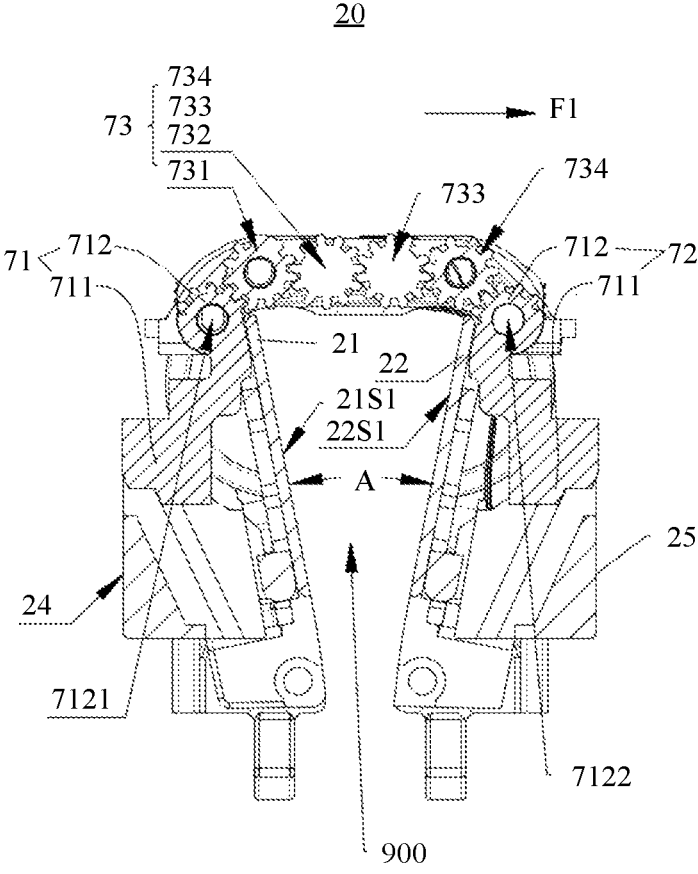

FIG. 52. FIG. 53, and FIG. 54 are a three-dimensional diagram and cross-sectional views at two positions of a rotating mechanism 20 in a folded state. FIG. 53 is a cross-sectional view at a position of P3-P3 in the implementation shown in FIG. 52, and FIG. 54 is a cross-sectional view at a position of P4-P4 in the implementation shown in FIG. 52. In an implementation, the first rotating door plate 21 includes a first support surface 21S1, the second rotating door plate 22 includes a second support surface 22S1. Both the first support surface 21S1 and the second support surface 22S1 face the flexible display screen, and are configured to support the flexible display screen in the flattened state of the rotating mechanism 20. Refer to FIG. 52. FIG. 53, and FIG. 54. When the rotating mechanism 30 is in the folded state, a first angle A is formed between a plane on which the first support surface 21S1 is located and a plane on which the second support surface 22S1 is located. A screen accommodating space 900 is formed between the first rotating door plate 21 and the second rotating door plate 22. Specifically, the first support surface 21S1, the primary inner shaft 12, and the second support surface 22S1 jointly enclose the screen accommodating space 900. The screen accommodating space 900 is configured to accommodate the bending portion of the flexible display screen, and the bending portion of the flexible display screen naturally bends in the screen accommodating space 900 in a shape of a water drop. Specifically, in this application, an angle between the first support surface 21S1 and the second support 22S1 is limited to the first angle A when the rotating mechanism 20 is in the folded state, to ensure that both the first rotating door plate 21 and the second rotating door plate 22 apply no force on the flexible display screen 200, so that the flexible display screen 200 is in a naturally bent state. That the flexible display screen 200 is in a bent state is not subject to any pulling force or push force. This solution helps improve a service life of the flexible display screen. In an implementation, the flexible display screen and the two rotating door plates are not fixedly connected, but can still be in natural contact in the folded state. Specifically, the first rotating door plate 21 is not connected to the flexible display screen 200, the second rotating door plate 22 is not connected to the flexible display screen 200, a part of the flexible display screen is in contact with the first rotating door plate 21, and a part of the flexible display screen is in contact with the second rotating door plate 22. In another implementation, the flexible display screen and the two rotating door plates 21 and 22 may have a connection relationship, for example, may be bonded by an adhesive. However, in the folded state, a connection position between the flexible display screen and the two rotating door plates is not subject to force, and it can also be ensured that the flexible display screen is naturally bent in a shape of a water drop in a bent state.

Refer to FIG. 53 and FIG. 54, both the rotation center of the rotating end 712 of the first transmission connecting rod 71 and the rotation center of the rotating end 712 of the second transmission connecting rod 72 are located outside a range of the first angle A. In this solution, the rotating end 712 of the first transmission connecting rod 71 and the rotating end 712 of the second transmission connecting rod 72 are limited to be located outside the first angle A, so that a structure of a notch or a hole configured to avoid a corresponding transmission connecting rod (the first transmission connecting rod 71 and the second transmission connecting rod 72) does not need to be arranged on the first rotating door plate 21 and the second rotating door plate 22. The first rotating door plate 21 and the second rotating door plate 22 can form a complete plate-shaped architecture in the flattened state. The complete plate-shaped architecture can block the synchronous damping member 7, so that the flexible display screen obtains a good support force, and structural stability of the electronic device is improved.

In an implementation, the primary inner shaft 12 includes an avoidance surface 121, and the avoidance surface 121 is located on a surface of the primary inner shaft 12 facing the screen accommodating space 900 and is concave inward. Specifically, the avoidance surface 121 is an arc-shaped concave inward surface. In a process of unfolding and folding, the avoidance surface 121 is configured to avoid the first rotating door plate 21 and the second rotating door plate 22. As shown in FIG. 52 and FIG. 53, in a folded state, an edge of the first rotating door plate 21 and an edge of the second rotating door plate 22 are located at an edge position of the avoidance surface 121. The edge of the first rotating door plate 21 and the edge of the second rotating door plate 22 may be in contact with the avoidance surface 121, or a small gap may be maintained.

Refer to FIG. 54. In an implementation, in the folded state of the rotating mechanism 20, the rotation center of the rotating end 712 of the first transmission connecting rod 71 is located on a side of the first rotating door plate 21 facing away from the second rotating door plate 22, and the rotation center of the rotating end 712 of the second transmission connecting rod 72 is located on a side of the second rotating door plate 22 facing away from the first rotating door plate 21. In an implementation, in the folded state of the rotating mechanism 20, the rotation center of the rotating end 712 of the first transmission connecting rod 71 is located on a side of an extension surface of the first rotating door plate 21 facing away from an extension surface of the second rotating door plate 22, and the rotation center of the rotating end 712 of the second transmission connecting rod 72 is located on a side of the extension surface of the second rotating door plate 22 facing away from the extension surface of the first rotating door plate 21. It may be understood that the rotation center of the rotating end 712 of the first transmission connecting rod 71 is located on a side of the first rotating door plate 21 (or the extension surface of the first rotating door plate 21) facing away from the screen accommodating space, and the rotation center of the rotating end 712 of the second transmission connecting rod 72 is located on a side of the second rotating door plate 22 (or the extension surface of the second rotating door plate 22) facing away from the screen accommodating space. In this application, a position relationship between the rotation center of the rotating end 712 of the first transmission connecting rod 71 and the first rotating door plate 21 and a position relationship between the rotation center of the rotating end 712 of the second transmission connecting rod 72 and the second rotating door plate 22 are limited, so that disposing of the first transmission connecting rod 71 and the second transmission connecting rod 72 does not affect structural integrity of the first rotating door plate 21 and the second rotating door plate 22, that is, a structure of a notch or a hole configured to avoid a corresponding transmission connecting rod does not need to be arranged on the first rotating door plate 21 and the second rotating door plate 22.

In an implementation, the rotation center of the rotating end 712 of the first transmission connecting rod 71 is a first center 7121, the rotation center of the rotating end 712 of the second transmission connecting rod 72 is a second center 7122. In the folded state, a vertical distance (or a distance in the first direction F1) between the first center 7121 and the second center 7122 is greater than a maximum distance between the first rotating door plate (21) and the second rotating door plate (22) in the first direction F1. The first direction F1 is a direction in which the first rotating door plate (21) and the second rotating door plate (22) are arranged in the flattened state. The first direction F1 is also a direction of the first center 7121 towards the second center 7122, and is also an extension direction of vertical connection between the first center 7121 and the second center 7122. The first direction F1 is also a direction of the first center 7121 towards the second center 7122. In this solution, a distance between the rotation center of the rotating end 712 of the first transmission connecting rod 71 and the rotation center of the rotating end 712 of the second transmission connecting rod 72 is limited. Because the distance between the first center 7121 and the second center 7122 is greater than the maximum distance between the first rotating door plate 21 and the second rotating door plate 22 in the first direction F1, specific positions of the rotating end 712 of the first transmission connecting rod 71 and the rotating end 712 of the second transmission connecting rod 72 may be limited, so that the structure of a notch or hole configured to avoid a corresponding transmission connecting rod does not need to be arranged on the first rotating door plate 21 and the second rotating door plate 22. The first rotating door plate 21 and the second rotating door plate 22 can form a complete plate-shaped architecture in the flattened state. The complete plate-shaped architecture can block the synchronous damping member 7, so that the flexible display screen obtains a good support force, and structural stability of the electronic device is improved.

In an implementation, in a process of flattening and folding of the first rotating door plate 21 and the second rotating door plate 22, a central axis (that is, a rotating shaft of rotatable connection of the first transmission connecting rod 71 relative to the primary shaft 1) of the rotating end 712 of the first transmission connecting rod 71 and a rotating shaft of rotatable connection of the first rotating door plate 21 relative to the primary shaft 1 are not collinear. A central axis (that is, a rotating shaft of rotatable connection of the second transmission connecting rod 72 relative to the primary shaft 1) of the rotating end 712 of the second transmission connecting rod 72 and a rotating shaft of rotatable connection of the second rotating door plate 22 relative to the primary shaft 1 are not collinear.

In an implementation, in a process of flattening and folding of the first rotating door plate 21 and the second rotating door plate 22, an axis of the door plate swing arm 23 arranged on the first rotating door plate 21 that rotates relative to the primary shaft 1 is located in a space enclosed by the first rotating door plate 21 (or an extension surface of a plane on which the first rotating door plate 21 is located) and the second rotating door plate 22 (or an extension surface of a plane on which the second rotating door plate 22 is located). An axis of the door plate swing arm 23 arranged on the second rotating door plate 22 that rotates relative to the primary shaft 1 is located in the space enclosed by the first rotating door plate 21 (or the extension surface of the plane on which the first rotating door plate 21 is located) and the second rotating door plate 22 (or the extension surface of the plane on which the second rotating door plate 22 is located). An axis of the rotating end 712 of the first transmission connecting rod 71 that rotates relative to the primary shaft 1 is located outside the space enclosed by the first rotating door plate 21 (or the extension surface of the plane on which the first rotating door plate 21 is located) and the second rotating door plate 22 (or the extension surface of the plane on which the second rotating door plate 22 is located). An axis of the rotating end 712 of the second transmission connecting rod 72 that rotates relative to the primary shaft 1 is located outside the space enclosed by the first rotating door plate 21 (or the extension surface of the plane on which the first rotating door plate 21 is located) and the second rotating door plate 22 (or the extension surface of the plane on which the second rotating door plate 22 is located).

The door plate swing arm 23 is arranged on each of the first rotating door plate 21 and the second rotating door plate 22. Therefore, in a process of flattening and folding of the first rotating door plate 21 and the second rotating door plate 22, an axis of the first rotating door plate 21 rotating relative to the primary shaft 1 is located in the space enclosed by the first rotating door plate 21 (or the extension surface of the plane on which the first rotating door plate 21 is located) and the second rotating door plate 22 (or the extension surface of the plane on which the second rotating door plate 22 is located). An axis of the second rotating door plate 22 rotating relative to the primary shaft 1 is located in the space enclosed by the first rotating door plate 21 (or the extension surface of the plane on which the first rotating door plate 21 is located) and the second rotating door plate 22 (or the extension surface of the plane on which the second rotating door plate 22 is located).

In some implementations, the rotating shaft of the rotatable connection of the first rotating door plate 21 relative to the primary shaft 1 is located in the screen accommodating space 900, and the central axis of the rotating end 712 of the first transmission connecting rod 71 is located outside the screen accommodating space. The rotating shaft of the rotatable connection of the second rotating door plate 22 relative to the primary shaft 1 is located in the screen accommodating space 900, and the central axis of the rotating end 712 of the second transmission connecting rod 72 is located outside the screen accommodating space.

Figure 54A:
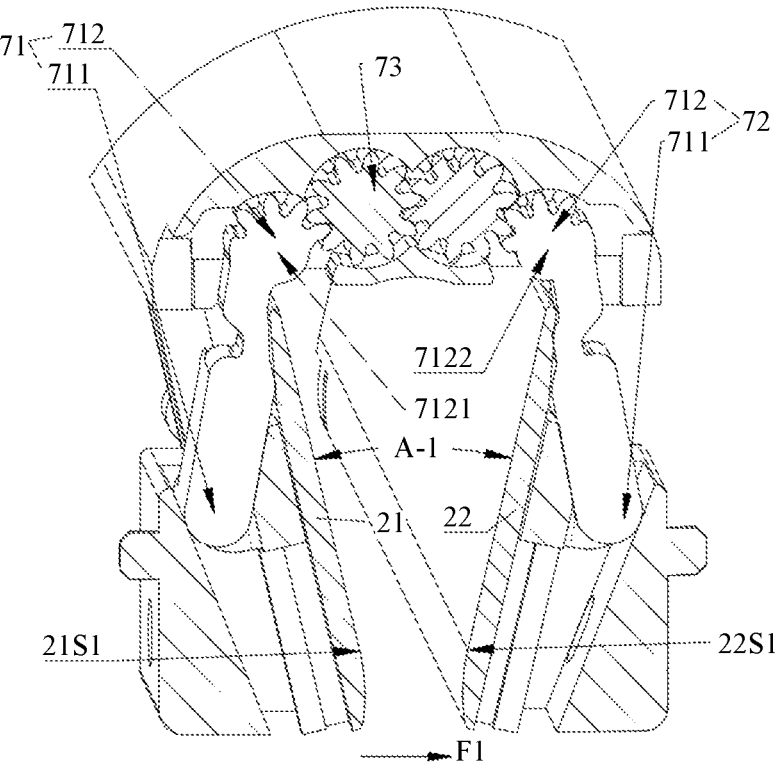
FIG. 54A is a cross-sectional view of the folding apparatus of the electronic device in a folded state in a direction according to the implementation of this application shown in FIG. 1 to FIG. 43.

FIG. 54A is a cross-sectional view of the folding apparatus of the electronic device in a folded state in a direction according to the implementations shown in FIG. 1 to FIG. 43. Refer to FIG. 54A. In the folded state, the rotation center of the rotating end 712 of the first transmission connecting rod 71 may be located on a side of the first rotating door plate 21 (or the extension surface of the first rotating door plate 21) facing the second rotating door plate 22 (or the extension surface of the second rotating door plate 22), and the sliding end 711 of the first transmission connecting rod 71 may be located on a side of the first rotating door plate 21 facing away from the second rotating door plate 22. The rotation center of the rotating end 712 of the second transmission connecting rod 72 may be located on a side of the extension surface of the second rotating door plate 22 facing the extension surface of the first rotating door plate 21, and the sliding end 711 of the second transmission connecting rod 72 may be located on a side of the second rotating door plate 22 facing away from the first rotating door plate 21. In the folded state, a distance between the rotation center (the first center 7211) of the rotating end 712 of the first transmission connecting rod 71 and the rotation center (the second center 7212) of the rotating end 712 of the second transmission connecting rod 72 in the first direction F1 is less than the maximum distance between the first rotating door plate 21 and the second rotating door plate 22 in the first direction F1. The first rotating door plate 21 and the second rotating door plate 22 form a second angle A–1, and both the rotation center of the rotating end of the first transmission connecting rod 71 and the rotation center of the rotating end of the second transmission connecting rod 72 are located in a range of the second angle A–1. The folding apparatus provided in this solution can provide a large screen accommodating space. Specifically: the first rotating door plate 21 is fixedly connected to the flexible display screen, and the second rotating door plate 22 is fixedly connected to the flexible display screen. The first rotating door plate 21 and the second rotating door plate 22 have a pulling force on the flexible display screen, and a direction of the pulling force is a direction away from a central position of the screen accommodating space 900. In this solution, a large bending space may be formed on the flexible display screen in a bent state. It may also be understood that in this solution, a curvature radius of the bending portion of the flexible display screen in a bent state is great and is greater than a curvature radius in a natural bent state. This solution helps ensure a service life of the flexible display screen, so that the electronic device can adapt to different use environments, for example, a harsh environment with a high temperature and high humidity, and the flexible display screen of the electronic device still has a good service life.

The first angle A in the implementation shown in FIG. 53 is less than the second angle A–1 in the implementation shown in FIG. 54A. By using such a design, when the folding apparatus in the implementation shown in FIG. 53 is in the folded state, a proper screen accommodating space can be defined between the first rotating door plate 21 and the second rotating door plate 22, and it can be ensured that the flexible display screen is naturally bent in a shape of a water drop in a bent state.

The structural designs and position arrangement of the first transmission connecting rod 71, the second transmission connecting rod 72, and the transmission module 73 provided in the implementation shown in FIG. 54A are also applicable to the specific implementations shown in FIG. 44 to FIG. 47.

The structural designs and position arrangement of the first transmission connecting rod 71, the second transmission connecting rod 72, and the transmission module 73 provided in the implementation shown in FIG. 54 are also applicable to the implementations shown in FIG. 1 to FIG. 43.

The structural designs and position arrangement of the first transmission connecting rod 71, the second transmission connecting rod 72, and the transmission module 73 provided in the implementation shown in FIG. 54A, and structural designs and position arrangement of the first transmission connecting rod 71, the second transmission connecting rod 72, and the transmission module 73 provided in the implementation shown in FIG. 54 are all applicable to the specific implementations shown in FIG. 55 to FIG. 75.

FIG. 55 to FIG. 65 are schematic diagrams of a rotating mechanism of an electronic device and a folding apparatus according to an implementation of this application. A connection relationship between the rotating mechanism and the first housing and a connection relationship between the rotating mechanism and the second housing may be the same as those in the foregoing implementations, and details are not described herein again. The electronic device and the folding apparatus provided in this implementation are of an architecture with a flexible display folded inward, and are of a three-door plate architecture.

Figure 55:
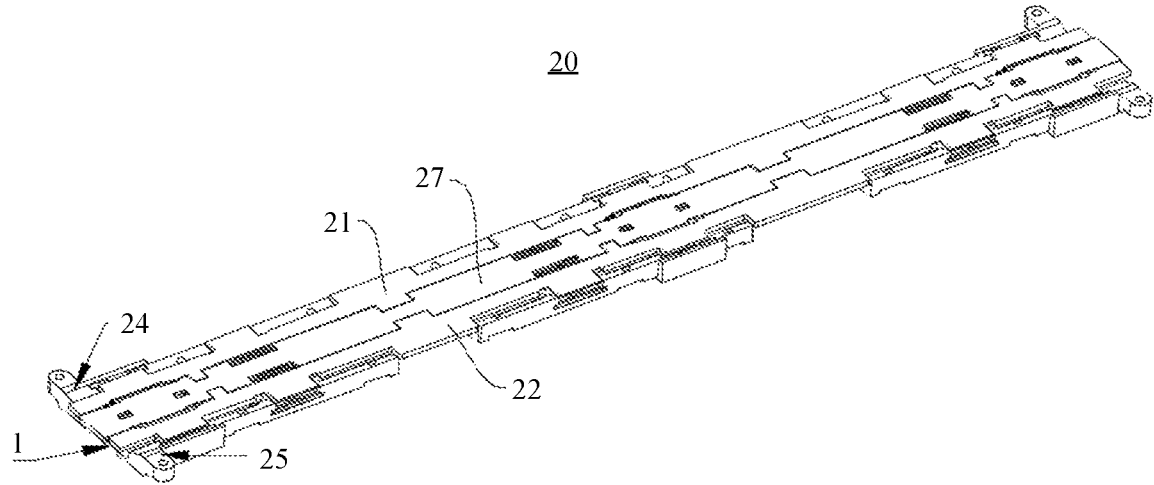
FIG. 55 to FIG. 65 are schematic diagrams of a rotating mechanism of an electronic device and a folding apparatus according to an implementation of this application.
Figure 56:
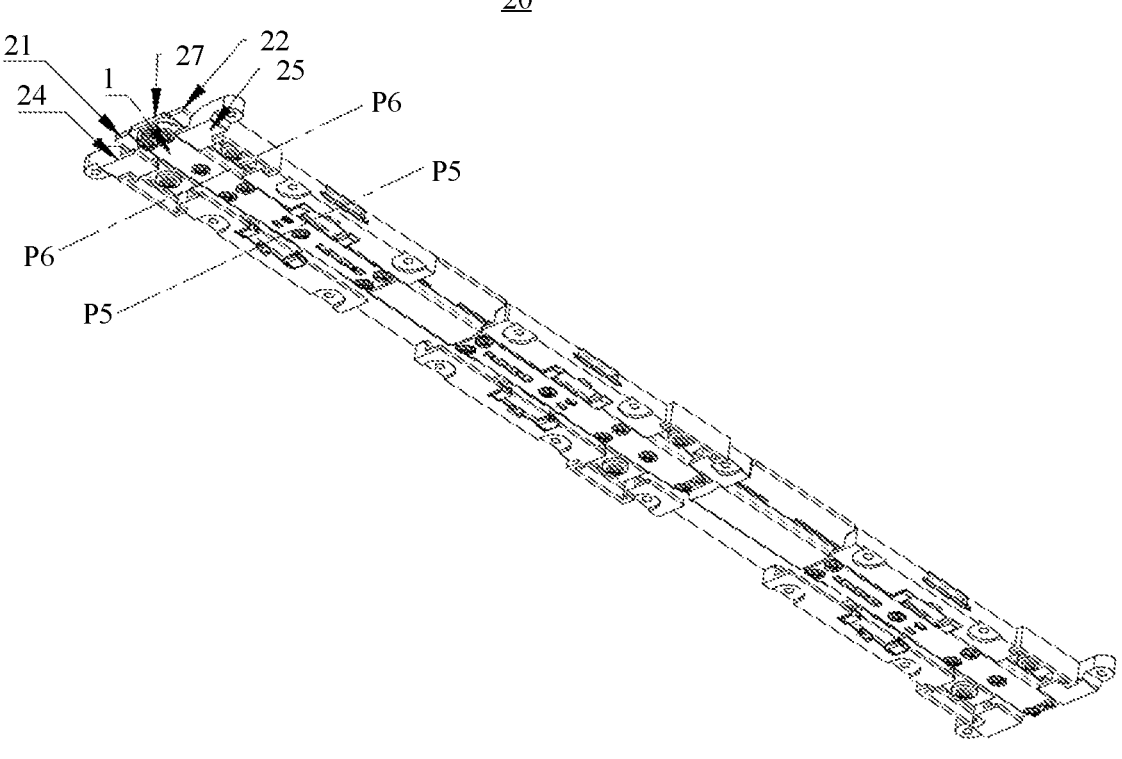
Figure 57:
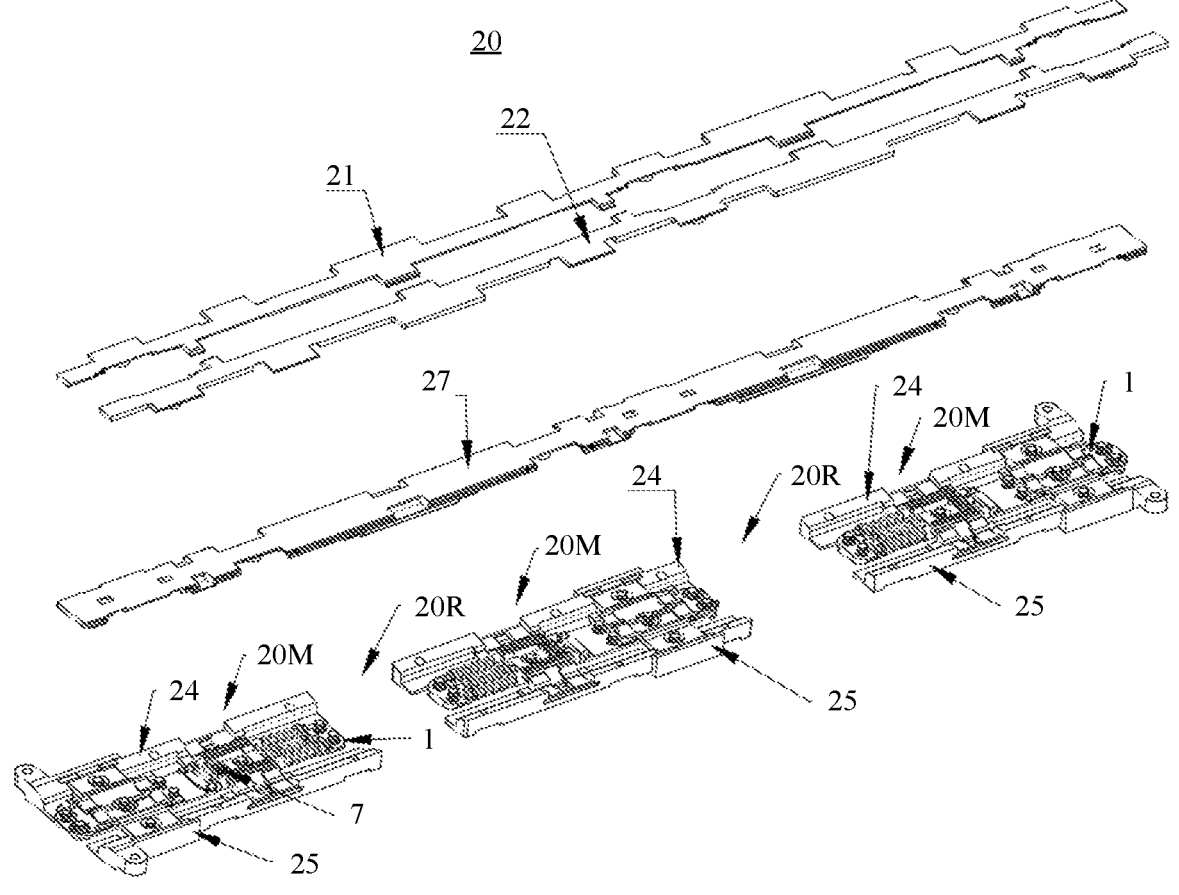
Figure 58:
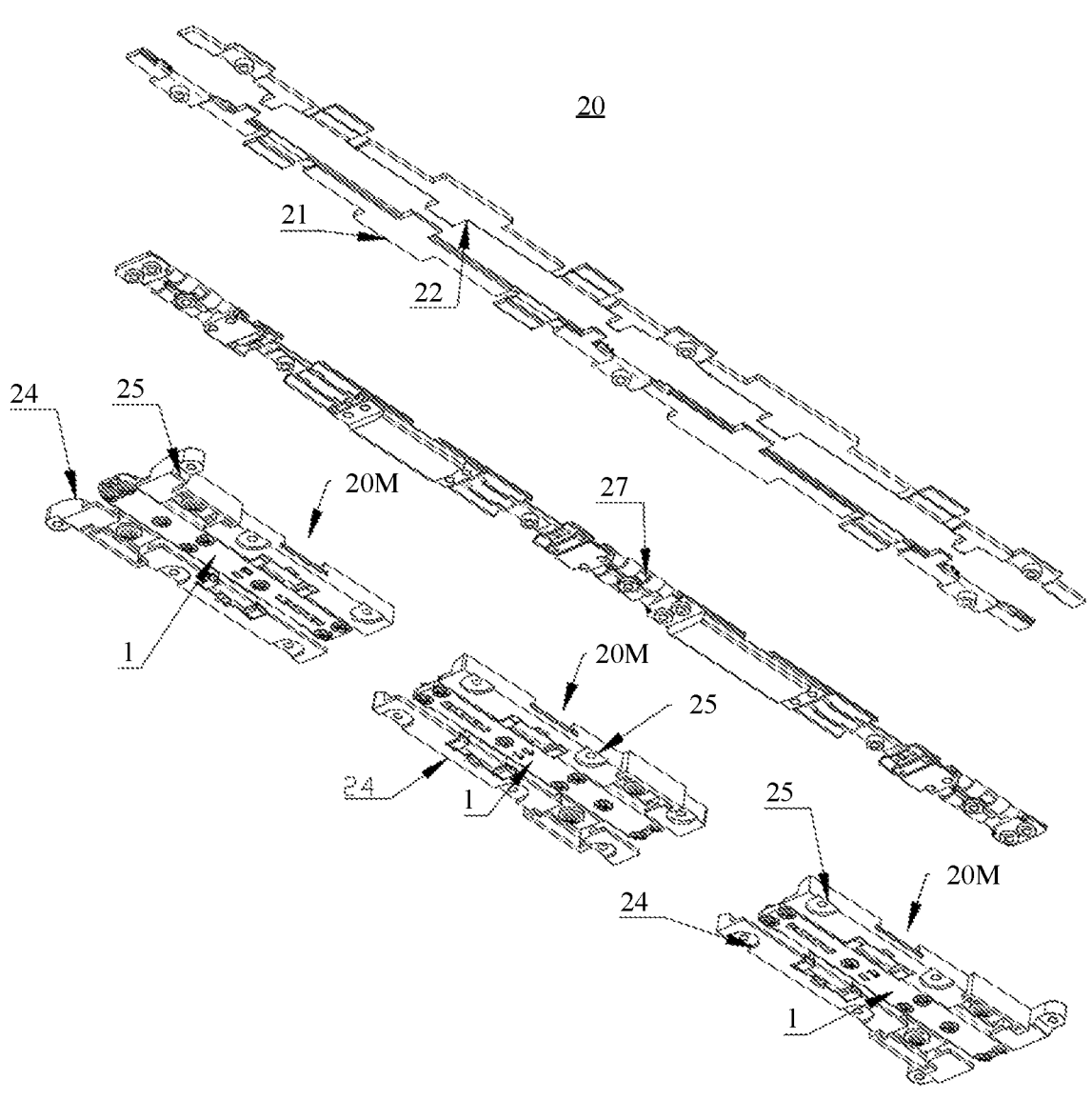

FIG. 55 is a three-dimensional diagram of a rotating mechanism 20 of a folding apparatus of an electronic device in a direction according to an implementation of this application. FIG. 56 is a three-dimensional diagram of a rotating mechanism 20 of a folding apparatus of an electronic device in another direction according to an implementation of this application. FIG. 57 is an exploded view of a rotating mechanism 20 of a folding apparatus of an electronic device in a direction according to an implementation of this application. FIG. 58 is an exploded view of a rotating mechanism 20 of a folding apparatus of an electronic device in another direction according to an implementation of this application.

Refer to FIG. 55, FIG. 56, FIG. 57, and FIG. 58, the rotating mechanism 20 includes a first rotating door plate 21, a second rotating door plate 22, and a middle door plate 27. In a flattened state, the first rotating door plate 21 and the second rotating door plate 22 are distributed on two sides of the middle door plate 27, and the three are spliced and jointly form a support structure configured to support a bending portion of a flexible display screen. The rotating mechanism includes a primary shaft 1, a first housing connecting rod 24, and a second housing connecting rod 25. In the flattened state, the first housing connecting rod 24 and the second housing connecting rod 25 are distributed on two sides of the primary shaft 1. In an implementation, the middle door plate 27 is fixedly connected to the primary shaft 1. In another implementation, the middle door plate 27 may alternatively be slidably connected to the primary shaft 1, so that the middle door plate 27 can rise or fall relative to the primary shaft 1. In the electronic device, the middle door plate 27 and the primary shaft 1 are arranged in a stacked manner. The middle door plate 27 is arranged in a stacked manner between the primary shaft 1 and the bending portion of the flexible circuit board in the flattened state, and the middle door plate 27 is configured to support a part of the bending portion.

The rotating mechanism 20 provided in an implementation of this application may include at least two rotating modules 20M. Refer to FIG. 57 and FIG. 58. There may be three rotating modules 20M, and a threading space 20R may be between adjacent rotating modules 20M and is configured for a flexible circuit board of the electronic device to pass through. In this solution, by using a modular design solution, the threading space is designed between the adjacent rotating modules. This is conducive to arrangement of the flexible circuit board of the electronic device.

Figure 59:
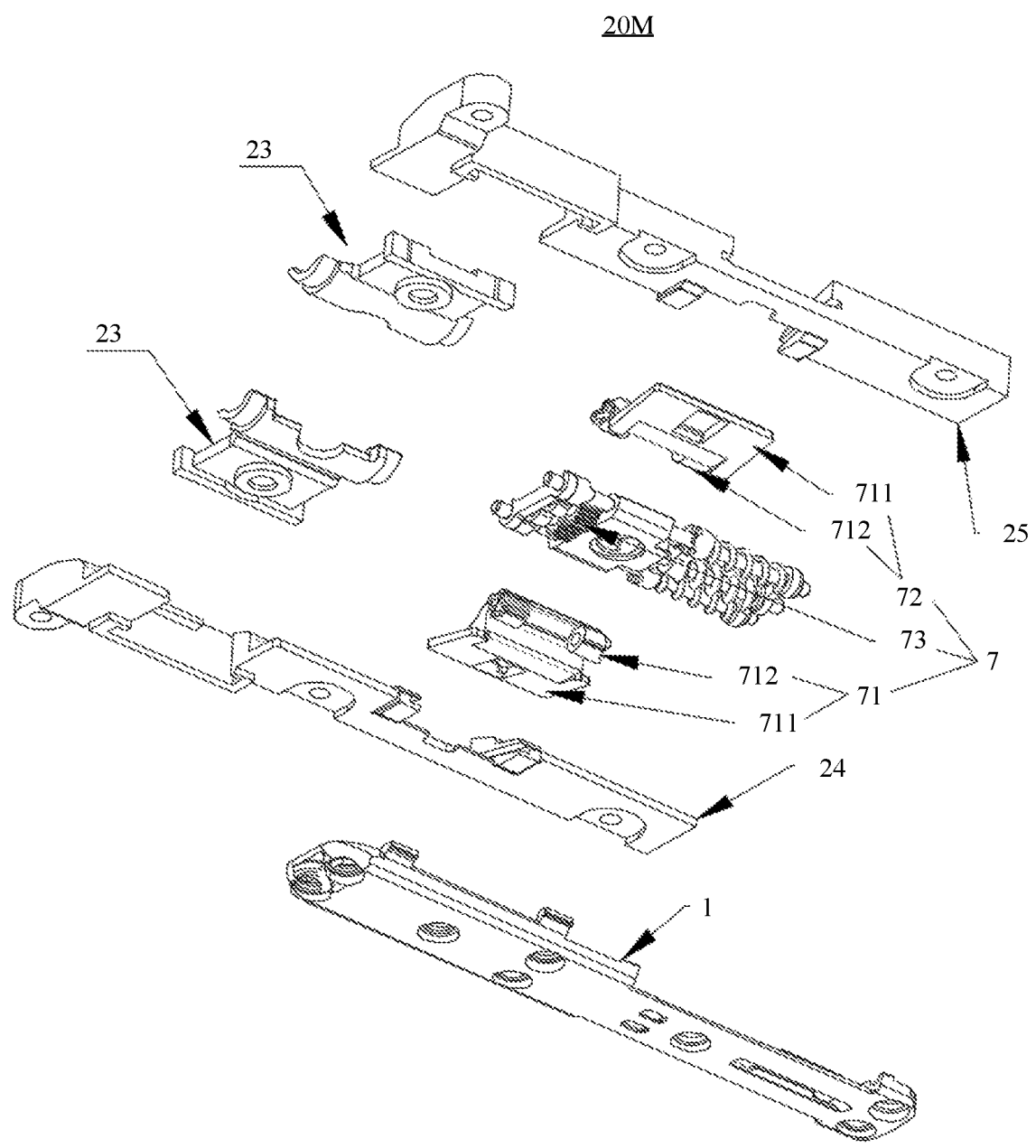
Figure 60:
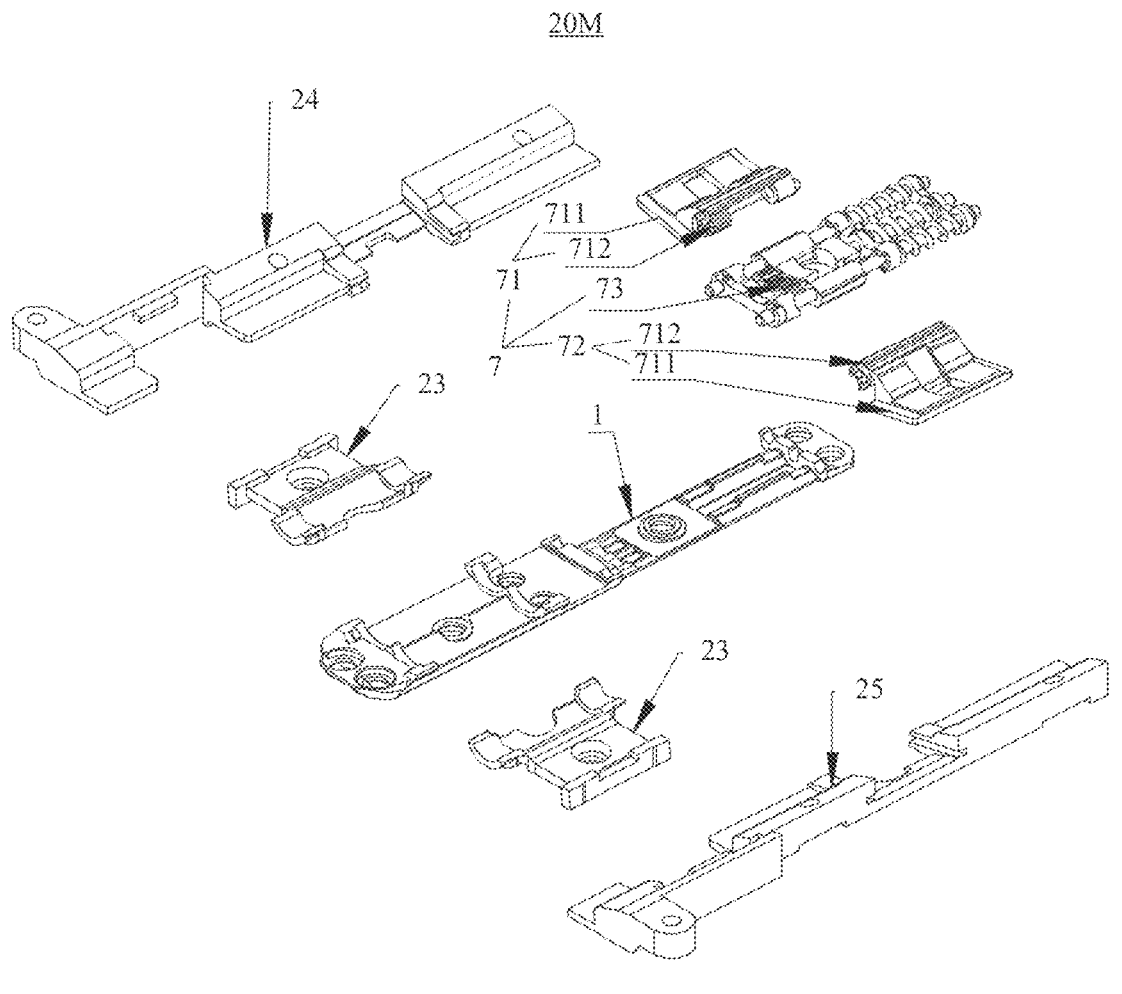

FIG. 59 is an exploded view of a rotating module 20M in a folding apparatus in a direction according to an implementation. FIG. 60 is an exploded view of a rotating module 20M in a folding apparatus in another direction according to an implementation. Refer to FIG. 59 and FIG. 60. In an implementation, the rotating module 20M may include a primary shaft 1, a first housing connecting rod 24, a second housing connecting rod 25, a door plate swing arm 23, and a synchronous damping member 7. There may be two door plate swing arms 23. The door plate swing arm 23 is rotatably connected to the primary shaft 1. Specifically, in the implementations shown in FIG. 59 and FIG. 60, the door plate swing arm 23 and the primary shaft 1 may be rotatably connected in a manner of fitting an arc-shaped arm and an arc-shaped groove. In this implementation, one door plate swing arm 23 is fixedly connected to the first rotating door plate 21. Specifically, the door plate swing arm 23 may be fixedly connected to the first rotating door plate 21 by a fastener, or the door plate swing arm 23 and the first rotating door plate 21 may be of an integrated structure. Similarly, the other door plate swing arm 23 is fixedly connected to the second rotating door plate 22. In this design, the first rotating door plate 21 and the second rotating door plate 22 can rotate synchronously relative to the primary shaft 1 with the door plate swing arm 23, to implement flattening and folding of the folding apparatus. The first rotating door plate 21 and the second rotating door plate 22 may be considered to be directly rotatably connected with the primary shaft 1, and no intermediate transmission structure needs to be arranged. This can ensure that the first rotating door plate 21 and the second rotating door plate 22 move more smoothly in a flattening and folding process and have a simple structure, and helps implement a miniaturization design of the folding apparatus.

One door plate swing arm 23 is movably connected to the first housing connecting rod 24, and the other door plate swing arm 23 is movably connected to the second housing connecting rod 254. Other movable connection may be a slidable connection by fitting a sliding slot and a sliding block, or may be a rotatable connection. The rotatable connection may be in a manner of fitting an arc-shaped groove and an arc-shaped block, or may be a manner of fitting a rotating shaft and a shaft hole.

The synchronous damping member 7 includes a first transmission connecting rod 71, a second transmission connecting rod 72, and a transmission module 73. The transmission module may be of a structure of a gear group. In an implementation, the gear group includes two gears. Each of the first transmission connecting rod 71 and the second transmission connecting rod 72 includes a sliding end 711 and a rotating end 712. The rotating ends 712 of the first transmission connecting rod 71 and the second transmission connecting rod 72 are engaged with the transmission module 73. The sliding end 711 of the first transmission connecting rod 71 is slidably connected to the first housing connecting rod 24, and the first housing connecting rod 24 is fastened to the first housing of the folding apparatus of the electronic device. The sliding end 711 of the second transmission connecting rod 72 is slidably connected to the second housing connecting rod 25, and the second housing connecting rod 25 is fastened to the second housing of the folding apparatus of the electronic device.

Figure 61:
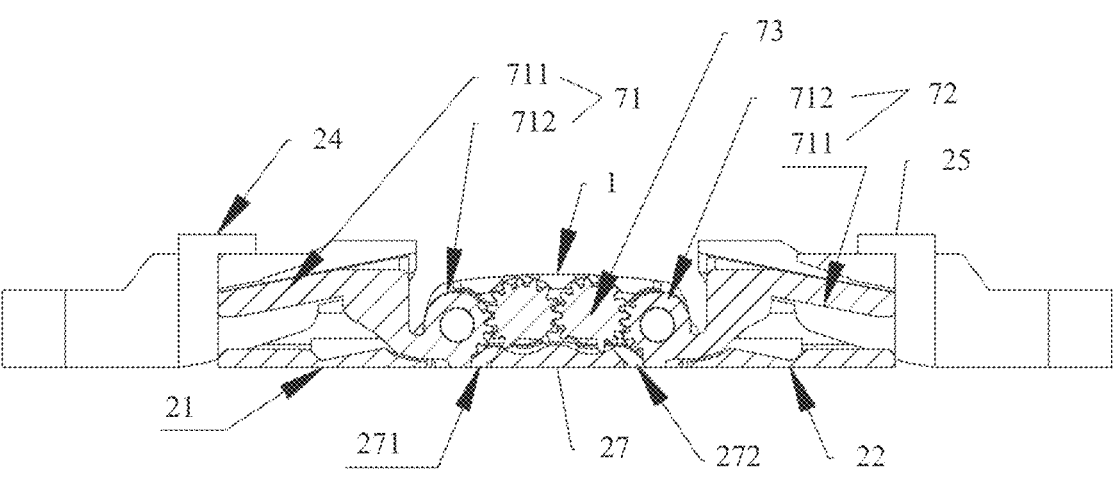
Figure 62:
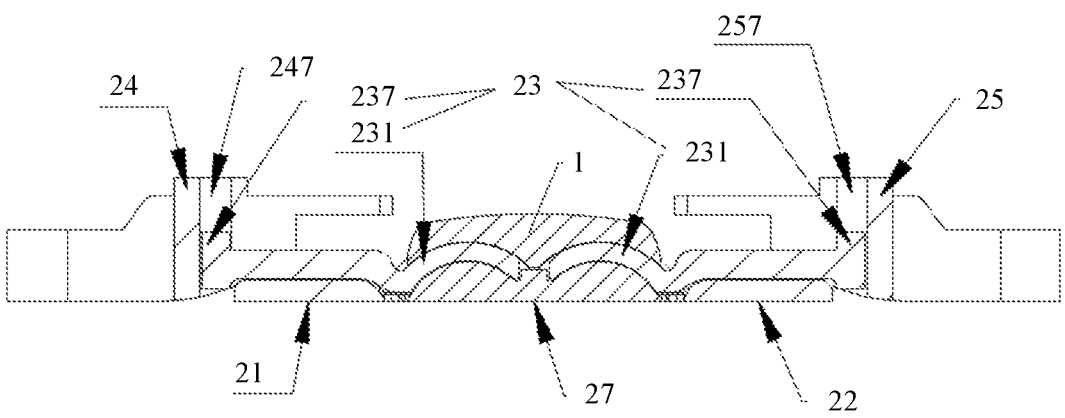

FIG. 61 and FIG. 62 are cross-sectional views of a rotating mechanism of a folding apparatus of an electronic device according to an implementation of this application. FIG. 61 is a cross-sectional view at a position of P5-P5 in the implementation shown in FIG. 56. FIG. 62 is a cross-sectional view at a position of P6-P6 in the implementation shown in FIG. 56. FIG. 61 is a cross-sectional view at a position of a synchronous damping member 7. FIG. 62 is a cross-sectional view at a position of a door plate swing arm 23. Refer to FIG. 61. In this implementation, a first avoidance hole 271 and a second avoidance hole 272 are provided on the middle door plate 27. The first avoidance hole 271 is located at an edge position of the middle door plate 27 adjacent to the first rotating door plate 21, and the second avoidance hole 272 is located at an edge position of the middle door plate 27 adjacent to the second rotating door plate 22. In the flattened state, a part of the rotating end 712 of the first transmission connecting rod 71 extends into the first avoidance hole 271, and a part of the rotating end 712 of the second transmission connecting rod 72 extends into the second avoidance hole 272. In the flattened state, a surface of the middle door plate 27, a surface of the first rotating door plate 21, and a surface of the second rotating door plate 22 are coplanar and jointly form a combined support surface. The combined support surface is configured to support the bending portion of the flexible display screen. In addition, a part of a surface of the rotating end 712 of the first transmission connecting rod 71 that is located in the first avoidance hole 271 is also configured to jointly support the flexible display screen the combined support surface. Similarly, a part of a surface of the rotating end 712 of the second transmission connecting rod 72 located in the second avoidance hole 272 is also configured together with the jointly combined support surface to support the flexible display screen. In this implementation, the two gears of the transmission module 73 are assembled between the middle door plate 27 and the primary shaft 1.

Refer to FIG. 62. The door plate swing arm 23 includes a first rotating portion 231 and a sliding portion 237. An arc-shaped groove formed between the middle door plate 27 and the primary shaft 1 is a second rotating portion. The second rotating portion fits the first rotating portion 231, and the first rotating portion 231 is slidable in the second rotating portion, to form rotating connection between the door plate swing arm 23 and the primary shaft 1. A first sliding slot 247 is provided on the first housing connecting rod 24, and a second sliding slot 257 is provided on the second housing connecting rod 25. The sliding portion 237 of the door plate swing arm 23 fits the first sliding slot 247 to implement movable connection between the first rotating door plate 21 and the first housing connecting rod 24. Similarly, the sliding portion 237 of the other door plate swing arm 23 fits the second sliding slot 257 to implement movable connection between the second rotating door plate 22 and the second housing connecting rod 25.

Figure 63:
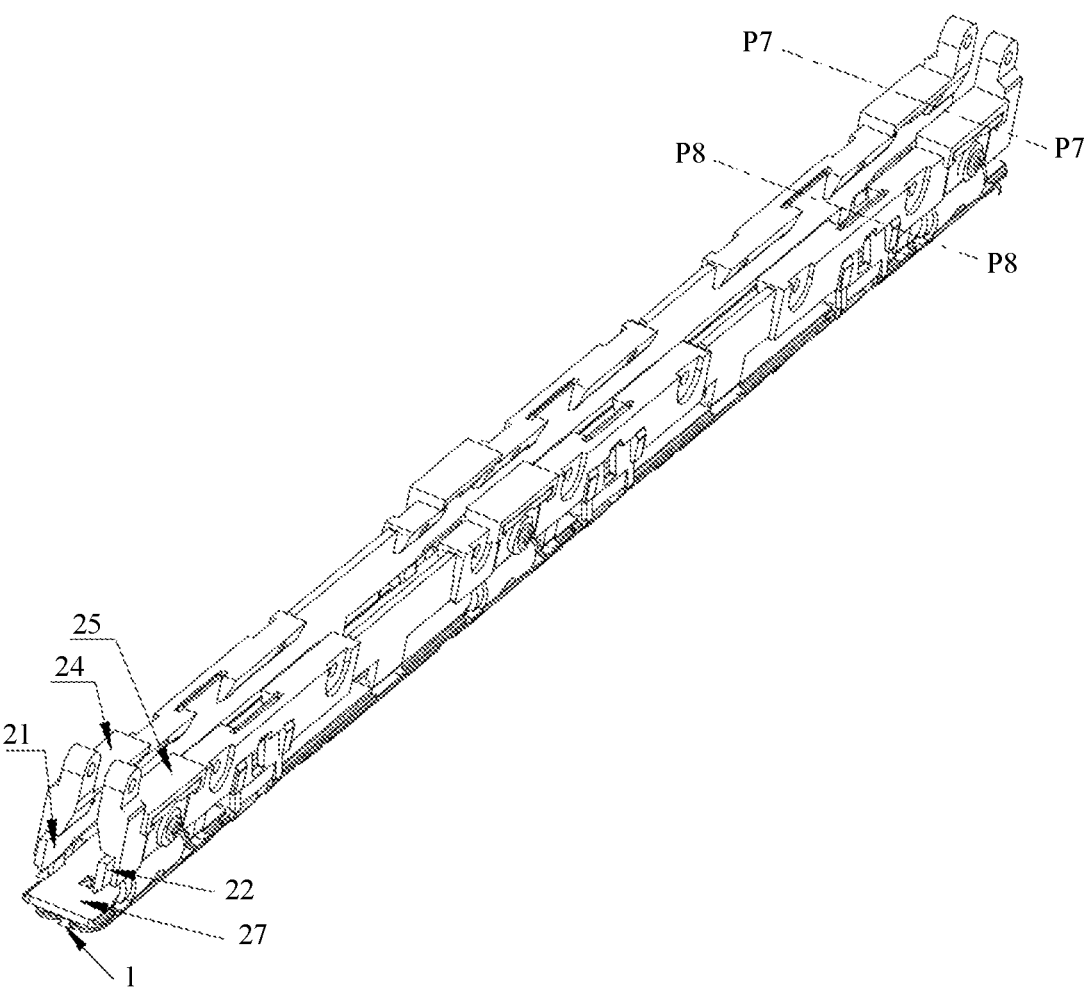
Figure 64:
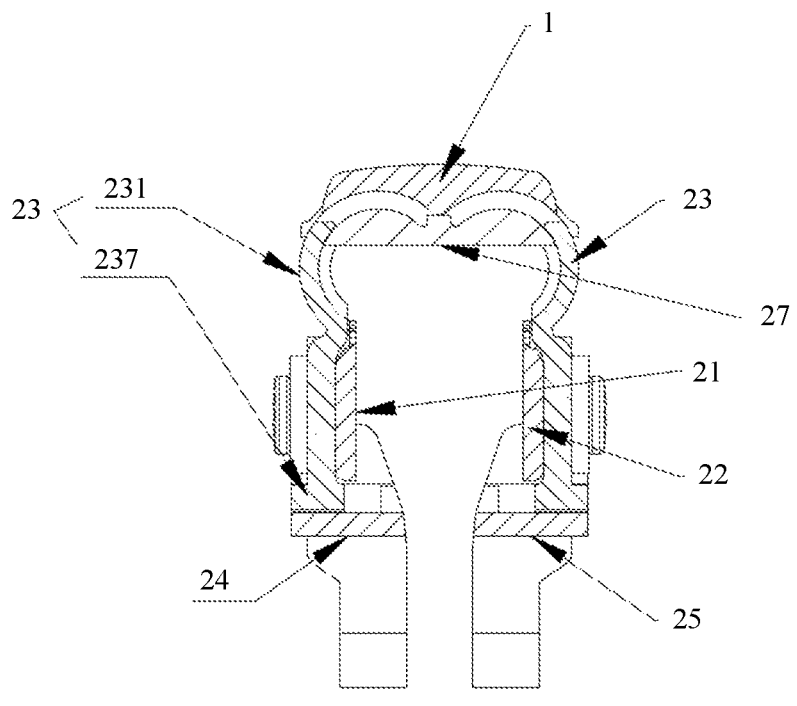
Figure 65:
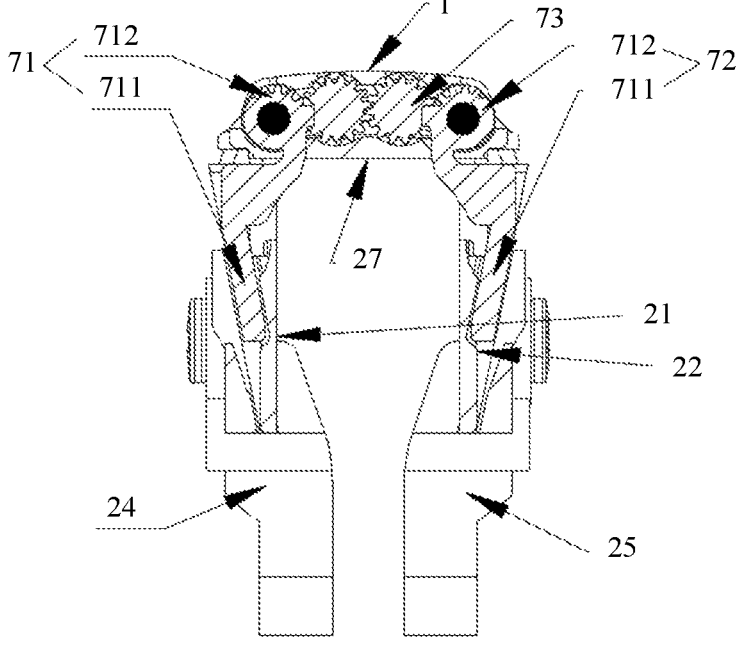

FIG. 63. FIG. 64, and FIG. 65 are a three-dimensional diagram and cross-sectional views of a rotating mechanism 20 of a folding apparatus in a folded state according to an implementation of this application. FIG. 64 is a cross-sectional view at a position of P7-P7 in the implementation shown in FIG. 63. FIG. 65 is a cross-sectional view at a position of P8-P8 in the implementation shown in FIG. 63. Refer to FIG. 63. FIG. 64, and FIG. 65. In an implementation, the following may be implemented by controlling a rotation angle or a rotation track of the door plate swing arm 23: In the folded state, the first rotating door plate 21 and the second rotating door plate 22 may be parallel or approximately parallel to each other. A solution in which the first rotating door plate 21 and the second rotating door plate 22 are parallel to each other in the folded state is applicable to a scenario in which the first rotating door plate 21 and the second rotating door plate 22 are not bonded or are weakly bonded to the flexible display screen. Specifically, that the rotating door plates are not bonded to the flexible display screen may be understood as that there is no connection relationship between the rotating door plate and the bending portion of the flexible display screen, and that the rotating door plates are weakly bonded to the flexible display screen may be understood as that the rotating door plate is bonded to the bending portion of the flexible display screen by adhesive. However, the adhesive has an elastic deformation function, and deformation in any direction may be generated under an external force, so that a posture of the rotating door plate is adaptive to a posture of the bending portion of the flexible display screen. Both the first rotating door plate 21 and the second rotating door plate 22 may be perpendicular to a surface of the middle door plate 27 facing the flexible display screen.

Refer to FIG. 65. In the folded state, a part of the first housing connecting rod 71 is located on a side of the first rotating door plate 21 facing away from the second rotating door plate 22, and a part of the first housing connecting rod 71 extends from a top edge of the first rotating door plate 21 to a region between the middle door plate and the primary shaft 1. A part of the second housing connecting rod 72 is located on a side of the second rotating door plate 22 facing away from the first rotating door plate 22, and a part of the second housing connecting rod 71 extends from a top edge of the second rotating door plate 22 to a region between the middle door plate and the primary shaft 1.

Figure 66:
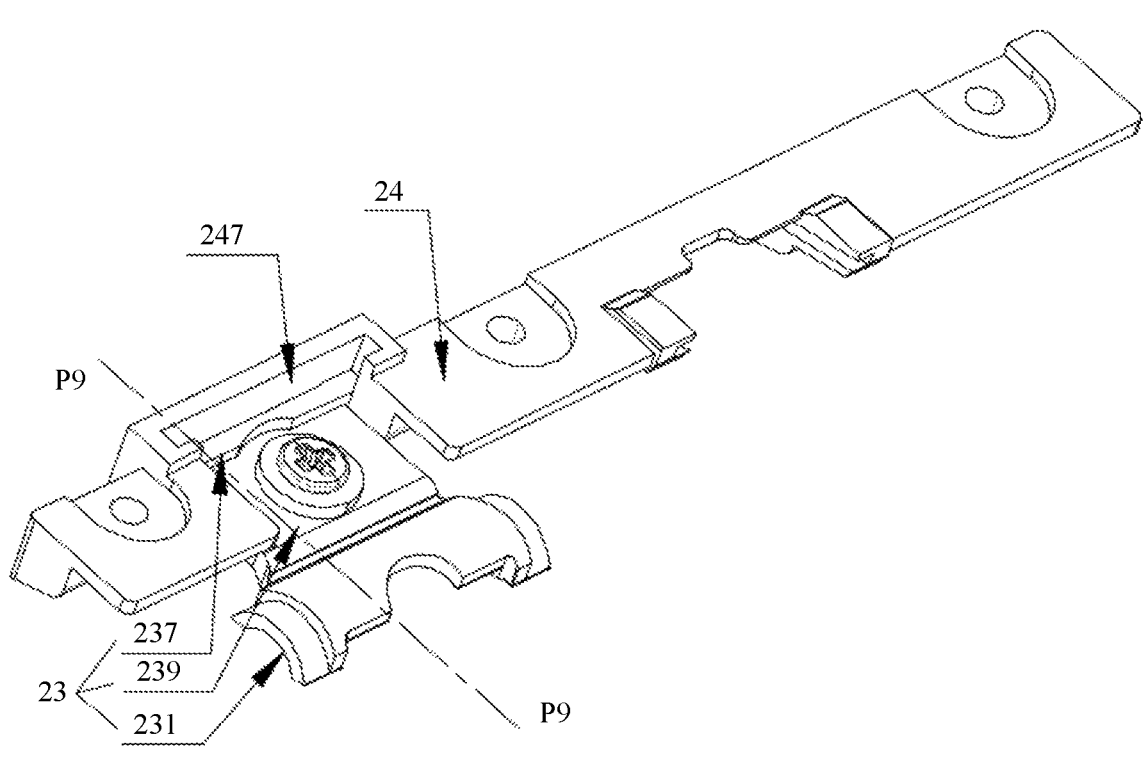
FIG. 66 and FIG. 67 are schematic diagrams of an embodiment of a specific movable connection between a door plate swing arm and a first housing connecting rod in a rotating mechanism of a folding apparatus according to this application.
Figure 67:
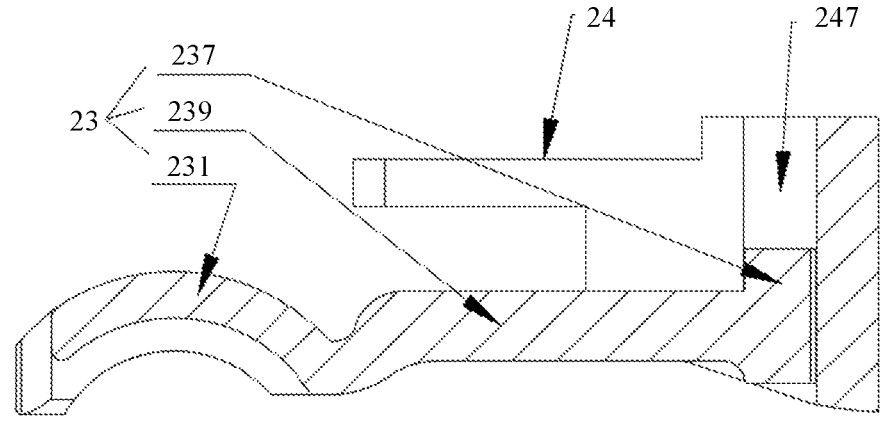
Figure 68:
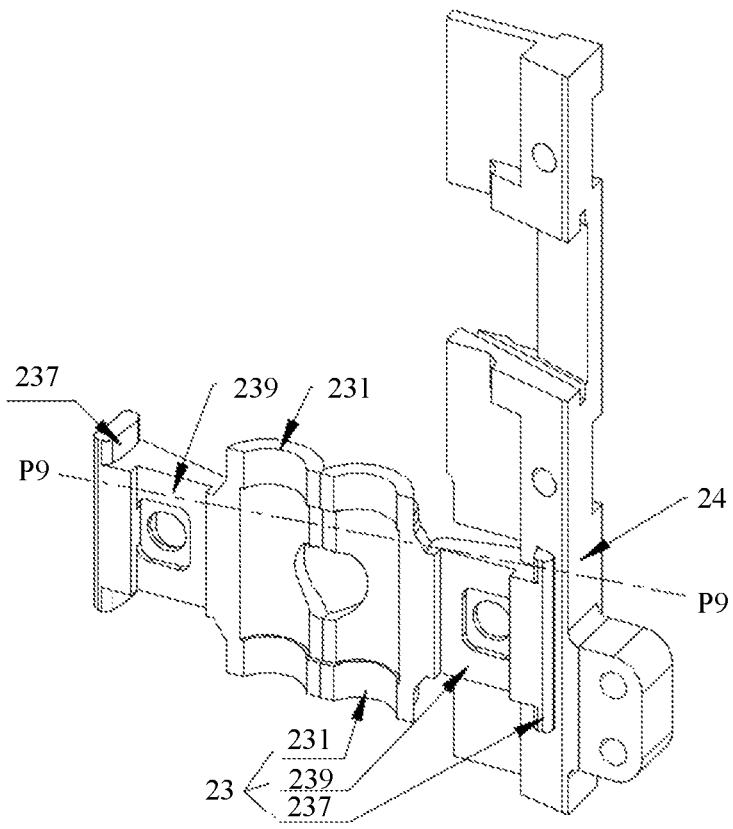
FIG. 68 and FIG. 69 are schematic diagrams of an embodiment of a specific movable connection between a door plate swing arm and a first housing connecting rod in a rotating mechanism of a folding apparatus according to this application.
Figure 69:
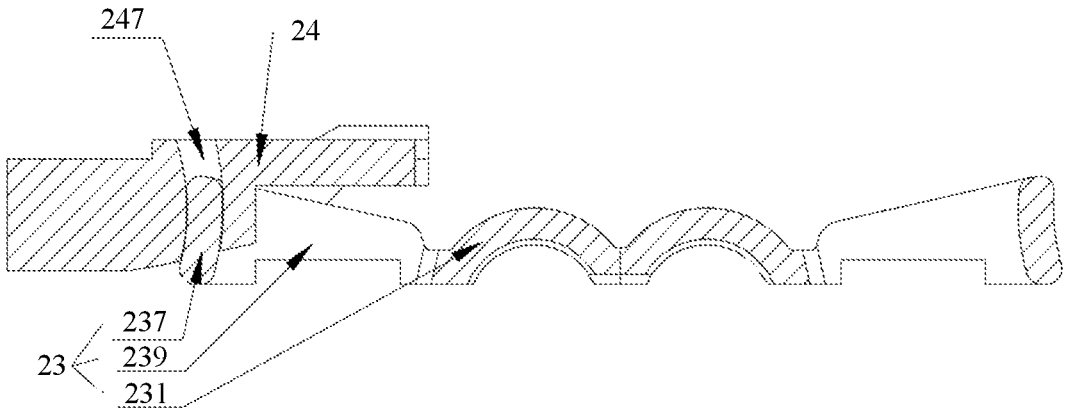
Figure 70:
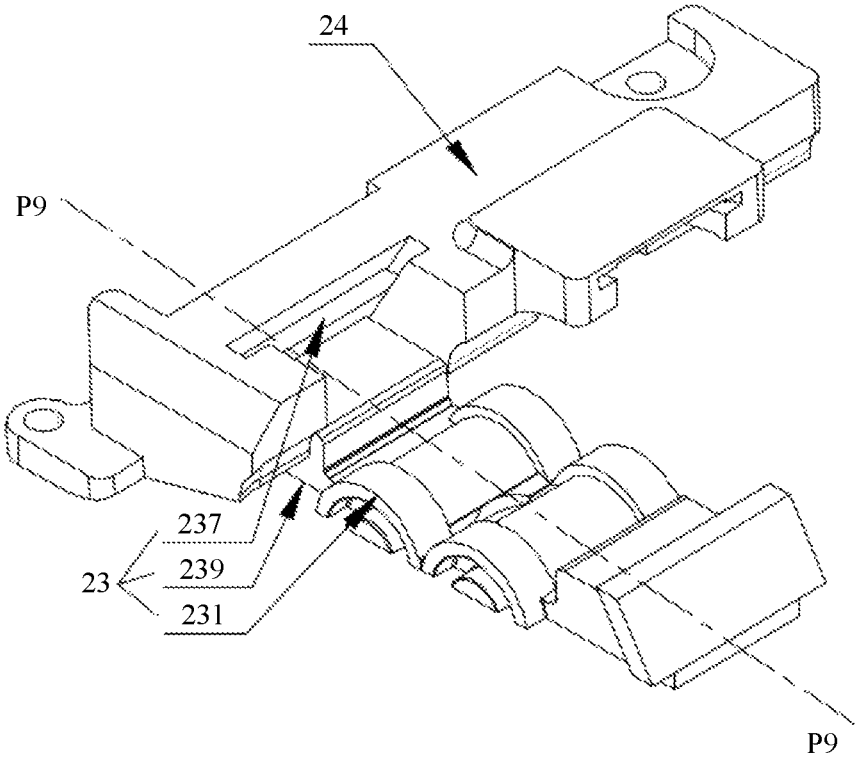
FIG. 70 and FIG. 71 are schematic diagrams of an embodiment of a specific movable connection between a door plate swing arm and a first housing connecting rod in a rotating mechanism of a folding apparatus according to this application.
Figure 71:
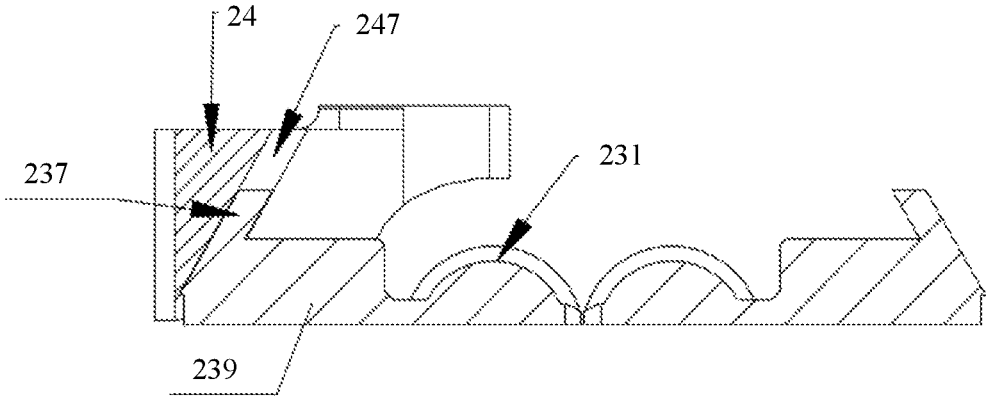

The following describes a specific solution of movable connection between the door plate swing arm 23 and the first housing connecting rod 24 (or the second housing connecting rod 25) in the rotating mechanism 20 of the folding apparatus provided in this application in detail. Specifically, three specific embodiments are used for description in detail. FIG. 66 and FIG. 67 are an active connection solution according to an embodiment. FIG. 68 and FIG. 69 are an active connection solution according to another embodiment. FIG. 70 and FIG. 71 are an active connection solution according to another embodiment. The movable connection solutions provided in the three different embodiments are applicable to the rotating mechanism of the folding apparatus provided in any one of the foregoing possible implementations.

In some implementation solutions, a fastening structure may be arranged on the door plate swing arm 23, and the door plate swing arm 23 is fixedly connected to the first rotating door plate 21 by the fastening structure. The door plate swing arm 23 is further slidably connected to the first sliding slot 247 of the first housing connecting rod 24, and the door plate swing arm 23 is further rotatably connected to the primary shaft (1).

Refer to FIG. 66 and FIG. 67. FIG. 67 is a cross-sectional view at a position of P9-P9) in the implementation shown in FIG. 66. The door plate swing arm 23 includes a first rotating portion 231, a sliding portion 237, and a door plate connecting portion 239 connected between the first rotating portion 231 and the sliding portion 237. In an implementation, the first rotating door plate 21 may be fixedly connected to the door plate connecting portion 239 by a screw: The first rotating door plate 21 may alternatively be fixedly connected to the door plate connecting portion 239 in other manners, for example, by using a magnetic attraction structure or by using an adhesive. Alternatively, the first rotating door plate 21 and the door plate connecting portion 239 may be of an integral structure. A first sliding slot 247 is provided on the first housing connecting rod 24. The sliding portion 237 is assembled in the first sliding slot 247. In a process of unfolding or folding of the folding apparatus, the sliding portion 237 is slidable in the first sliding slot 247. In the flattened state, a surface of the sliding portion 237 and a surface of the door plate connecting portion 239 that are configured to assemble the rotating door plate are perpendicular. Therefore, this solution is referred to as an orthogonal sliding solution.

Refer to FIG. 68 and FIG. 69. FIG. 69 is a cross-sectional view at a position of P9-P9) in the implementation shown in FIG. 68. A difference between a movable connection solution in this embodiment and the movable connection solution in the embodiment shown in FIG. 66 and FIG. 67 lies in specific forms of the first sliding slot 247 and the sliding portion 237. In this embodiment, the first sliding slot 247 may be arc-shaped, and correspondingly, the sliding portion 237 may also be of an arc-shaped arm structure. The first sliding slot 247 and the sliding portion 237 may fit to implement rotatable connection between the door plate swing arm 23 and the first housing connecting rod 24. A rotating shaft of the rotatable connection is a virtual shaft, and it may be understood as that a position of a center of a circle of the first sliding slot 247 is a rotation center of the rotatable connection.

Refer to FIG. 70 and FIG. 71. FIG. 71 is a cross-sectional view at a position of P9-P9 in the implementation shown in FIG. 70. A difference between a movable connection solution in the embodiment shown in FIG. 70 and FIG. 71 and the movable connection solution in the embodiment shown in FIG. 66 and FIG. 67 lies in specific forms of the first sliding slot 247 and the sliding portion 237. In the embodiments shown in FIG. 70 and FIG. 71, the sliding portion 237 is arranged in an oblique manner relative to the surface of the door plate connecting portion 239 configured to assemble the rotating door plate, and a sliding direction of the sliding portion 237 relative to the first sliding slot 247 is arranged in an oblique manner relative to a surface on the first rotating door plate 21 configured to support the flexible display screen. Therefore, this solution is referred to as an oblique sliding solution. In an implementation, an angle between a surface of the sliding portion 237 and a surface of the door plate connecting portion 239 that are configured to assemble the rotating door plate is less than 90 degrees. In another implementation, the angle between the surface of the sliding portion 237 and the surface of the door plate connecting portion 239 that are configured to assemble the rotating door plate may alternatively be greater than 90 degrees.

Figure 72:
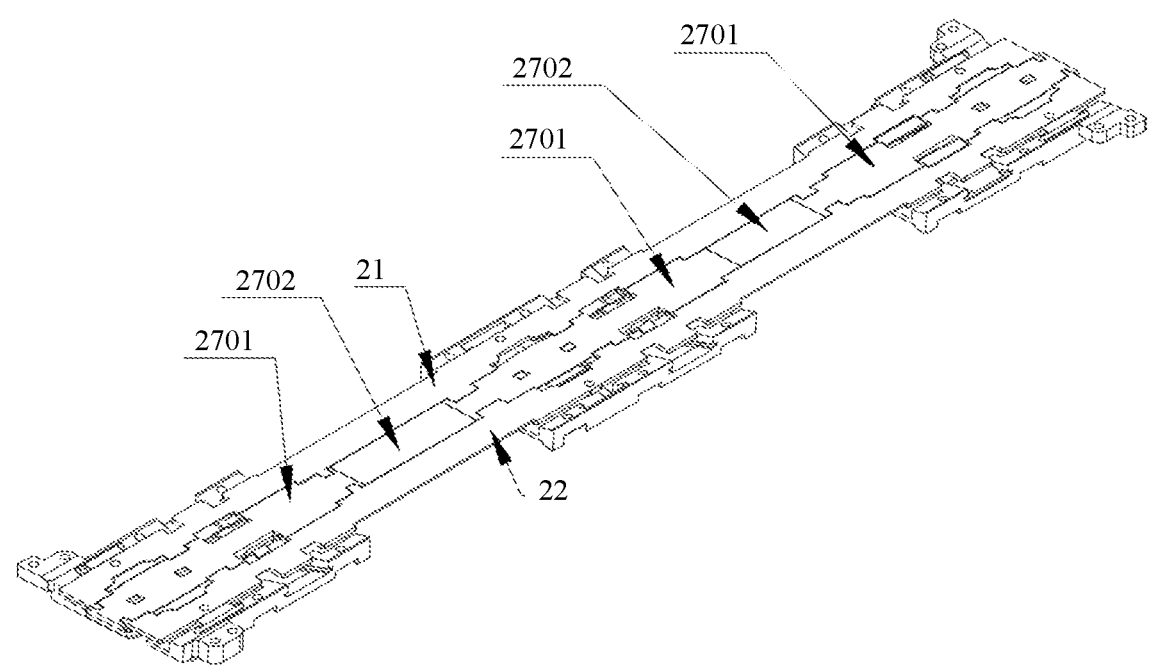
FIG. 72 to FIG. 75 are schematic diagrams of a rotating mechanism of an electronic device and a folding apparatus according to a fourth implementation.
Figure 73:
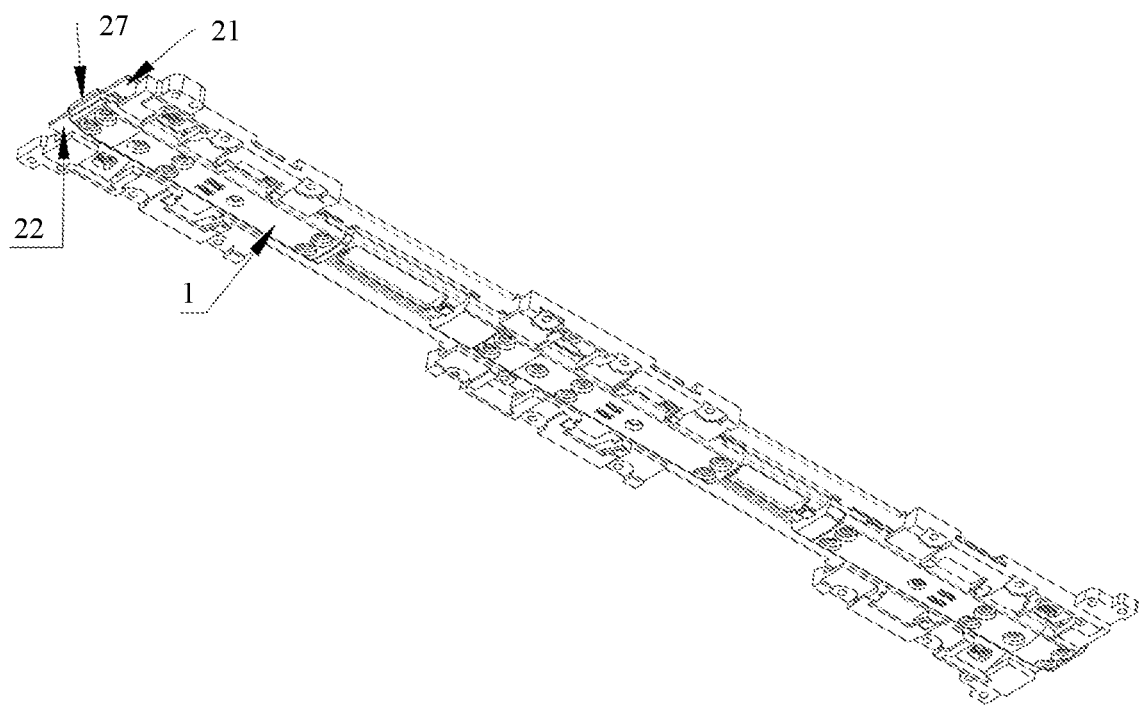
Figure 74:
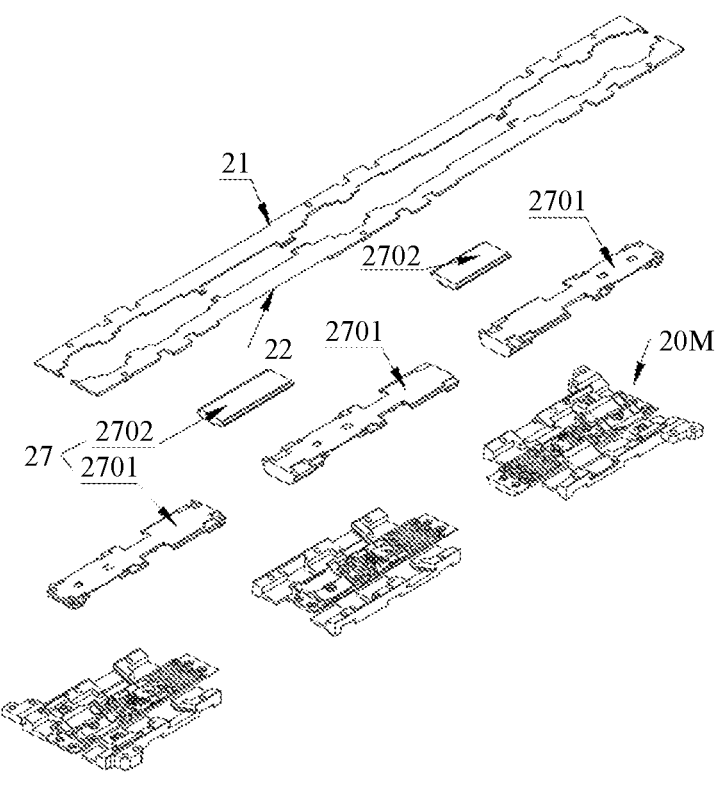
Figure 75:
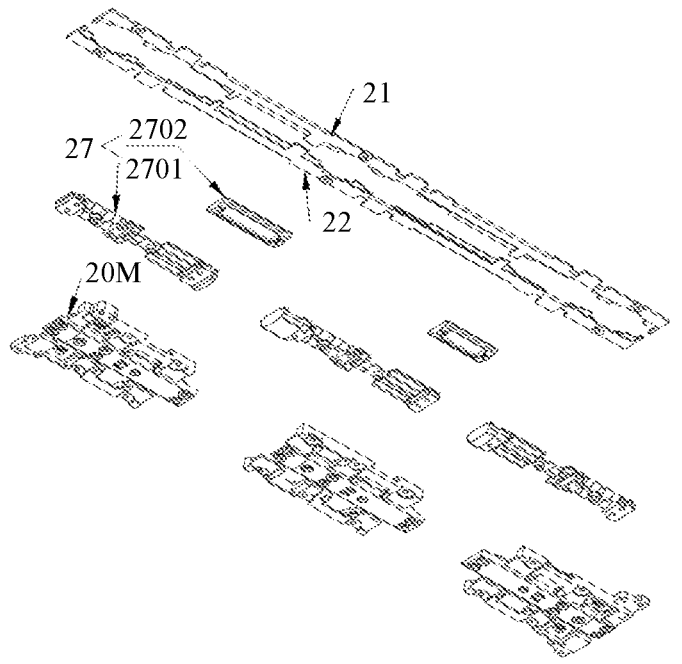

FIG. 72 to FIG. 75 are schematic diagrams of a rotating mechanism of an electronic device and a folding apparatus according to an implementation of this application. This implementation is similar to a design solution of the implementation shown in FIG. 55, and both are a three-door plate structure. FIG. 72 is a three-dimensional diagram of a rotating mechanism 20 of a folding apparatus of an electronic device in a direction according to an implementation. FIG. 73 is a three-dimensional diagram of a rotating mechanism 20 of a folding apparatus of an electronic device in another direction according to an implementation. FIG. 74 is an exploded view of a rotating mechanism 20 of a folding apparatus of an electronic device in a direction according to an implementation. FIG. 75 is an exploded view of a rotating mechanism 20 of a folding apparatus of an electronic device in another direction according to an implementation. A difference between an implementation shown in FIG. 72. FIG. 73, FIG. 74, and FIG. 75 and the implementation shown in FIG. 55 lies in a specific structure of the middle door plate 27. In this implementation, the middle door plate 27 includes at least two assembly portions 2701 and a connection portion 2702 connected between adjacent assembly portions 2701. In the implementation shown in FIG. 74 and FIG. 75, the middle door plate 27 is of a five-segment structure. There are three assembly portions 2701 and two connection portions 2702. At least two assembly portions 2701 and the at least two rotating modules 20M are arranged in a one-to-one correspondence, and the assembly portions 2701 are respectively assembled and connected to the corresponding rotating modules 20M. It may be understood as that the assembly portion 2701 is a part on the middle door plate 27 configured to fit the rotating module 20M, and the connection portion 2702 only connects the adjacent assembly portions 2701 as a whole, so that the middle door plate 27 becomes a complete door plate structure, to facilitate support of the flexible display screen.

Other structures of the implementation shown in FIG. 72 to FIG. 75 are the same as those of the implementation shown in FIG. 55, and details are not described again.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

Embodiments of this application are described above. The foregoing descriptions are examples, are not exhaustive, and are not limited to the disclosed embodiments. Many modifications and changes are clear to a person of ordinary skill in the art without departing from the scope and spirit of the described embodiments. The selection of terms used in this specification is intended to best explain the principles of embodiments, practical application, or improvements to technologies in the market, or to enable another person of ordinary skill in the art to understand embodiments disclosed in this specification.

What is claimed is:

1. A rotating mechanism, wherein the rotating mechanism comprises a first rotating door plate, a second rotating door plate, a first door plate swing arm and a second door plate swing arm, a first housing connecting rod, a second housing connecting rod, and a primary shaft, wherein the first rotating door plate is fixedly connected to the first door plate swing arm, the second rotating door plate is fixedly connected to the second door plate swing arm, the first door plate swing arm and the second door plate swing arm are both rotatably connected to the primary shaft, the first door plate swing arm is movably connected to the first housing connecting rod, and the second door plate swing arm is movably connected to the second housing connecting rod.

2. The rotating mechanism of claim 1, wherein the rotating mechanism further comprises a first transmission connecting rod, a second transmission connecting rod, and a transmission module that are rotatably connected to the primary shaft, wherein each of the first transmission connecting rod and the second transmission connecting rod comprises a sliding end and a rotating end, the rotating end of the first transmission connecting rod and the rotating end of the second transmission connecting rod respectively cooperate with the transmission module, the sliding end of the first transmission connecting rod is slidably connected to the first housing connecting rod, and the sliding end of the second transmission connecting rod is slidably connected to the second housing connecting rod.

3. The rotating mechanism of claim 2, wherein when the rotating mechanism is in a folded state, a rotation center of the rotating end of the first transmission connecting rod is located on a side of the first rotating door plate away from the second rotating door plate, or a side of an extension surface of the first rotating door plate away from an extension surface of the second rotating door plate; and a rotation center of the rotating end of the second transmission connecting rod is located on a side of the second rotating door plate away from the first rotating door plate, or a side of the extension surface of the second rotating door plate away from the extension surface of the first rotating door plate.

4. The rotating mechanism of claim 2, wherein a rotation center of the rotating end of the first transmission connecting rod is a first center, a rotation center of the rotating end of the second transmission connecting rod is a second center, and when the rotating mechanism is in a folded state, a vertical distance between the first center and the second center is greater than a maximum distance between the first rotating door plate and the second rotating door plate in a first direction, wherein the first direction is an extension direction of a connection line between the first center and the second center.

5. The rotating mechanism of claim 2, wherein the first rotating door plate comprises a first support surface, the second rotating door plate comprises a second support surface, when the rotating mechanism is in a folded state, an angle between a plane on which the first support surface is located and a plane on which the second support surface is located is a first angle, and a rotation center of the rotating end of the first transmission connecting rod and a rotation center of the rotating end of the second transmission connecting rod are both located outside a range of the first angle.

6. The rotating mechanism of claim 2, wherein in a folded state:

a rotation center of the rotating end of the first transmission connecting rod is located on a side of the first rotating door plate facing the second rotating door plate, or a rotation center of the rotating end of the first transmission connecting rod is located on a side of an extension surface of the first rotating door plate facing the extension surface of the second rotating door plate; and a rotation center of the rotating end of the second transmission connecting rod is located on a side of the second rotating door plate facing the first rotating door plate, or a rotation center of the rotating end of the second transmission connecting rod is located on a side of the extension surface of the second rotating door plate facing the extension surface of the first rotating door plate.

7. The rotating mechanism of claim 2, wherein the first rotating door plate comprises a first support surface, and the second rotating door plate comprises a second support surface, wherein when the rotating mechanism is in a folded state, an angle between a plane on which the first support surface is located and a plane on which the second support surface is located is a second angle, and rotation centers of the rotating ends of the first transmission connecting rod and the second transmission connecting rod are both within a range of the second angle.

8. The rotating mechanism of claim 1, wherein the rotating mechanism further comprises a lifting plate, the lifting plate is connected to the primary shaft and is movable relative to the primary shaft in a direction away from or close to the primary shaft, in a folded state, the lifting plate, the first rotating door plate, and the second rotating door plate jointly enclose a screen accommodating space, and the lifting plate is closer to the primary shaft in the folded state of the rotating mechanism than in a flattened state of the rotating mechanism.

9. The rotating mechanism of claim 1, wherein the first rotating door plate and the first door plate swing arm are of an integrated structure, or the first rotating door plate and the first door plate swing arm are fixedly connected by a fastener.

10. The rotating mechanism of claim 2, wherein the transmission module comprises an architecture of a gear group, or the transmission module comprises an architecture of a conveyor belt, or the transmission module comprises a connecting rod structure.

11. An electronic device, comprising a flexible display screen, a first housing, a second housing, and a rotating mechanism;

wherein the rotating mechanism comprises a first rotating door plate, a second rotating door plate, a first door plate swing arm and a second door plate swing arm, a first housing connecting rod, a second housing connecting rod, and a primary shaft, wherein the first rotating door plate is fixedly connected to the first door plate swing arm, the second rotating door plate is fixedly connected to the second door plate swing arm, the first door plate swing arm and the second door plate swing arm are both rotatably connected to the primary shaft, the first door plate swing arm is movably connected to the first housing connecting rod, and the second door plate swing arm is movably connected to the second housing connecting rod;

wherein the flexible display screen comprises a first non-bending portion, a bending portion, and a second non-bending portion that are sequentially arranged, wherein the first non-bending portion is fixedly connected to the first housing, and the second non-bending portion is fixedly connected to the second housing; the first housing connecting rod is fixedly connected to the first housing, and the second housing connecting rod is fixedly connected to the second housing; and the rotating mechanism is configured to support a part of the flexible display screen in a flattened state of the electronic device, and accommodate a part of the flexible display screen in a folded state of the electronic device.

12. The electronic device of claim 11, wherein the first rotating door plate and the flexible display screen are not connected to each other, the second rotating door plate and the flexible display screen are not connected to each other, a partial region of the flexible display screen is in contact with the first rotating door plate, and a partial region of the flexible display screen is in contact with the second rotating door plate; or wherein the first rotating door plate is connected to the flexible display screen, and the second rotating door plate is connected to the flexible display screen.

13. The electronic device of claim 11, wherein the rotating mechanism further comprises a first transmission connecting rod, a second transmission connecting rod, and a transmission module that are rotatably connected to the primary shaft, wherein each of the first transmission connecting rod and the second transmission connecting rod comprises a sliding end and a rotating end, the rotating end of the first transmission connecting rod and the rotating end of the second transmission connecting rod respectively cooperate with the transmission module, the sliding end of the first transmission connecting rod is slidably connected to the first housing connecting rod, and the sliding end of the second transmission connecting rod is slidably connected to the second housing connecting rod.

14. The electronic device of claim 12, wherein when the rotating mechanism is in a folded state, a rotation center of a rotating end of a first transmission connecting rod is located on a side of the first rotating door plate away from the second rotating door plate, or a side of an extension surface of the first rotating door plate away from an extension surface of the second rotating door plate; and a rotation center of a rotating end of a second transmission connecting rod is located on a side of the second rotating door plate away from the first rotating door plate, or a side of the extension surface of the second rotating door plate away from the extension surface of the first rotating door plate.

15. The electronic device of claim 12, wherein a rotation center of a rotating end of a first transmission connecting rod is a first center, a rotation center of a rotating end of a second transmission connecting rod is a second center, and when the rotating mechanism is in the folded state, a vertical distance between the first center and the second center is greater than a maximum distance between the first rotating door plate and the second rotating door plate in a first direction, wherein the first direction is an extension direction of a connection line between the first center and the second center.

16. The electronic device of claim 12, wherein the first rotating door plate comprises a first support surface, the second rotating door plate comprises a second support surface, when the rotating mechanism is in the folded state, an angle between a plane on which the first support surface is located and a plane on which the second support surface is located is a first angle, and a rotation center of a rotating end of a first transmission connecting rod and a rotation center of a rotating end of a second transmission connecting rod are both located outside a range of the first angle.

17. The electronic device of claim 12, wherein in a folded state:

a rotation center of a rotating end of a first transmission connecting rod is located on a side of the first rotating door plate facing the second rotating door plate, or a rotation center of the rotating end of the first transmission connecting rod is located on a side of an extension surface of the first rotating door plate facing the extension surface of the second rotating door plate; and a rotation center of a rotating end of a second transmission connecting rod is located on a side of the second rotating door plate facing the first rotating door plate, or a rotation center of the rotating end of the second transmission connecting rod is located on a side of the extension surface of the second rotating door plate facing the extension surface of the first rotating door plate.

18. The electronic device of claim 12, wherein the first rotating door plate comprises a first support surface, and the second rotating door plate comprises a second support surface, wherein when the rotating mechanism is in the folded state, an angle between a plane on which the first support surface is located and a plane on which the second support surface is located is a second angle, and rotation centers of rotating ends of a first transmission connecting rod and a second transmission connecting rod are both within a range of the second angle.

19. The electronic device of claim 11, wherein the rotating mechanism further comprises a lifting plate, the lifting plate is connected to the primary shaft and is movable relative to the primary shaft in a direction away from or close to the primary shaft, in the folded state, the lifting plate, the first rotating door plate, and the second rotating door plate jointly enclose a screen accommodating space, and the lifting plate is closer to the primary shaft in the folded state of the rotating mechanism than in a flattened state of the rotating mechanism.

20. The electronic device of claim 11, wherein the first rotating door plate and the first door plate swing arm are of an integrated structure, or the first rotating door plate and the first door plate swing arm are fixedly connected by a fastener.

* * * * *